United States Patent
Kamakura

(10) Patent No.: US 10,268,042 B2
(45) Date of Patent: Apr. 23, 2019

(54) HEAD-MOUNTED IMAGE DISPLAY DEVICE

(71) Applicant: SEIKO EPSON CORPORATION, Tokyo (JP)

(72) Inventor: Kazuya Kamakura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/665,692

(22) Filed: Aug. 1, 2017

(65) Prior Publication Data

US 2018/0052327 A1 Feb. 22, 2018

(30) Foreign Application Priority Data

Aug. 19, 2016 (JP) .................. 2016-161360
Dec. 20, 2016 (JP) .................. 2016-246991

(51) Int. Cl.
*G02B 27/01* (2006.01)
*G02B 27/22* (2018.01)

(52) U.S. Cl.
CPC ..... *G02B 27/0172* (2013.01); *G02B 27/0103* (2013.01); *G02B 27/0176* (2013.01); *G02B 27/2264* (2013.01); *G02B 2027/012* (2013.01); *G02B 2027/0159* (2013.01); *G02B 2027/0178* (2013.01); *G02B 2027/0181* (2013.01)

(58) Field of Classification Search
None
See application file for complete search history.

(56) References Cited

U.S. PATENT DOCUMENTS

| | | |
|---|---|---|
| 5,682,608 A * | 11/1997 | Landis ............... A61F 9/045 2/12 |
| 6,490,757 B2 | 12/2002 | Landis et al. |
| 6,745,396 B1 | 6/2004 | Landis et al. |
| 8,123,352 B2 | 2/2012 | Matsumoto et al. |
| 8,226,227 B2 | 7/2012 | Ohno et al. |
| 8,770,741 B2 | 7/2014 | Ohno et al. |
| 8,777,406 B2 | 7/2014 | Sugihara et al. |
| 9,164,293 B2 | 10/2015 | Farnam |

(Continued)

FOREIGN PATENT DOCUMENTS

| | | |
|---|---|---|
| JP | 2011-085929 A | 4/2011 |
| JP | 5195779 B2 | 5/2013 |

(Continued)

*Primary Examiner* — Nicholas J Lee
(74) *Attorney, Agent, or Firm* — Oliff PLC

(57) ABSTRACT

A head-mounted image display device mounted on the head of a user includes an image display section, a left contact section set in contact with a temporal region on the left side, a right contact section set in contact with a temporal region on the right side, a left supporting section provided in the image display section and configured to support the left contact section, and a right supporting section provided in the image display section and configured to support the right contact section. At least one supporting section of the left supporting section and the right supporting section supports an entire target contact section, which is the contact section supported by the at least one supporting section of the left and right contact section, to be movable from a first position to a second position away from the first position in a left-right direction with respect to the head.

20 Claims, 45 Drawing Sheets

(56) References Cited

U.S. PATENT DOCUMENTS

2012/0200934 A1* 8/2012 Fujishiro ............ G02B 27/0172
359/630
2015/0054717 A1* 2/2015 Sugihara ............ G02B 27/0176
345/8

FOREIGN PATENT DOCUMENTS

| JP | 5245981 B2 | 7/2013 |
| JP | 5530326 B2 | 6/2014 |
| JP | 5847014 B2 | 1/2016 |
| JP | 2017-060082 A | 3/2017 |

* cited by examiner

HEAD-MOUNTED IMAGE DISPLAY DEVICE

BACKGROUND

1. Technical Field

The present invention relates to a head-mounted image display device.

2. Related Art

There has been known a head-mounted image display device (HMD: Head Mounted Display) that is mounted on the head of a user and displays an image to enable the user to observe the image. As such a head-mounted image display device, there is known eyeglasses for image viewing including an eyeglass frame including opening sections corresponding to the left and right eyes, left and right temple holders connected to the left and the right of the eyeglass frame via hinge sections, and temples coupled to the temple holders, the width between the left and right temples being adjustable (see, for example, JP-A-2011-85929 (Patent Literature 1)).

In the eyeglasses for image viewing described in Patent Literature 1, columnar turning members are fastened to the temple holders by screws via leaf springs. The turning members are configured to be turnable around the centers thereof. Grooves (concave sections) are formed in positions corresponding to the turning members in parts of the eyeglass frame to which the temple holders are attached. The grooves are formed in an arcuate shape with respect to the turning centers of the turning members. The depth of the grooves is configured to change stepwise along the circumferential direction of the arcs. Both of the screws and the turning members can be turned by turning the screws. Opening angles of the temples are adjusted according to which positions of the grooves protrusions of the turning members move. Consequently, the width between the left and right temples is adjusted. With the eyeglasses for image viewing having such a configuration, the eyeglasses for image viewing can be worn by users having different head sizes.

However, in the eyeglasses for image viewing described in Patent Literature 1, the opening angles of the temples are adjusted as explained above. Therefore, in a user having a relatively small head, although apart on the rearward side in the head is held by the left and right temples, a part on the forward side is relatively away from the temples. Therefore, it is likely that the eyeglass frame is unsteady.

That is, when a user having a relatively large head uses the eyeglasses for image viewing, since a contact area between the head and the temples is large, it is possible to stably attach the eyeglass frame to the head. However, when the user having the relatively small head uses the eyeglasses for image viewing, since the contact area between the head and the temples is small, it is likely that the eyeglass frame cannot be stably attached to the head.

Similarly, when a configuration such as eyeglasses including a pair of temples provided to be turnable in directions in which the temples move close to and move away from each other in hinge sections provided in eyepiece sections is adopted, it is likely that only parts on the head back side in the pair of temples are in contact with the head when the user having the relatively small head uses the eyeglasses for image viewing. Therefore, there is the same problem as explained above.

SUMMARY

An advantage of some aspects of the invention is to provide a head-mounted image display device that can be stably mounted.

A head-mounted image display device according to an aspect of the invention is a head-mounted image display device that is mounted on a head of a user and displays an image to enable the user to observe the image. The head-mounted image display device includes: an image display section configured to display the image; a left contact section set in contact with a temporal region on a left side in the head; aright contact section set in contact with a temporal region on a right side in the head; a left supporting section provided in the image display section and configured to support the left contact section; and a right supporting section provided in the image display section and configured to support the right contact section. At least one supporting section of the left supporting section and the right supporting section supports an entire target contact section, which is the contact section supported by the at least one supporting section of the left contact section and the right contact section, to be movable from a first position to a second position away from the first position in a left-right direction with respect to the head. A dimension in the left-right direction between the left contact section and the right contact section is different between when the entire target contact section is located in the first position and when the entire target contact section is located in the second position.

According to the aspect, the at least one supporting section of the left supporting section and the right supporting section supports the target contact section to be movable to the first position and the second position. A dimension in the left-right direction between the left contact section and the right contact section at the time when the target contact section is located in the first position is different from the dimension at the time when the target contact section is located in the second position. That is, the dimension at the time when the target contact section is located in the second position is larger than the dimension at the time when the target contact section is located in the first position.

Consequently, since the entire target contact section is movable in the left-right direction in a range of the first position to the second position, it is possible to move the entire target contact section to a position corresponding to a size of the head of the user, that is, a position where the target contact section is in contact with the temporal region. For this reason, it is possible to prevent a contact area between the head and the target contact section from changing depending on the size of the head and maintain the contact area substantially constant. Therefore, it is possible to surely set the left contact section and the right contact section respectively in contact with the left and right temporal regions and stably mount the head-mounted image display device on the head.

In the aspect, it is preferable that the head-mounted image display device further includes: a link supported to be turnable around a first tuning axis extending along an up-down direction in the at least one supporting section and connected to the target contact section; and a second link supported to be turnable around a second turning axis extending along the up-down direction in a position different from the first link in a front-back direction in the at least one supporting section and connected to the target contact section.

The size of a head is different depending on a user as explained above. As the size of the head, not only the dimension in the left-right direction but also the dimension in the front-back direction is different. The dimension in the left-right direction and the dimension in the front-back direction of the head are in a proportional relation. For this reason, in a plurality of users respectively having different sizes of heads, when the faces of the users are located in the same position, the position of the back of the head and the positions of the ears are different depending on a user. Consequently, when the left and right contact sections have shapes that are in contact with the temporal regions to the back of the head, in a configuration in which the entire target contact section is moved only in the left-right direction, although the target contact section can be set in contact with the temporal region, it is likely that the contact section cannot be appropriately set in contact with the temporal region and the back of the head. For example, when the left and right contact sections are suspended on the ears of the user, in the configuration in which the entire target contact section is moved only in the left-right direction, it is likely that the left and right contact sections cannot be appropriately suspended on the ear.

On the other hand, with the configuration explained above, the target contact section is connected to the first link and the second link respectively supported to be turnable around the first turning axis and the second turning axis along the up-down direction. Consequently, it is possible to move the entire target contact section in the left-right direction and move the entire target contact section in the front-back direction according to the turning of the first link and the second link. In this case, the entire target contact section cannot be moved to the front side and a position close to the other contact section by turning the links to the front side. The entire target contact section can be moved to the rear side and a position away from the other contact section by turning the links to the rear side. For this reason, it is possible to move at least one entire contact section of the left and right contact sections according to the heads of users having front-back and left-right sizes different from one another. Therefore, since it is possible to set the entire left and right contact sections in contact with appropriate positions in the head, it is possible to stably mount the head-mounted image display device on the head.

In the aspect, it is preferable that the head-mounted image display device further includes an attenuation mechanism configured to engage with an attenuation target link, which is one of the first link and the second link, and attenuate a turning force of the attenuation target link.

With such a configuration, since the turning force of the attenuation target link is attenuated by the attenuating mechanism, it is possible to prevent the attenuation target link and the target contact section from suddenly moving. Therefore, it is possible to gently set the target contact section in contact with the head of the user.

In the aspect, it is preferable that the target contact section includes: a turning supporting section configured to turnably support the attenuation target link; and an attenuating-mechanism supporting section configured to support the attenuating mechanism, the turning supporting section and the attenuating-mechanism supporting section are respectively disposed in different positions, and the attenuating mechanism and the attenuation target link include meshing sections configured to mesh with each other.

With such a configuration, the attenuation target link and the attenuating mechanism are supported by the turning supporting section and the attenuating-mechanism supporting section respectively disposed in the different positions. The attenuation target link and the attenuating mechanism are meshed by the meshing sections respectively included in the attenuation target link and the attenuating mechanism. Consequently, if the meshing sections mesh with each other, the turning force of the attenuation target link can be transmitted to the attenuating mechanism. Therefore, compared with when the attenuation target link is supported by the attenuating mechanism, it is possible to make it easy to engage the attenuation target link and the attenuating mechanism.

Since the turning supporting section and the attenuating-mechanism supporting section are disposed in the different positions, it is possible to reduce loads on the respective supporting sections involved in the turning of the attenuation target link. Therefore, it is possible to achieve an extension of the life of the head-mounted image display device.

In the aspect, it is preferable that the target contact section includes a pair of housing sections configured to hold a part of each of the first link and the second link along the up-down direction, and the turning supporting section and the attenuating-mechanism supporting section are located in one housing section of the pair of housing sections.

With such a configuration, it is possible to configure the target contact section by attaching the other housing section to the one housing section after attaching the attenuation target link and the attenuating mechanism to the one housing section. Therefore, it is possible to simplify assembly of the target contact section.

In the aspect, it is preferable that the head-mounted image display device further includes an urging section configured to urge an urging target link, which is at least one link of the first link and the second link, in a turning direction in which the entire target contact section is located in the first position.

With such a configuration, the target contact section is urged by the urging section in a direction in which the dimension decreases. Consequently, it is possible to maintain a state in which the target contact section is in contact with the head and sandwich the head with the left and right contact sections. Therefore, it is possible to more stably mount the head-mounted image display device on the head.

In the aspect, it is preferable that the urging section is a tension spring, one end of which engages with the urging target link and the other end of which engages with a predetermined position, the urging target link includes an attaching section to which the one end of the tension spring is attached, and, when the target contact section is located within a range between the first position and the second position, a first direction, which is a direction extending from a turning center on an opposite side of the target contact section in the urging target link to an attachment position of the one end of the tension spring in the attaching section, and a second direction extending along an axial direction of the tension spring cross each other.

The urging force by the tension spring, which configure the urging section, increases as the urging target link turns and an extension dimension of the tension spring (a dimension in the axial direction of the tension spring) increases. That is, the urging force of the tension spring increases as a crossing angle of the first direction and the second direction increases.

On the other hand, when it is attempted to cause a force to act in the same direction as an acting direction of the urging force of the tension spring (a direction along the second direction) in the attachment position of one end of the tension spring in the urging target link to turn the urging target link, a force (in other words, resistance) for turning the urging target link increases as the crossing angle increases.

The force for turning the urging target link with the urging force of the tension spring has a value obtained by combining the urging force acting on the urging target link with the tension spring and the force necessary for turning the urging target link. That is, the force for turning the urging target link is a force obtained by subtracting the latter force (the resistance) from the former urging force. The force for turning the urging target link is a pressing force of the contact section for pressing the head of the user.

Consequently, it is possible to set the pressing force to a value within a fixed range irrespective of a turning state of the urging target link. That is, it is possible to apply a substantially constant pressing force to the head irrespective of the size of the head of the user who wears the head-mounted image display device. Therefore, it is possible to reduce a load on the user according to the size of the head.

In the aspect, it is preferable that the first link includes: a first-link-side first turning section supported to be turnable around the first turning axis; and a first-link-side second turning section turnably supported by the target contact section, the second link includes: a second-link-side first turning section supported to be turnable around the second turning axis; and a second-link-side second turning section turnably supported by the target contact section, and at least any one of the first-link-side first turning section, the first-link-side second turning section, the second-link-side first turning section, and the second-link-side second turning section is supported via a bearing.

With such a configuration, at least either one of the first link and the second link is supported by a supporting structure of the links via the bearing. Consequently, it is possible to prevent wear of the link and the supporting structure and smoothly perform the turning of the links.

In the aspect, it is preferable that the target contact section includes: a main body section; and a cover provided to be detachably attachable to the main body section and configured to cover at least apart of the main body section.

With such a configuration, by replacing the cover in contact with the head of the user according to necessity, it is possible to keep the head-mounted image display device in a clean state.

Note that such a cover is considered to be relatively easily deteriorated because the cover is in contact with the head. When the cover is deteriorated in this way, it is likely that a wearing feeling of the head-mounted image display device is spoiled. On the other hand, by replacing the cover according to necessity, it is possible to prevent the wearing feeling from being deteriorated.

These effects are particularly effective when a plurality of users use one head-mounted image display device.

In the aspect, it is preferable that the main body section includes: a connecting section connected to the first link and the second link; and a frame section, one end of which is fixed to the connecting section, the frame section extending to a rear of the user from the connecting section, and the frame section has flexibility.

With such a configuration, since the frame section has flexibility, it is possible to deform the contact section according to the shape of the head. For this reason, it is possible to dispose the target contact section along the head and improve the wearing feeling of the head-mounted image display device.

In the aspect, it is preferable that the frame section includes a curved section located, in an extending direction of the frame section from the connecting section, on a distal end side in the extending direction with respect to a fixing position to the connecting section.

If a configuration without the curved section is assumed, when the frame section bends, a load is easily applied to the fixing position to the connecting section in the frame section. For this reason, taking into account deformation and deterioration of the fixing position and a fixing structure for fixing the connecting section and the frame section, it is necessary to reinforce the fixing position or the fixing structure.

On the other hand, with the configuration explained above, when the frame section bends, a position where the frame section bends can be defined in the curved section. Therefore, it is unnecessary to reinforce the fixing position and the fixing structure. Since the curved section is curved, it is possible to increase the strength of the position where the frame section bends. Further, since the frame section easily bends, it is possible to make it easy to deform the frame section and the target contact section along the shape of the head.

In the aspect, it is preferable that the target contact section includes a seal member located between the frame section and the cover.

With such a configuration, it is possible to prevent a gap from being formed between the frame section and the cover. Therefore, it is possible to prevent the wearing feeling of the head-mounted image display device from being deteriorated because, for example, the cover is deformed.

In the aspect, it is preferable that the frame section is formed of metal.

With such a configuration, it is possible to increase the strength of the frame section and the target contact section. Besides, since a part on the rearward side of the target contact section is heavy, it is possible to impart a function of a counterweight to the frame section. Therefore, it is possible to not only improve the wearing feeling of the head-mounted image display device but also reduce a fatigue feeling of the user who uses the head-mounted image display device.

In the aspect, it is preferable that the cover includes an insert-through port through which the frame section is inserted, and the target contact section includes a restricting member configured to restrict come-off of the cover, through the insert-through port of which the frame section is inserted.

With such a configuration, the cover is attached such that the frame section is inserted through the insert-through port. Therefore, it is possible to easily attach the cover to the frame section. Since the come-off of the cover is restricted by the restricting member, it is possible to prevent the cover from unexpectedly coming off.

In the aspect, it is preferable that the frame section includes, at an extending direction distal end portion of the frame section from the connecting section, an attachment section to which the restricting member is attached, and the attachment section has a thickness dimension larger than a thickness dimension of other parts of the frame section.

With such a configuration, it is possible to prevent the restricting member from coming off the attachment section and surely prevent the cover from coming off the frame section.

In the aspect, it is preferable that the attachment section is configured by folding back a part of the frame section to an opposite side of a side close to the head.

With such a configuration, it is possible to easily configure the attachment section that can prevent the come-off of the restricting member.

In the aspect, it is preferable that the at least one supporting section includes an exterior section that configures a part of an exterior of the head-mounted image display device.

With such a configuration, since the at least one supporting section includes the exterior section, by attaching the supporting section to the outer side of the image display section, it is possible to configure the head-mounted image display device that can achieve the effects explained above. Therefore, it is possible to simplify a manufacturing process of the head-mounted image display device.

In the aspect, it is preferable that the exterior section covers at least either one of sides and a top of the image display section.

With such a configuration, by attaching the supporting section to cover the image display section from the sides or above, it is possible to easily configure the head-mounted image display device that achieves the effects explained above. Since the exterior section covers the sides and the top of the image display section, it is possible to increase the strength of the head-mounted image display device.

In the aspect, it is preferable that at least a part of the target contact section is thinner than other parts.

When mounting the head-mounted image display device on the head, the user often grips a relatively thin part and wears the head-mounted image display device.

For this reason, with the configuration, it is possible to make it easy for the user to grip a position that the user should grip. Therefore, it is possible to make it easy to wear the head-mounted image display device.

In the aspect, it is preferable that the target contact section includes, in a part on an opposite direction side of an observation direction, which is a direction in which the user observes the image displayed by the image display section, a center-of-gravity adjusting section configured to adjust a center-of-gravity position of the head-mounted image display device.

Note that the center-of-gravity adjusting section can be configured as, for example, a part thicker than other parts in the target contact section and can be configured as a part, on an inside of which a relatively heavy member is provided.

In the head-mounted image display device, a component for making image light incident on the eyes of the user is often disposed in front of the eyes of the user. Therefore, the center-of-gravity position easily deviates to the front side. In such a case, the head-mounted image display device easily slants and the wearing feeling is deteriorated.

On the other hand, with the configuration, the center-of-gravity adjusting section can function as a counterweight and adjust the center-of-gravity position of the head-mounted image display device. Therefore, since it is possible to make it easy to keep a balance of the front and the rear of the head-mounted image display device, it is possible to prevent the wearing feeling from being spoiled and reduce the fatigue feeling of the user. Further, if the center-of-gravity adjusting section located in a part on the rear side in the target contact section is configured as a thick part in the target contact section, when the target contact section is suspended on the ear of the user, it is possible to prevent the target contact section from slanting and coming off the ear.

In the aspect, it is preferable that the at least one supporting section movably supports the target contact section such that a dimension in the left-right direction between the left contact section and the right contact section is in a range of 128 mm or more and 170 mm or less.

A dimension in the left-right direction of the head of a child (a child in a target age of the head-mounted image display device) is approximately 128 mm. A dimension in the left-right direction in the head of an adult having a relatively large head is approximately 170 mm. For this reason, with the configuration, it is possible to allow a wide variety of users ranging from children to adults to stably wear the head-mounted image display device. Therefore, it is possible to further improve universality of the head-mounted image display device.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention is explained below with reference to the drawings.

Schematic Configuration of an HMD

Figure 1:
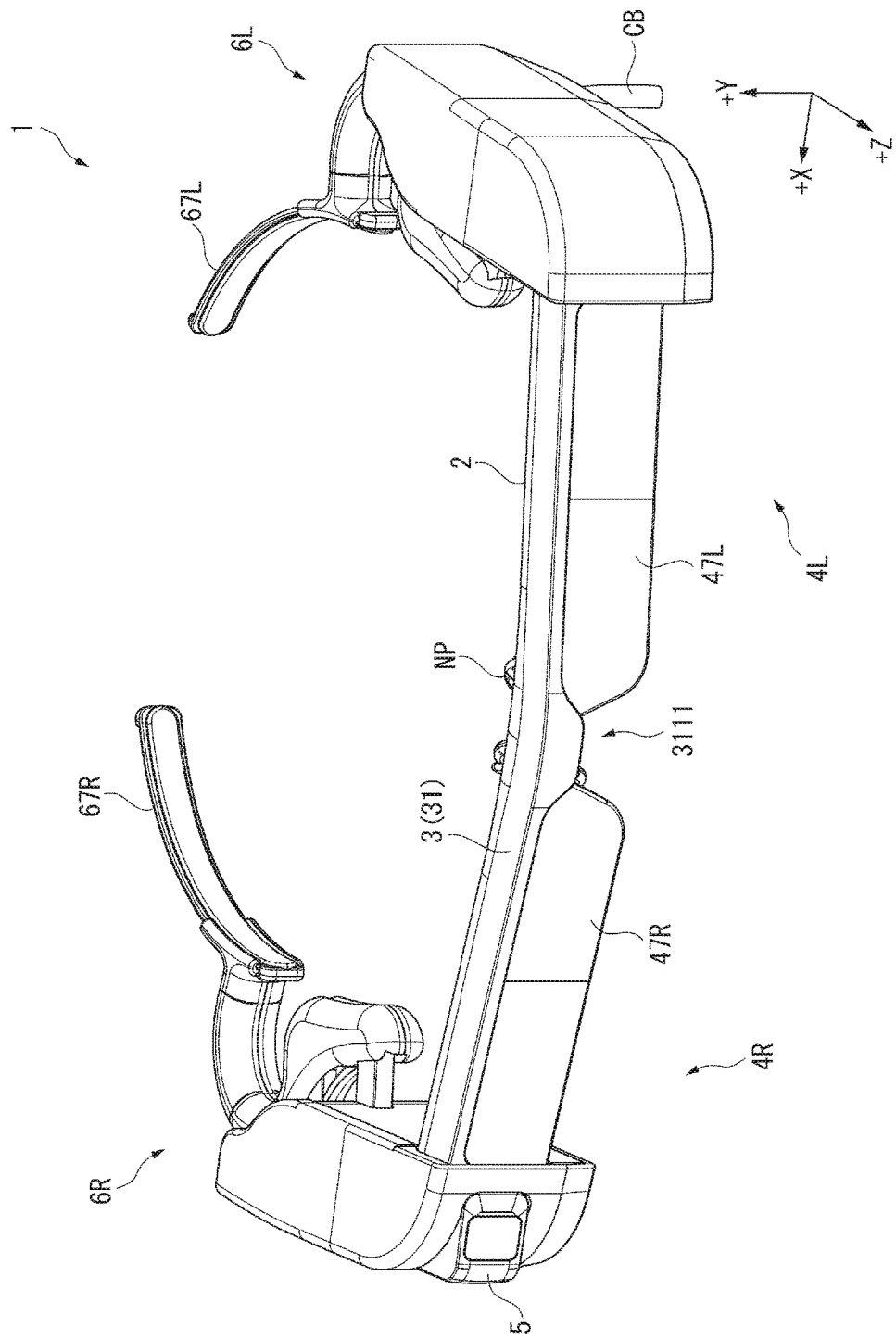
FIG. 1 is a perspective view showing the exterior of an HMD according to a first embodiment of the invention.
Figure 2:
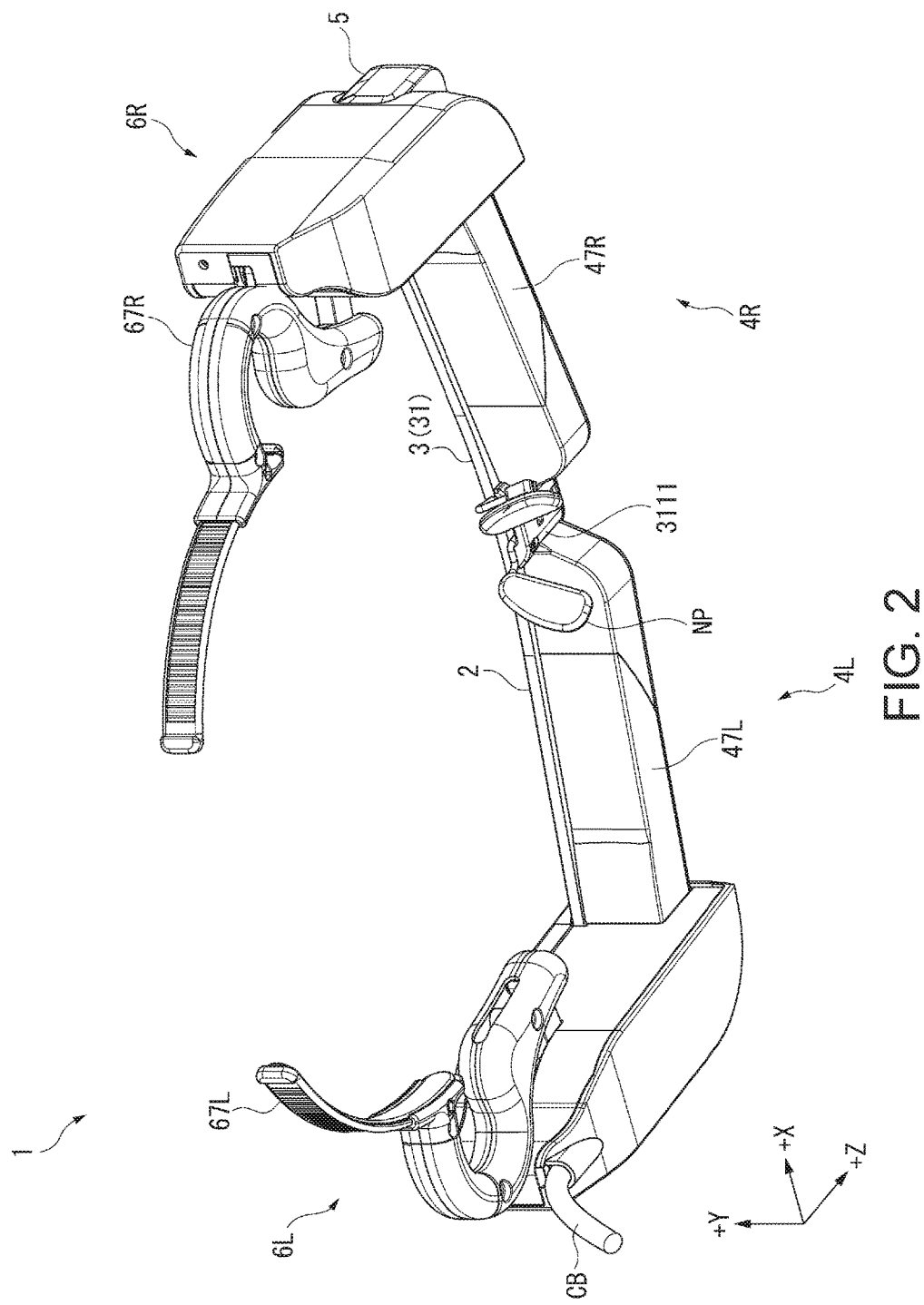
FIG. 2 is a perspective view showing the exterior of the HMD in the first embodiment.

FIGS. 1 and 2 are perspective views showing the exterior of an HMD 1 according to this embodiment. Specifically, FIG. 1 is a perspective view of the HMD 1 viewed from above on the front side. FIG. 2 is a perspective view of the HMD 1 viewed from below on the back side.

The HMD 1 according to this embodiment is a head-mounted image display device of a see-through type that is mounted on the head of a user and used, displays an image to enable the user to visually recognize the image, and transmits external light to enable the user to observe an external world. The HMD 1 is a virtual image display device. The HMD 1 includes, as shown in FIGS. 1 and 2, an image display section 2 and a pair of temples 6L and 6R.

Figure 3:
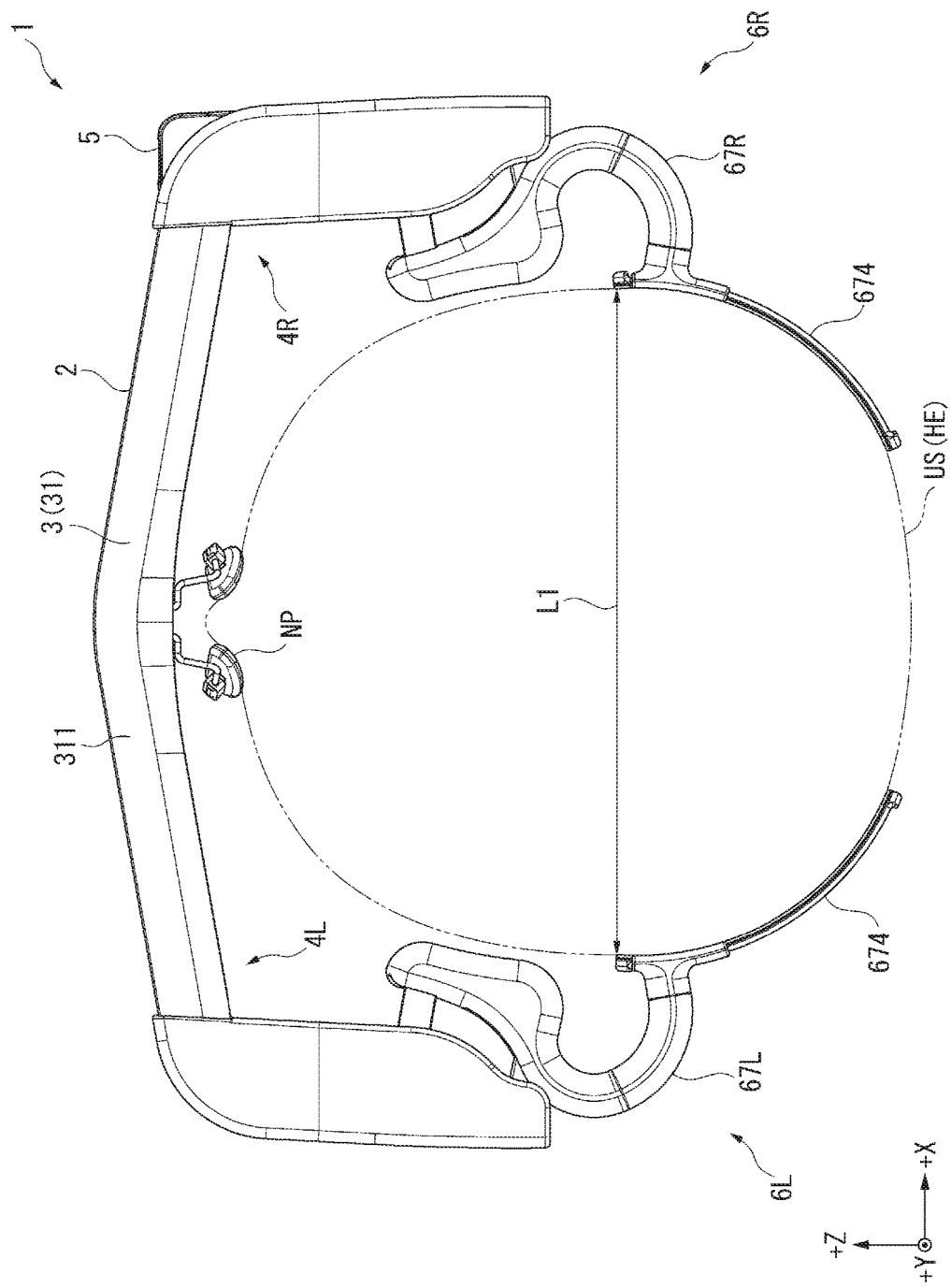
FIG. 3 is a plan view showing the HMD in a state in which the dimension between temples is reduced most in the first embodiment.
Figure 4:
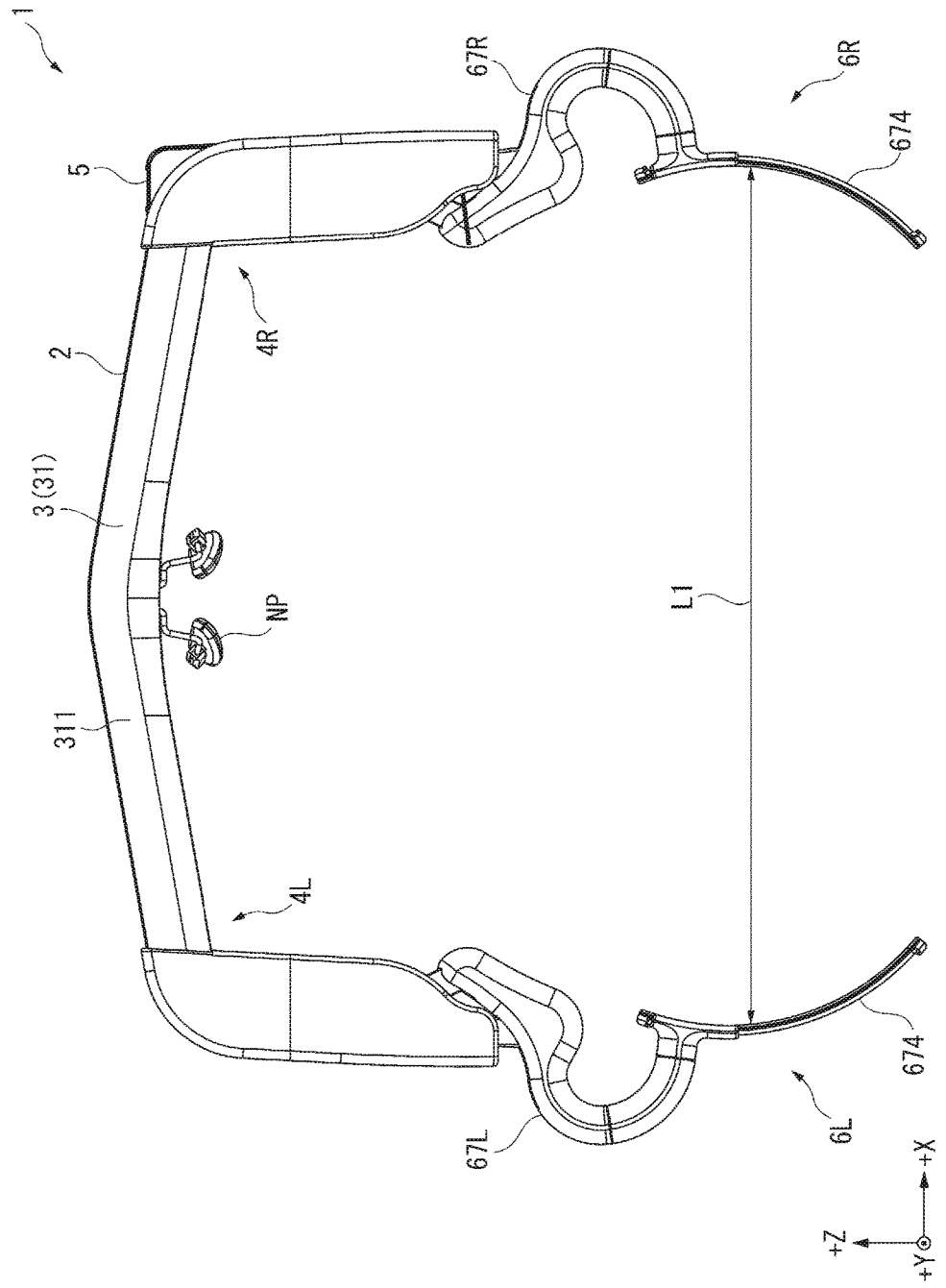
FIG. 4 is a plan view showing the HMD in a state in which the dimension between the temples is increased most in the first embodiment.

FIG. 3 is a plan view of the HMD 1 viewed from above in a state in which a dimension L1 between temples 6L and 6R (contact sections 67L and 67R) is reduced most. FIG. 4 is a plan view of the HMD 1 viewed from above in a state in which the dimension L1 is increased most.

In the HMD 1, as shown in FIGS. 3 and 4, the contact sections 67L and 67R of the pair of temples 6L and 6R are configured to be movable in directions in which the contact sections 67L and 67R move away from each other. As one characteristic of the HMD 1, the HMD 1 is configured such that the dimension L1 between the entire contact section 67L and the entire contact section 67R is adjusted according to the size a head HE of a user US, whereby it is possible to mount the HMD 1 irrespective of the size of the head HE. The dimension L1 is not the dimension between specific parts in the left and right contact sections 67L and 67R and is the dimension between parts spaced apart from each other most in the left-right direction in the contact sections 67L and 67R moved to certain positions. Therefore, in the contact sections 67L and 67R, a part where the dimension L1 is set changes according to the positions of the contact sections 67L and 67R as shown in FIGS. 3 and 4.

Note that, in the following explanation, it is assumed that an observation direction side by the user of an image visually recognizably displayed by the HMD 1 is a front side and the opposite side of the front side is a rear side (a back side). That is, it is assumed that a direction side in which a line of sight of the user is directed is the front side. An upper side and a lower side in the HMD 1 correspond to an upper side and a lower side in the user who wears the HMD 1. A right side and a left side in the HMD 1 correspond to a right side and a left side in the user who wears the HMD 1. A +Z direction, a +Y direction, and a +X direction shown in FIG. 1 and subsequent figures are orthogonal to one another. The +Z direction indicates a forward direction (a direction from the rearward side toward the forward side), +Y direction indicates an upward direction (a direction from the lower side to the upper side), and +X direction indicates aright direction (a direction from the left side to the right side). Although not shown in the figure, for convenience of explanation, the opposite direction of the +Z direction is represented as a −Z direction. The same applies to a −Y direction and a −X direction.

Configuration of the Image Display Section

Figure 5:
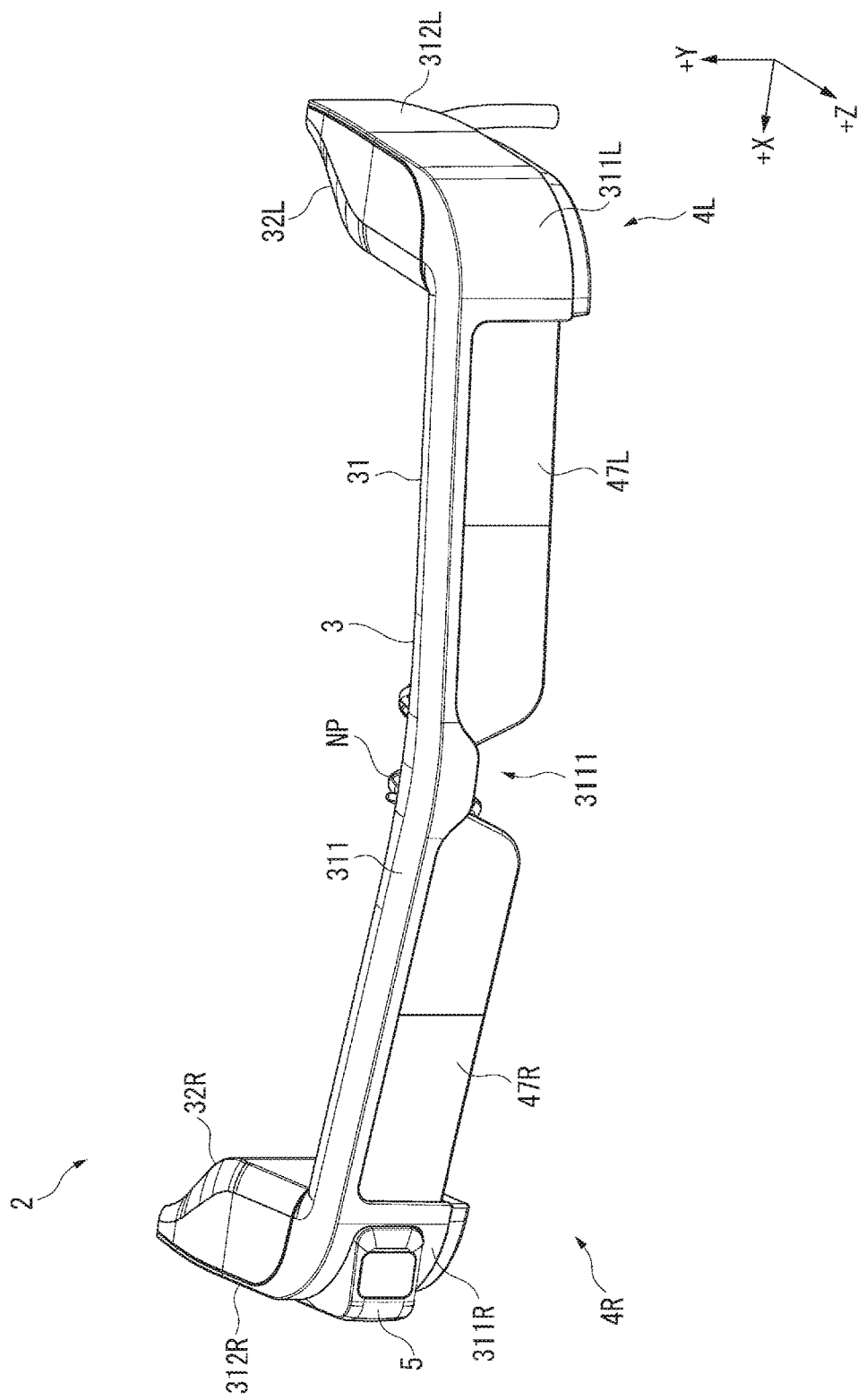
FIG. 5 is a perspective view showing an image display section in the first embodiment.
Figure 6:
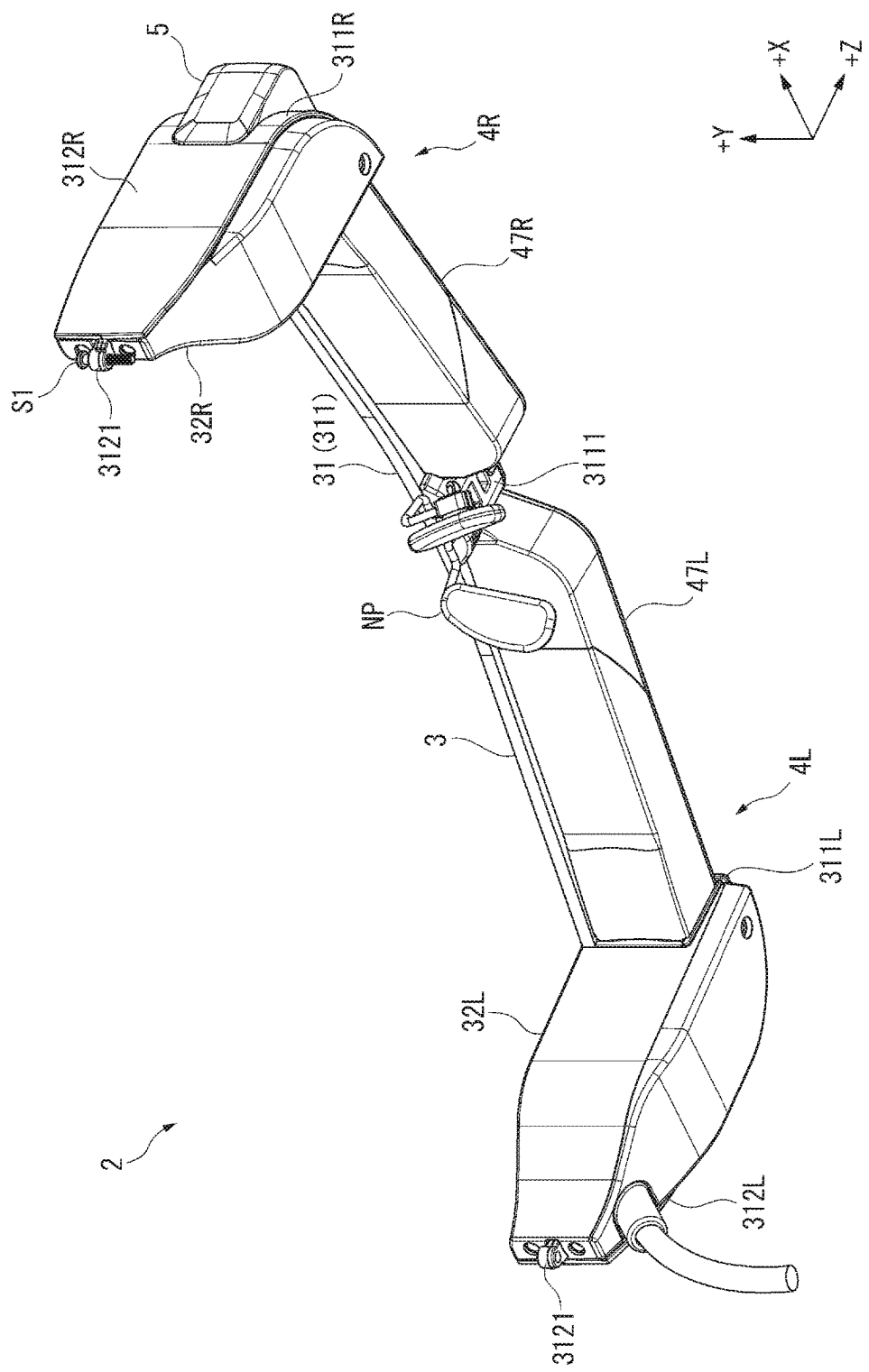
FIG. 6 is a perspective view showing the image display section in the first embodiment.

FIGS. 5 and 6 are respectively perspective views of the image display section 2 viewed from above on the front side and below on the back side. In other words, FIGS. 5 and 6 are respectively perspective views of the HMD 1 viewed from above on the front side and below on the back side when the temples 6L and 6R are removed in FIGS. 1 and 2.

The image display section 2 displays an image to enable the user to visually recognize the image. The image display section 2 includes, as shown in FIGS. 5 and 6, a frame 3, optical devices 4L and 4R, and an image pickup device 5.

Configuration of the Frame

The frame 3 has a configuration like a frame of eyeglasses. The frame 3 supports the optical devices 4L and 4R and the image pickup device 5 and supports nose pads NP and a lens holder and a blocking member (both of which are not shown in the figure) The frame 3 includes a frame main body 31 having a substantially U shape when viewed from above and case members 32L and 32R attached to the frame main body 31.

The frame main body 31 includes a front section 311 extending along the left-right direction and side surface sections 312R and 312L extending from both left and right ends of the front section 311 in the rearward direction crossing the front section 311. The frame main body 31 is an integrated molded product made of metal in which the front section 311 and the side surface sections 312R and 312L are integrally formed.

When the HMD 1 is mounted on the head, the front section 311 is disposed along the forehead in the head. The front section 311 supports light guide members 47L and 47R disposed in front of the left and right eyes of the user in the optical devices 4L and 4R. Besides, the front section 311 is configured to be capable of supporting the nose pads NP, the lens holder and the blocking member (both of which are not shown in the figure) in a mounting section 3111 located between the light guide members 47L and 47R explained below. Note that the left end portion 311L and the right end portion 311R in the front section 311 are curved in an arcuate shape on the rearward side when viewed from above. The image pickup device 5 is disposed in the right end portion 311R. The side surface section 312R extends backward from the right end portion 311R. The side surface section 312L extends backward from the left end portion 311L.

The nose pads NP are inserted into the mounting section 3111 from the rearward direction to the forward direction and support the mounting section 3111. The nose pads NP hold the nose (parts corresponding to the wings of nose) from the left and the right during the mounting of the HMD 1 to thereby prevent the HMD 1 from slanting to the left and the right and slanting downward. A plurality of the nose pads NP are prepared according to the sizes and the shapes of noses of users. The nose pads NP suitable for the user are inserted into and pulled out from the mounting section 3111.

Although not shown in the figure, the lens holder has a configuration like eyeglasses without temples. The lens holder holds left and right lenses for orthoptics and is detachably attached to the mounting section 3111 from the rear side.

Although not shown in the figure, the blocking section is disposed on the front side with respect to the light guide members 47R and 47L explained below. The blocking section blocks at least a part of external light made incident on the light guide members 47R and 47L to make the external world less easily seen. Consequently, the blocking member improves visibility of a displayed image. The blocking member is detachably attached to the mounting section 3111 from the downward side.

When the HMD 1 is mounted on the head, the side surface sections 312L and 312R are disposed along the left and right temporal regions (e.g., temples).

The side surface section 312R is combined with the case member 32R to form a housing space for housing an image projecting section 41 and a control section 46 of the optical device 4R on the inside.

Similarly, the side surface section 312L is combined with the case member 32L to form a housing space for housing the image projecting section 41 and the control section 46 of the optical device 4L on the inside.

The side surface sections 312L and 312R respectively include, as shown in FIG. 6, fixing sections 3121 that project further to the rearward side from end portions on the rearward side and to which inner covers 62L and 62R of the temples 6L and 6R explained below are fixed. When temples different from the temples 6L and 6R are used, the fixing sections 3121 also function as supporting sections that turnably support the different temples.

Figure 7:
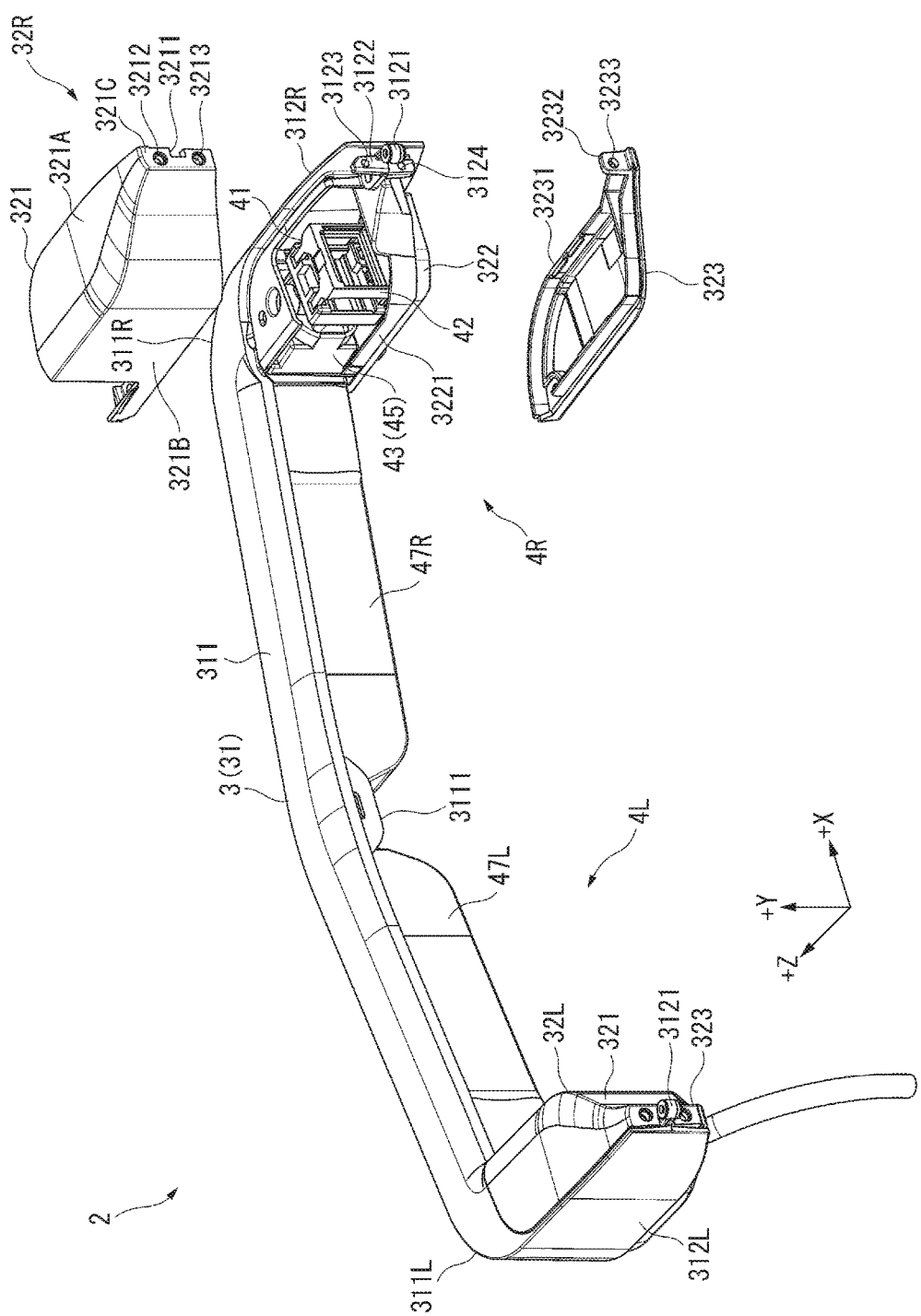
FIG. 7 is an exploded perspective view showing the image display section in which an upper case and a lower case are separated in the first embodiment.
Figure 8:
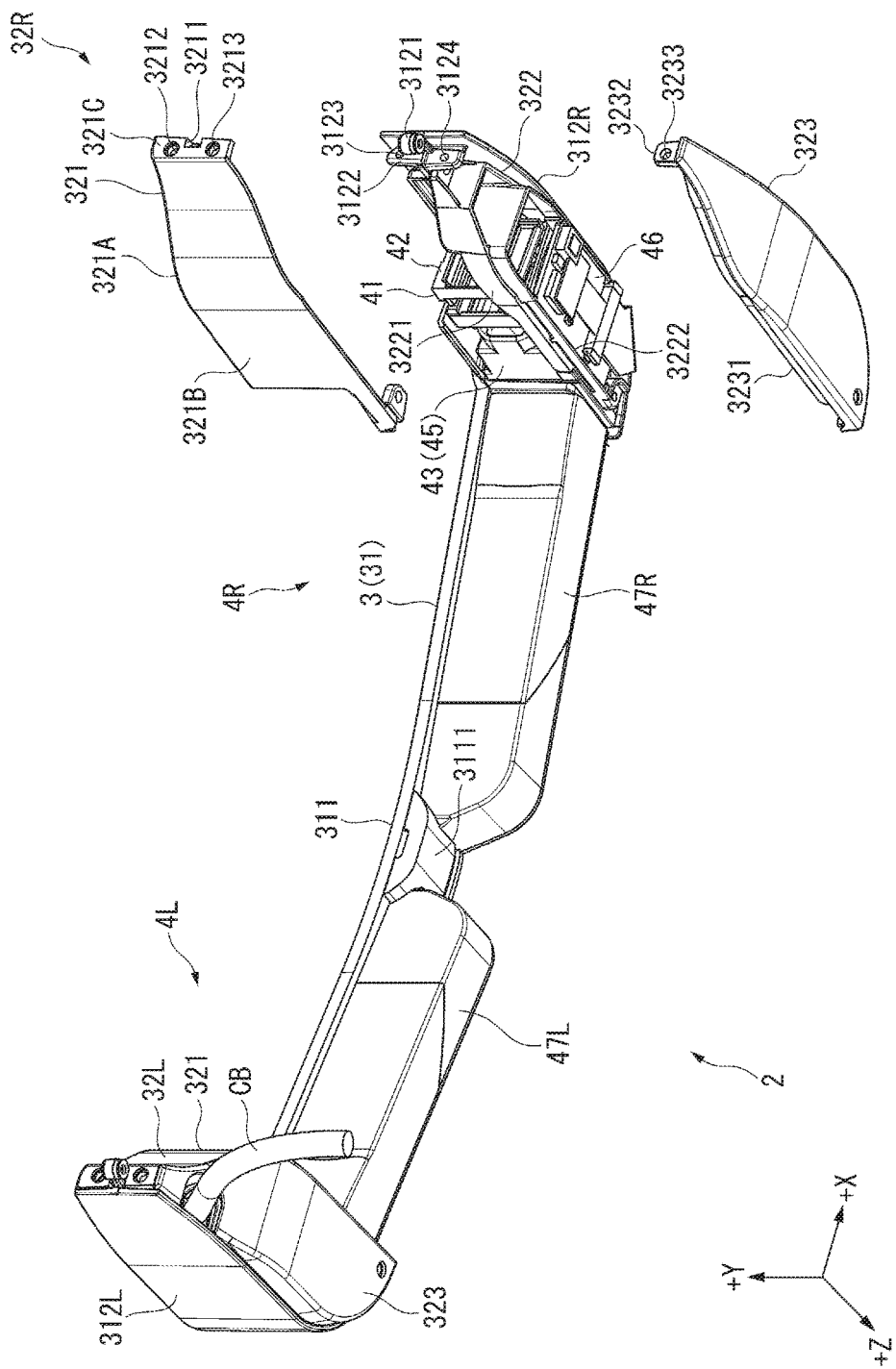
FIG. 8 is an exploded perspective view showing the image display section in which the upper case and the lower case are separated in the first embodiment.

FIGS. 7 and 8 are exploded perspective views showing the image display section 2 in which an upper case 321 and a lower case 323, which configure the case member 32R, are separated. Specifically, FIG. 7 is an exploded perspective view of the image display section 2 viewed from above on the back side. FIG. 8 is an exploded perspective view of the image display section 2 viewed from above on the back side.

As shown in FIGS. 7 and 8, the side surface sections 312R includes a fixing section 3122 in a part further on the front side than the fixing section 3121. The fixing section 3122 includes two hole section 3123 and 3124 vertically arranged in parallel. A screw for fixing the upper case 321 of the case member 32R is attached to the hole section 3123 on the upper side. A screw for fixing the lower case 323 of the case member 32R is attached to the hole section 3124 on the lower side. Note that, although not shown in the figure, the side surface section 312L includes the same fixing sections 3121 and 3122.

Configuration of the Optical Devices

The optical devices 4L and 4R are explained first.

The optical device 4L is located on the left side in the frame 3 and the optical device 4R is located on the right side in the frame 3. The optical devices 4L and 4R form images corresponding to image signals input from the outside and make the images incident on the eyes of the user. The optical device 4R includes the image projecting section 41 and the control section 46 respectively disposed in the housing space formed by combining the side surface section 312R and the case member 32R and the light guide member 47R supported by the front section 311.

In the following explanation, the image projecting section 41, the control section 46, and the light guide member 47R of the optical device 4R are mainly explained. Note that the optical device 4L includes the image projecting section 41, the control section 46, and the light guide member 47L, which are mirror-symmetrical to the components of the optical device 4R. However, since the components are the same as the components of the optical device 4R, explanation of a part of the components is omitted.

Configuration of the Image Projecting Section

Figure 9:
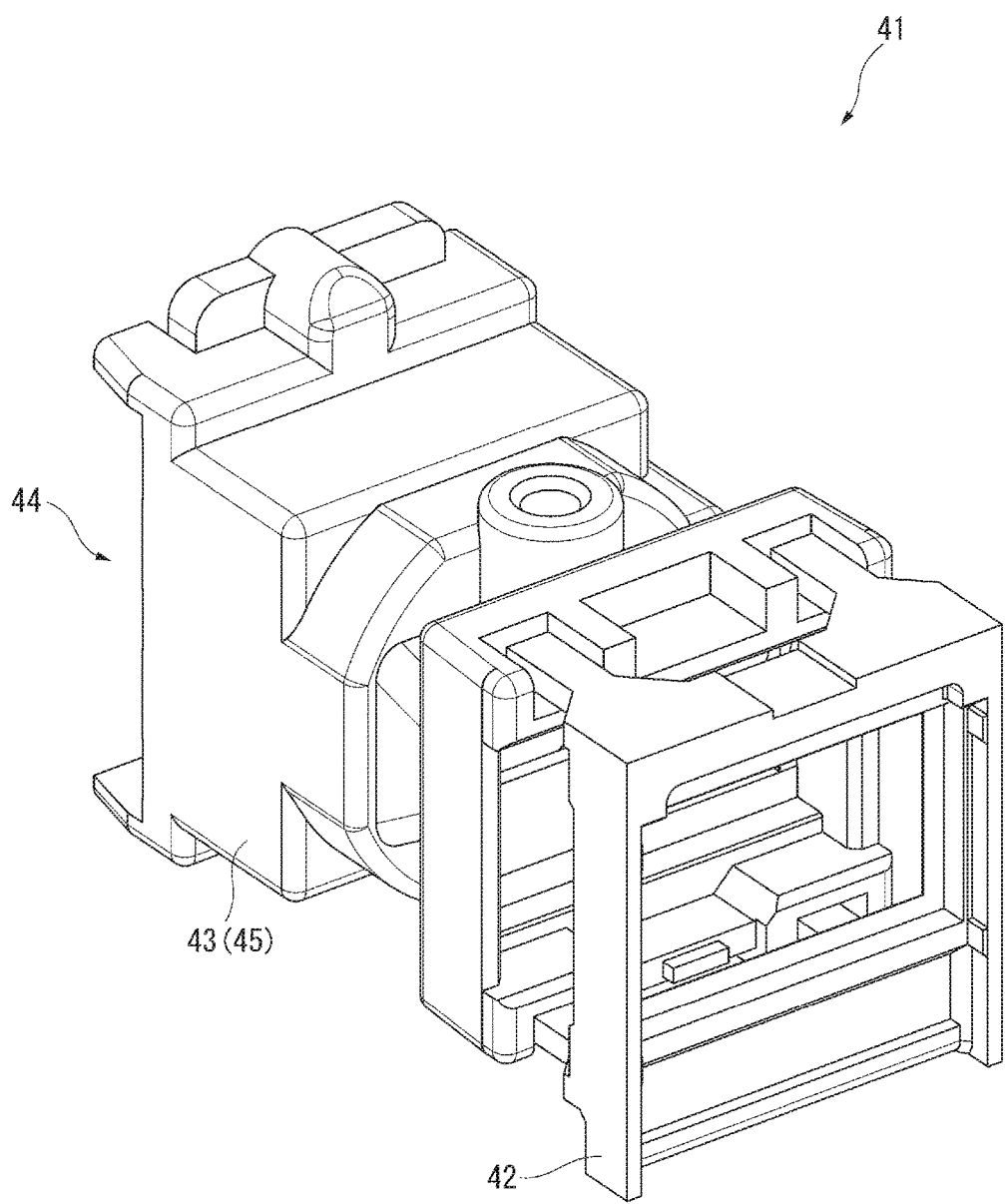
FIG. 9 is a perspective view showing an image projecting section in the first embodiment.

FIG. 9 is a perspective view of the image projecting section 41 viewed from above on the opposite side (the back side) of a projecting side of image light. Note that, in FIG. 9, a frame body of an image forming device 42 is shown and a display panel is not shown.

The image projecting section 41 projects image light (light forming an image) on, of the light guide members 47R and 47L, an light guide member corresponding to the image projecting section 41. As shown in FIG. 9, the image projecting section 41 includes the image forming device 42 and a projection optical device 43. The image forming device 42 and the projection optical device 43 are combined and configured as a unit.

The image forming device 42 forms, under the control by the control section 46, image light corresponding to an image signal input from the outside via a cable CB (see FIG. 1). In this embodiment, the image forming device 42 is configured by a self-emitting display panel such as an organic EL (Electro-Luminescence) panel. However, not only this, but the image forming device 42 can also be configured by a combination of a light source such as an LED and a transmissive or reflective liquid crystal panel or an optical modulation device such as a device including a micro-mirror such as a MEMS mirror.

Although not shown in the figure, the image forming device 42 is connected to the frame main body 31 (e.g., the side surface sections 312R and 312L) by a heat conduction member. At least a part of heat generated by the image forming apparatus 42 is discharged to the outside in the frame main body 31. On the other hand, the heat conduction member may be absent.

The projection optical device 43 projects the image light formed by the image forming device 42 on the light guide members 47L and 47R corresponding to the projection optical device 43. The projection optical device 43 is configured as a set lens including a plurality of lenses 44 and a lens barrel 45 that houses the plurality of lenses 44. Note that a prism may be adopted as at least one of the plurality of lenses 44 as long as the image light incident from the image forming device 42 can be guided to light guide members corresponding to the image forming device 42.

The lens barrel 45 is formed in a substantially square cylinder shape and fixed to the frame main body 31. As shown in FIGS. 7 and 8, a board holder 322 explained below is attached to the lens barrel 45. That is, the image projecting section 41 including the lens barrel 45 is covered by the board holder 322 from the lower side. Note that, although not shown in the figure, the image projecting section 41 of the optical device 4L is also covered by a similar board holder from the downward side.

The control section 46 is configured by a printed board on which a circuit element is mounted. The control section 46, which configures the optical device 4R, is connected to a control section, which configures the optical device 4L, via a signal line (not shown in the figure). The control sections operate the image forming devices 42 corresponding to the control sections according to an image signal supplied from the outside via the cable CB.

Note that a control circuit that controls the image pickup device 5 is mounted on the control section of the optical device 4R.

The light guide members 47L and 47R are supported by the frame main body 31 and disposed on the left and right eyes of the user and guide image lights made incident from the image projecting sections 41 corresponding to the light guide members 47L and 47R to the left and right eyes of the user.

Specifically, the light guide member 47R reflects, in-plane on an interface, image light for the right eye made incident from the image projecting section 41 (the projection optical device 43) of the optical device 4R, causes the image light to travel to the center side, and guides the image light to the right eye with a semitransparent layer provided in a position corresponding to the right eye of the user. The same applies to the light guide member 47L that guides image light for the left eye made incident from the image projecting section 41 (the projection optical device 43) of the optical device 4L to the left eye of the user. The light guide members 47L and 47R are respectively formed of resin (e.g., cycloolefin polymer) showing high light transmissivity in a visible light region. Therefore, the user is capable of observing the outside world via the light guide members 47R and 47L disposed in front of the left and right eyes.
Configuration of the Case Member The case member 32R is combined with the side surface section 312R to form the housing space. The case member 32L is combined with the side surface section 312L to form the housing space. The case member 32R includes, as shown in FIGS. 7 and 8, the upper case 321, the board holder 322, and the lower case 323.

Note that the case member 32L also includes the upper case 321, the board holder 322 (not shown in the figure), and the lower case 323. The case member 32R and the case member 32L are mirror-symmetrical.

The components of the case member 32R are explained below. The components of the case member 32L are not explained because the components are the same as the components of the case member 32R.
Configuration of the Upper Case The upper case 321 is a member that covers the image projecting section 41 from above. The upper case 321 includes an upper surface section 321A, a side surface section 321B hanging from an end portion on the user side (the left side) in the upper surface section 321A and opposed to the side surface section 312R, and a back surface section 321C crossing the upper surface section 321A and the side surface section 321B.

The back surface section 321C includes a concave section 3211 substantially in the center and includes two hole sections 3212 and 3213 in positions vertically across the concave section 3211.

The concave section 3211 is a concave section that exposes the fixing section 3121 of the side surface section 312R to the outside.

Of the hole sections 3212 and 3213, the hole section 3212 located above is a screw hole to which a screw inserted through an outer cover 61R and the inner cover 62R of the temple 6R explained below is fixed. Consequently, the outer cover 61R and the inner cover 62R are fixed to the case member 32R. Besides, the hole sections 3212 and 3213 are also screw holes in which screws for fixing another temple having a shape and a configuration different from the shape and the configuration of the temple 6R to the case member 32R are screwed.
Configuration of the Board Holder The board holder 322 is a member fixed to the lens barrel 45 to cover the lens barrel 45 from below. The board holder 322 includes an erected section 3221 erected upward from a peripheral edge in an upper surface (a surface opposed to the lens barrel 45) and an erected section 3222 erected downward from a part slightly on the inner side than a peripheral edge in a lower surface (a surface on the opposite side of the lens barrel 45). The control section 46 is disposed in a position surrounded by the erecting section 3222.
Configuration of the Lower Case The lower case 323 covers the board holder 322 from below and is combined with the upper case 321, the board holder 322, and the side surface section 312R to configure the housing space. Like the outer shape of the board holder 322, the lower case 323 is formed in a shape in which an end edge on the right side extends along the side surface section 312R and end edges on the left side and the back side extend along end edges on the left side and the back side in the upper case 321. Besides, an end portion on the back side in the lower case 323 inclines upward. Such a lower case 323 includes an erected section 3231 and a fixing section 3232.

The erected section 3231 is erected upward from a position slightly on the inner side than a peripheral edge on a bottom surface (a surface opposed to the board holder 322) of the lower case 323 and is formed along the peripheral edge. In the erected section 3231, the outer surface of a part located on the side surface section 312R side of the lower case 323 comes into contact with the lower end portion on the inner surface of the side surface section 312R when the lower case 323 is connected to the side surface section 312R. In the erected section 3231, the outer surface of a part located on the opposite side of the side surface section 312R side comes into contact with the lower end portion on the inner surface of the side surface section 321B when the lower case 323 is combined with the upper case 321.

The erected section 3222 of the board holder 322 is disposed on the inner side of the erected section 3231 when the lower case 323 and the board holder 322 are combined. Consequently, a space in which the control section 46 is disposed is closed. Intrusion of liquid into the space is prevented.

The fixing section 3232 is apart erected upward from the back side end portion of the lower case 323. A hole section 3233 is formed in the fixing section 3232. A screw inserted through the hole section 3213 of the upper case 321 is inserted through the hole section 3233. The screw is fixed to the hole section 3124 of the side surface section 312R.

Configuration of the Image Pickup Device

As explained above, the image pickup device 5 is provided at the right end portion 311R. The image pickup device 5 operates under the control by the control section 46 of the optical device 4R and outputs a picked-up image to the control section 46. Note that, not shown in the figure, the control section 46 is connected to the control section 46 of the optical device 4L via a signal line disposed along the front section 311. The control section 46 of the optical device 4L is connected to an external apparatus via the cable CB extending to the outside from the case member 32L. The picked-up image picked up by the image pickup device 5 is output to the external apparatus.

Configuration of the Temple

Figure 10:
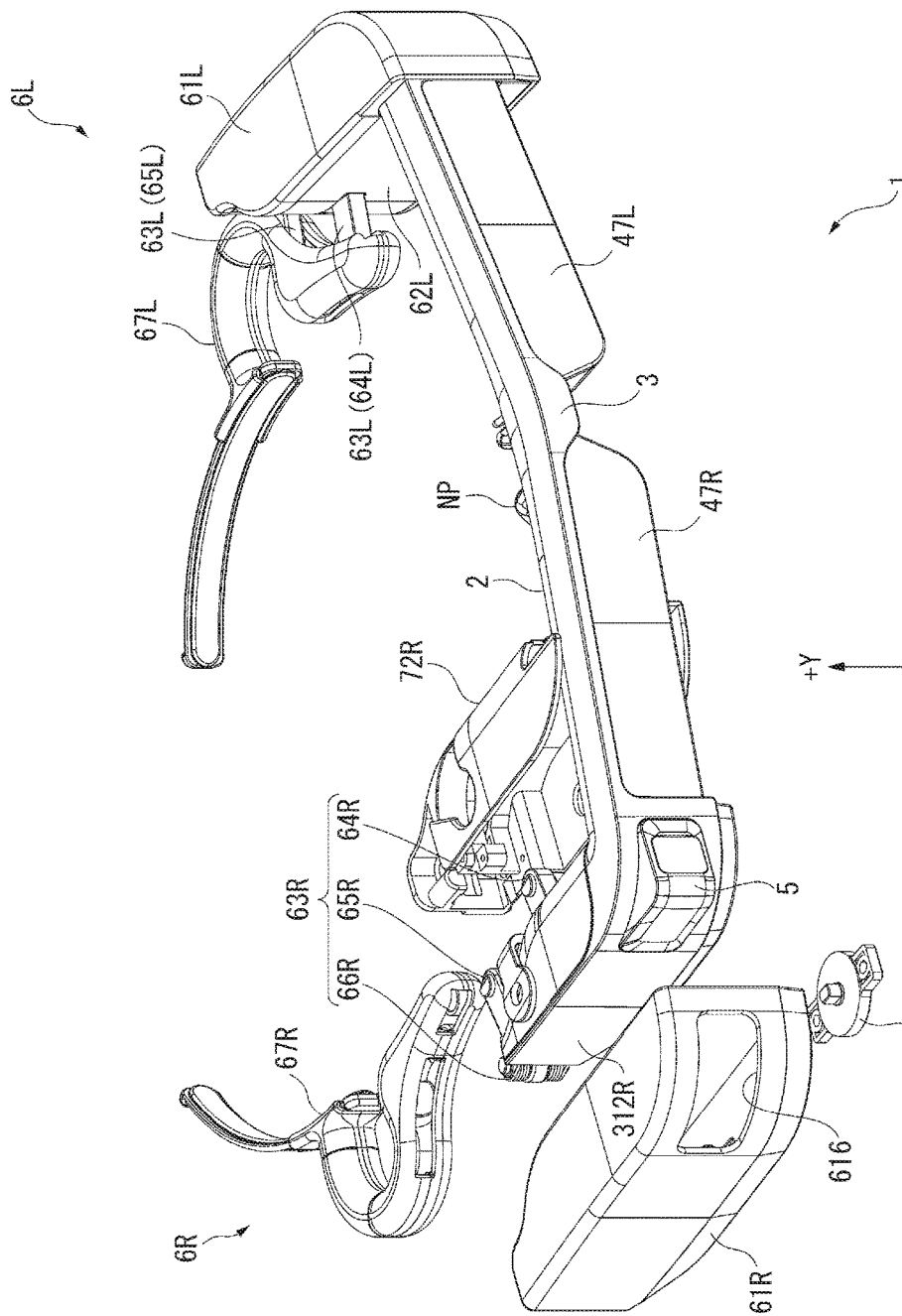
FIG. 10 is a perspective view showing the HMD in which a temple is disassembled in the first embodiment.
Figure 11:
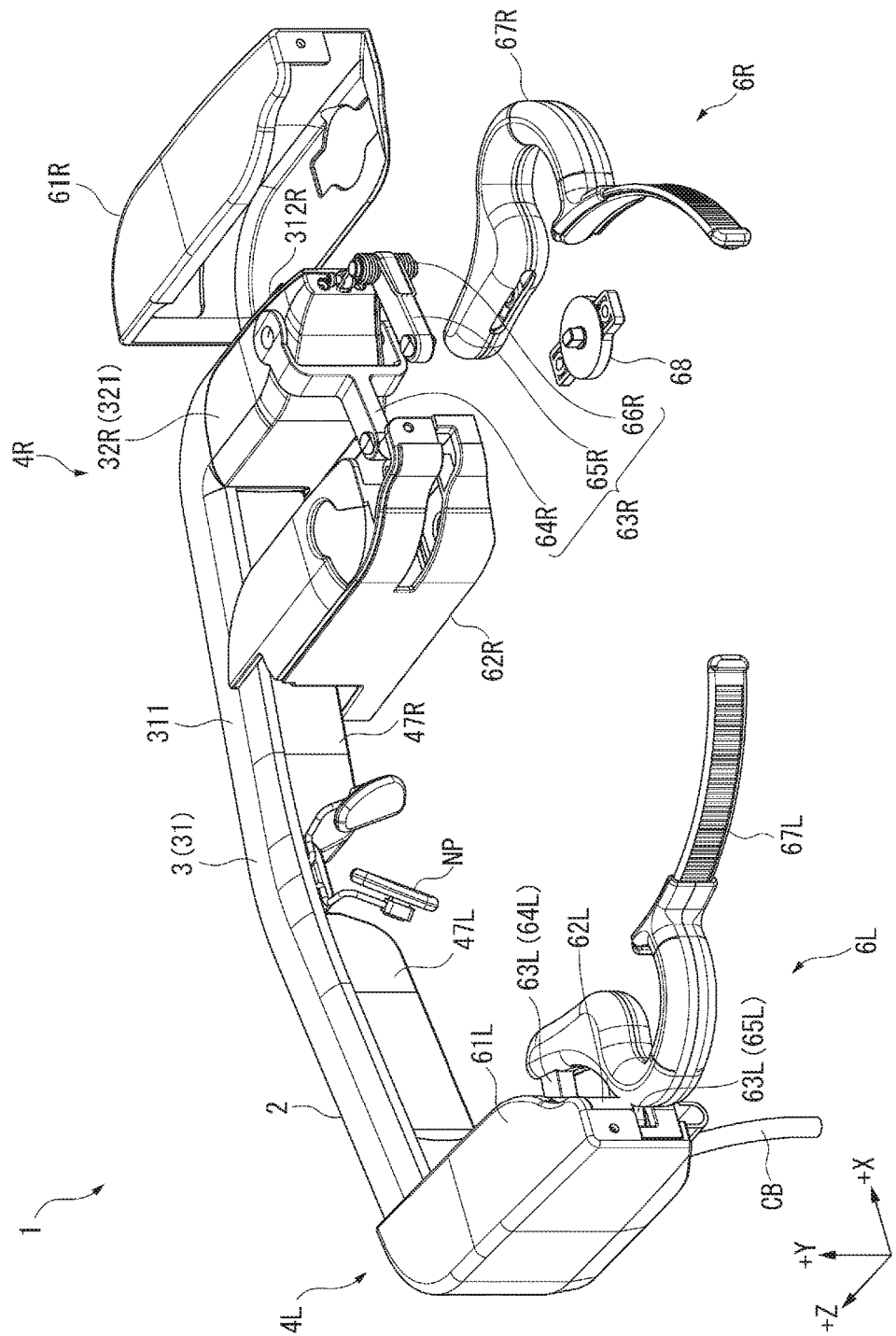
FIG. 11 is a perspective view showing the HMD in which the temple is disassembled in the first embodiment.

FIGS. 10 and 11 are perspective views showing the HMD 1 in which the temple 6R of the temples 6L and 6R is disassembled. FIG. 10 is a perspective view of the HMD 1 viewed from above on the front side. FIG. 11 is a perspective view of the HMD 1 viewed from below on the back side.

The temples 6L and 6R are mounting members for mounting the HMD 1 on the head of the user. The temples 6L and 6R are respectively attached to the case members 32L and 32R that configure the image display section 2. The temples 6L and 6R have one of characteristics in that the contact sections 67L and 67R (equivalent to the left contact section and the right contact section) suspended on the ears of the user are configured to be movable in directions in which the contact sections 67L and 67R move close to and away from the head.

The temple 6R of the temples 6L and 6R includes, as shown in FIGS. 10 and 11, the outer cover 61R, the inner cover 62R, a link mechanism 63R, the contact section 67R, and an attenuating mechanism 68. Note that the temple 6L includes an outer cover 61L, the inner cover 62L, a link mechanism 63L, the contact section 67L, and the attenuating mechanism 68 (not shown in the figure). These components are surface-symmetrical to the temple 6R.

The components included in the temple 6R are explained below. The components of the temple 6L are not explained because the components are the same as the components included in the temple 6R.

Configuration of the Outer Cover

Figure 12:
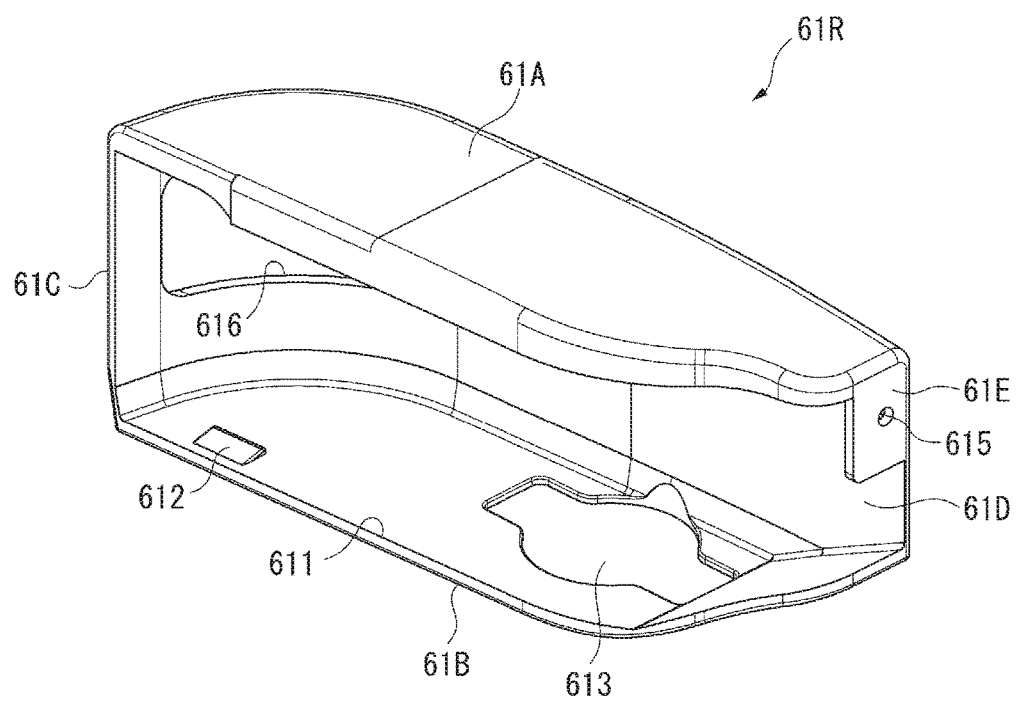
FIG. 12 is a perspective view showing an outer cover in the first embodiment.
Figure 13:
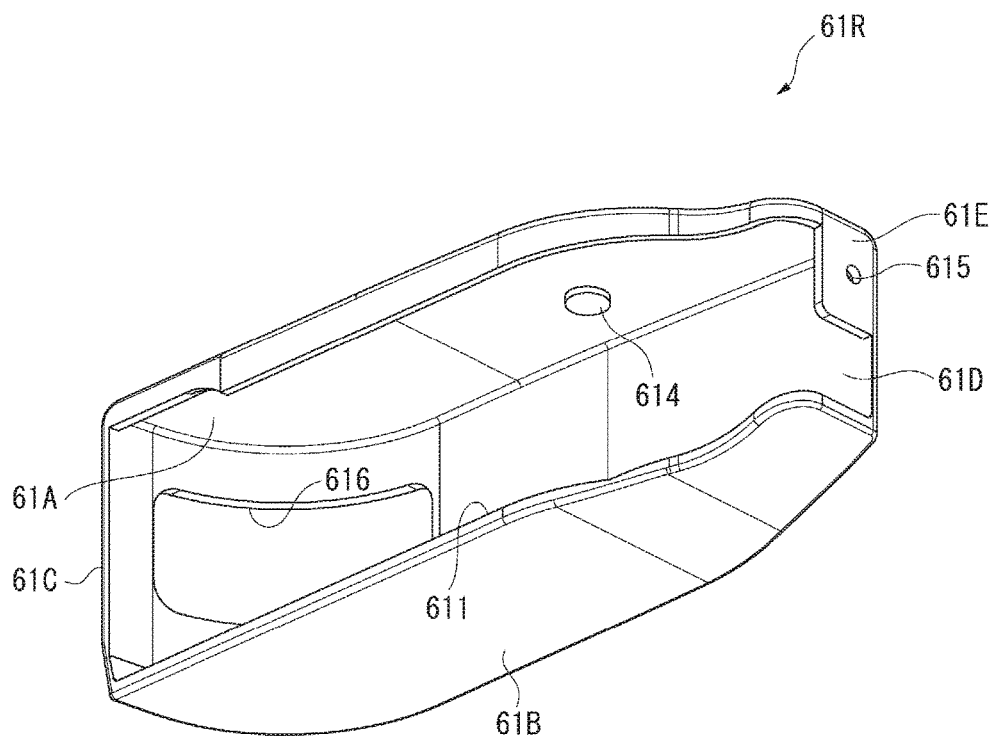
FIG. 13 is a perspective view showing the outer cover in the first embodiment.

FIG. 12 is a perspective view of the outer cover 61R viewed from above on the back side. FIG. 13 is a perspective view of the outer cover 61R viewed from below on the back side.

The outer cover 61R is a cover member that is combined with the inner cover 62R to cover the case member 32R and the side surface section 312R and supports the link mechanism 63R and the attenuating mechanism 68. The outer cover 61R is equivalent to the supporting section according to the aspect of the invention. As shown in FIGS. 12 and 13, the outer cover 61R is formed in a box shape including an upper surface section 61A, a bottom surface section 61B, a front surface section 61C, a side surface section 61D, and a back surface section 61E respectively functioning as exterior sections that configures parts of the exterior of the HMD 1.

The outer cover 61R includes an opening section 611, a protrusion section 612, a concave section 613, a shaft section 614, and a hole section 615.

An end edge of the opening section 611 is formed by the surface sections 61A to 61E. The inner cover 62R attached to the case member 32R is fit in the opening section 611. That is, the inner cover 62R and the case member 32R are disposed in the outer cover 61R.

As shown in FIG. 12, the protrusion section 612 is protrudingly provided in a part on the front side on the inner surface of the bottom surface section 61B. When the inner cover 62R is inserted into the opening section 611, the protrusion section 612 is fit in a concave section 629 (see FIG. 16) formed in the inner cover 62R.

The concave section 613 is formed in a part on the rear side on the inner surface of the bottom surface section 61B in a shape obtained by combining a circle and a rectangle, the centers of which coincide with each other. When the inner cover 62R, to which the attenuating mechanism 68 explained below is attached, is housed in the outer cover 61R, the attenuating mechanism 68 is disposed in the concave section 613.

As shown in FIG. 13, the shaft section 614 is protrudingly provided on the inner surface of the upper surface section 61A. A forming position of the shaft section 614 is a position corresponding to the center of the concave section 613. The shaft section 614 is fit in a hole section 6411 (see FIG. 17) of a first link 64R, which configures the link mechanism 63R, to be a turning axis (a turning axis AX1 explained below) of the first link 64R.

The hole section 615 is formed in the back surface section 61E. A screw (not shown in the figure) for fixing the outer cover 61R to the case member 32R is inserted through the hole section 615. The screw is inserted through the hole section 3212 of the upper case 321 and screwed in the hole section 3123 of the side surface section 312R. That is, the back surface section 61E functions as a fixing section that fixes the outer cover 61R to the case member 32R.

Note that, like the right end portion 311R, the front surface section 61C in the outer cover 61R is formed in a gentle arcuate shape when viewed from above. The front surface section 61C is formed continuously to the side surface section 61D. A substantially rectangular opening section 616 is formed in an arcuate portion of the outer cover 61R. The image pickup device 5 disposed at the right end portion 311R is exposed via the opening section 616. In this embodiment, the image pickup device 5 is not provided in the left end portion 311L (see FIG. 5). Therefore, the opening section 616 is not formed in the outer cover 61L that configures the temple 6L.

Configuration of the Inner Cover

Figure 14:
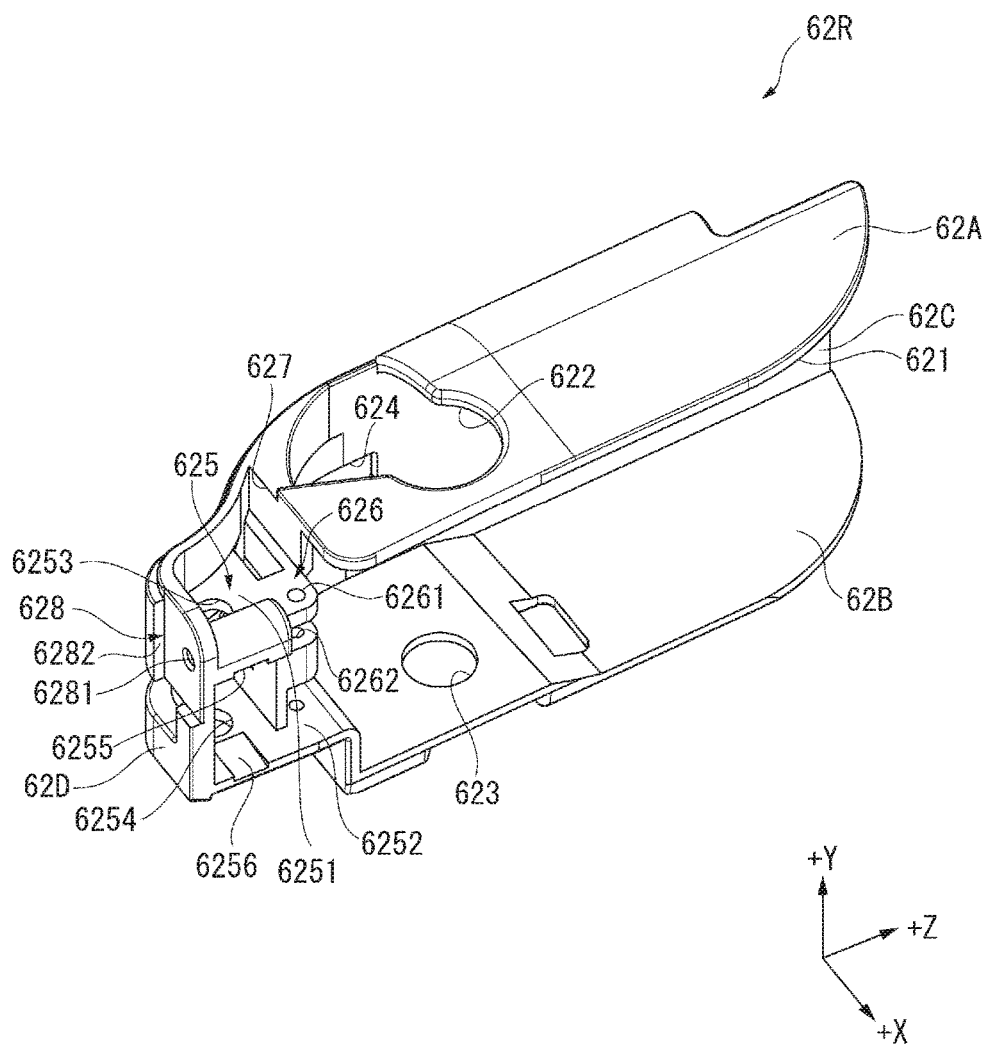
FIG. 14 is a perspective view showing an inner cover in the first embodiment.
Figure 15:
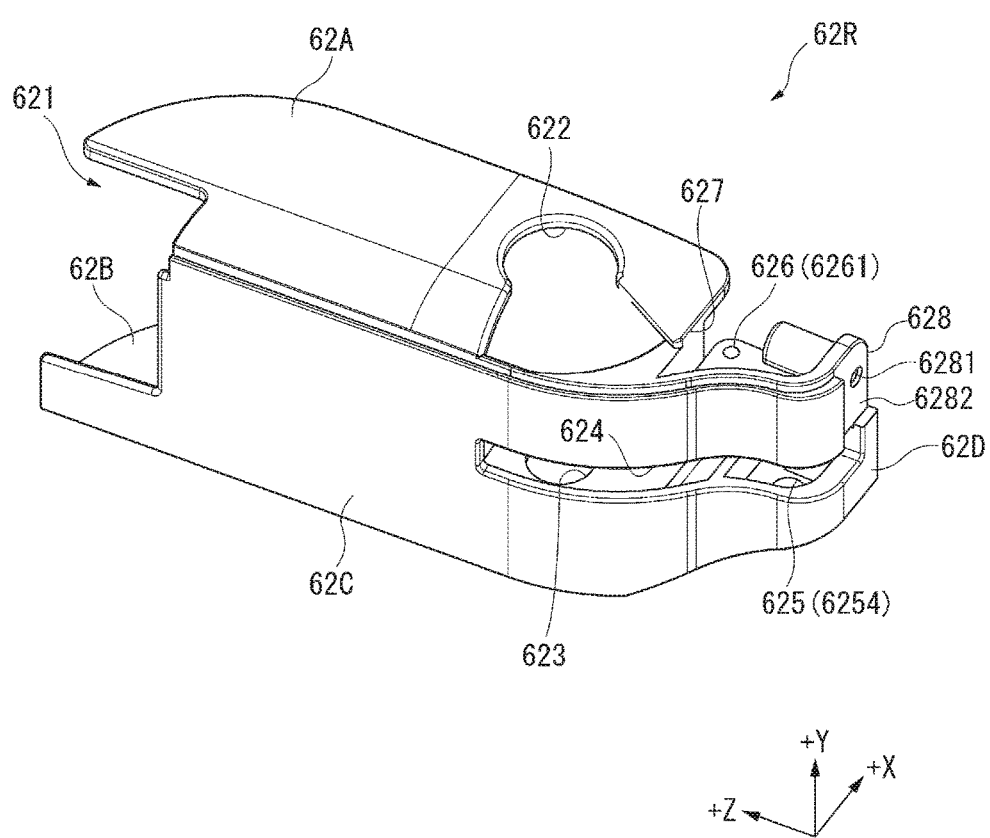
FIG. 15 is a perspective view showing the inner cover in the first embodiment.
Figure 16:
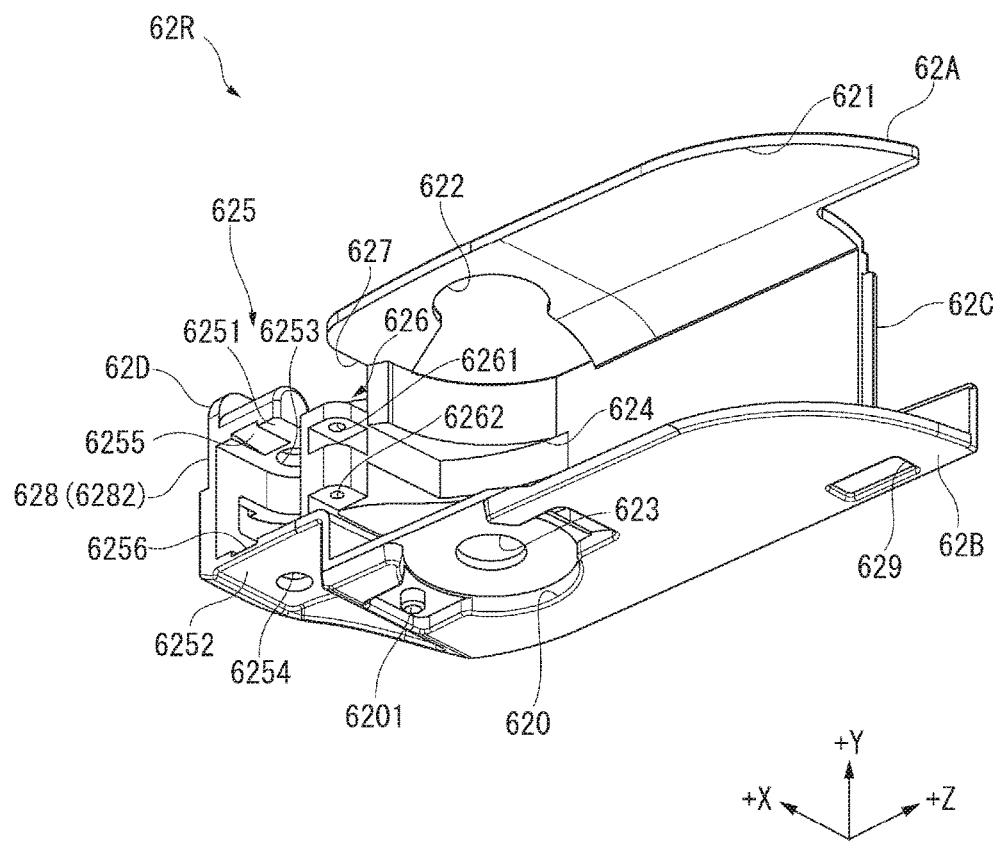
FIG. 16 is a perspective view showing the inner cover in the first embodiment.

FIGS. 14 to 16 are perspective views showing the inner cover 62R. Specifically, FIG. 14 is a perspective view of the inner cover 62R viewed from the right side and above on the back side. FIG. 15 is a perspective view of the inner cover 62R viewed from the left side and above on the back side. FIG. 16 is a perspective view of the inner cover 62R viewed from the right side and below on the front side.

As explained above, the inner cover 62R is combined with the outer cover 61R to function as the supporting section. Besides, the inner cover 62R supports a second link 65R, which configures the link mechanism 63R, and the attenuating mechanism 68. As shown in FIGS. 14 to 16, the inner cover 62R is formed in a box shape including an upper surface section 62A, a bottom surface section 62B, a side surface section 62C, and a back surface section 62D. The side surface section 62C is equivalent to an exterior section that configures a part of the exterior of the HMD 1 in conjunction with the outer cover 61R.

The inner cover 62R includes opening sections 621 to 623, a guide hole 624, a supporting section 625, a fixing section 626, an opening section 627, a fixing section 628, a concave section 629, and a disposing section 620.

As shown in FIGS. 14 and 16, the opening section 621 is an opening section, an end edge of which is formed by the surface sections 62A to 62D, opening to the right side (the outer cover 61R side). The case member 32R is housed in the inner cover 62R via the opening section 621.

As shown in FIGS. 14 to 16, the opening section 622 is located in the upper surface section 62A. The opening section 622 is formed according to a turnable range of the first link 64R, the upper end of which is fit in the shaft section 614 of the outer cover 61R in the link mechanism 63R.

As shown in FIGS. 14 and 16, the opening section 623 is located in the bottom surface section 62B. The opening section 623 is an opening section through which the lower end of the first link 64R is inserted.

As shown in FIGS. 14 to 16, the guide hole 624 is a slit-like hole section that is located in the side surface section 62C and through which an extending section 644 of the first link 64R and a main body section 651 of the second link 65R are inserted. The guide hole 624 is formed long forward and rearward according to a turnable range of each of the first link 64R and the second link 65R. In other words, the turnable ranges of the first link 64R and the second link 65R are defined by an end edge of the guide hole 624 or the opening section 622.

The supporting section 625 is a part that supports the second link 65R and is provided in a part on the rear side in the inner cover 62R. The supporting section 625 includes a pair of plane sections 6251 and 6252 vertically opposed to each other and hole sections 6253 and 6254 and inclined sections 6255 and 6256 formed in the plane sections 6251 and 6252.

The hole sections 6253 and 6254 are hole sections into which the upper end and the lower end of the second link 65R are inserted. The second link 65R is supported to be turnable around the turning axis (a turning axis AX2 explained below) extending along the up-down direction by the hole sections 6253 and 6254.

The inclined sections 6255 and 6256 are inclined sections formed taking into account easiness of insertion of a shaft section 652 of the second link 65R into the hole sections 6253 and 6254. The inclined sections 6255 and 6256 are respectively formed on the right side of the hole sections 6253 and 6254, that is, an opening side of the opening section 621. The inclined sections 6255 and 6256 are inclined such that the dimension in the up-down direction between the inclined sections 6255 and 6256 decreases closer to the hole sections 6253 and 6254. This makes it easy to insert the upper and lower ends of the shaft section 652 of the second link 65R configured by a rod spring into the hole sections 6253 and 6254.

The fixing section 626 is a part that includes a hole section 6261 formed in the plane section 6251 and a screw hole 6262 formed in a position away from the plane section 6251 downward by the dimension in the up-down direction of the fixing section 3121 and fixes the inner cover 62R to the fixing section 3121 of the side surface section 312R to which the case member 32R is attached. In the fixing section 626, a screw S1 (see FIG. 6) is inserted through the hole section 6261 located on the upper side. The screw S1 is screwed in the screw hole 6262 located on the lower side after being inserted through the fixing section 3121. Consequently, the inner cover 62R is fixed to the fixing section 3221.

The opening section 627 is formed in the upper surface section 62A to correspond to the fixing section 626. The opening section 627 is an opening section for inserting the screw S1 into the fixing sections 626 and 3121 from the upward direction in a state in which the fixing section 626 of the inner cover 62R, which covers the case member 32R, is aligned with the fixing section 3121.

As shown in FIGS. 14 and 15, the fixing section 628 is a part that is located in the back surface section 62D and fixes the inner cover 62R to the case member 32R (the upper case 321). The fixing section 628 includes a hole section 6281 and a concave section 6282.

The hole section 6281 is a hole section piercing through the back surface section 62D along the front-rear direction. When the outer cover 61R is assembled to the inner cover 62R combined with the case member 32R (the upper case 321), the hole section 6281 is formed in a position corresponding to the hole sections 3212 (see FIG. 7) and 615. A screw (not shown in the figure) inserted through the hole section 615 is inserted through the hole section 6281. The screw is inserted through the hole section 3212 and screwed in the hole section 3123 (see FIG. 7). Consequently, the outer cover 61R and the inner cover 62R are fixed to the case member 32R.

The concave section 6282 is formed in a substantially rectangular shape around the hole 6281 in the back surface section 62D. When the outer cover 61R is combined with the inner cover 62R, the back surface section 61E (see FIG. 12) of the outer cover 61R is fit in the concave section 6282.

As shown in FIG. 16, the concave section 629 and the disposing section 620 are located on the outer surface of the bottom surface section 62B.

The concave section 629 is located in a substantially rectangular shape in a part on the front side in the bottom surface section 62B. When the inner cover 62R and the outer cover 61R are combined, the protrusion section 612 is inserted into the concave section 629. Consequently, the outer cover 61R can be provisionally fixed to the inner cover 62R.

The disposing section 620 is a concave section located in a part on the rear side on the outer surface of the bottom surface section 62B. Specifically, the disposing section 620 is formed in a position corresponding to the opening section 623. In the disposing section 620, the attenuating mechanism 68 engaging with the first link 64R projecting to the outer surface side of the bottom surface section 62B via the opening section 623 is disposed. A cylindrical projecting section 6210 is provided in the bottom section of the disposing section 620.

Configuration of the Link Mechanism

Figure 17:
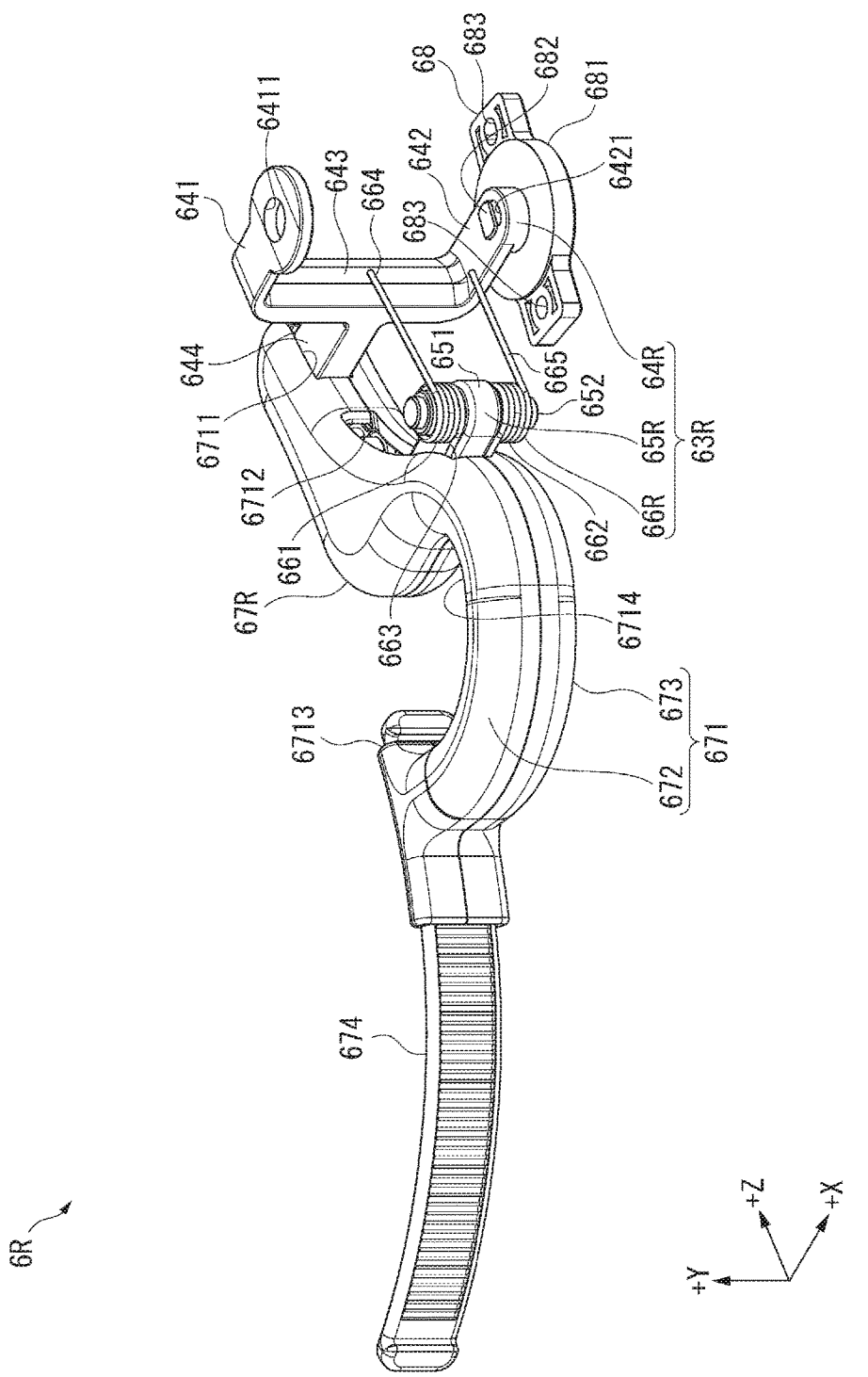
FIG. 17 is a perspective view showing a link mechanism, a contact section, and an attenuating mechanism in the first embodiment.
Figure 18:
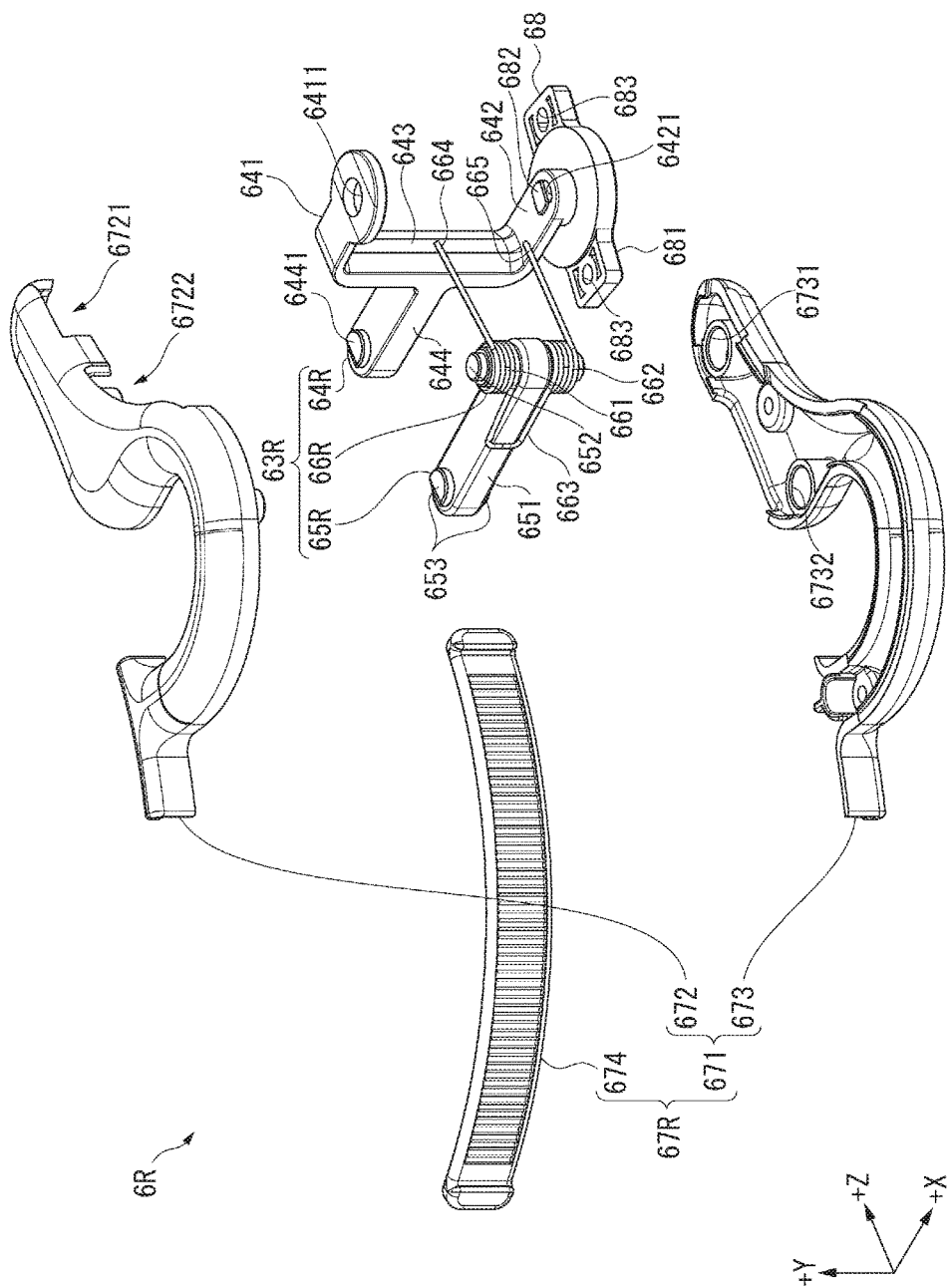
FIG. 18 is a perspective view showing the link mechanism, the contact section, and the attenuating mechanism in the first embodiment.

FIGS. 17 and 18 are perspective views showing the link mechanism 63R, the contact section 67R, and the attenuating mechanism 68 in the temple 6R. FIG. 18 is an exploded perspective view of the contact section 67R.

The link mechanism 63R is turnably supported on one end side by the outer cover 61R and the inner cover 62R to function as a connecting section that connects the contact section 67R attached to the other end and the outer cover 61R and the inner cover 62R functioning as supporting sections. Besides, the link mechanism 63R moves the entire contact section 67R to the left and the right to be brought close to and away from the contact section 67L (in other words, the right temporal region) of the temple 6L. The link mechanism 63R includes, as shown in FIGS. 17 and 18, the first link 64R, the second link 65R, and an urging section 66R.

Configuration of the First Link

The first link 64R is located substantially in the center in the outer cover 61R and the inner cover 62R and is attached to the shaft section 614 of the outer cover 61R and the attenuating mechanism 68, which is fixed to the inner cover 62R, to be turnable around the turning axis AX1 (see FIGS. 19 and 20) extending along the up-down direction. The first link 64R includes opposed sections 641 and 642, a connecting section 643, and an extending section 644.

The opposed sections 641 and 642 are opposed to each other along the up-down direction.

The opposed section 641 located on the upper side includes, at an end portion on the opposite side of the connecting section 643, a hole section 6411 having a substantially cylindrical shape when viewed from above. The shaft section 614 is inserted into the hole section 6411.

The opposed section 642 located on the lower side includes, at an end portion on the opposite side of the connecting section 643, a hole section 6421 having an oval shape in a position corresponding to the hole section 6411 when viewed from above. A shaft section 682 of the attenuating section 68 explained below is inserted into the hole section 6421.

The shaft sections 614 and 682 are inserted into the hole sections 6411 and 6421 in this way, whereby the first link 64R is supported to be turnable around the turning axis AX1 (see FIGS. 19 and 20) and is capable of turning in the forward direction and the rearward direction of the first link 64R (a −D1 direction and a +D1 direction explained below).

The connecting section 643 extends along the up-down direction and connects end portions on the left side in the opposed sections 641 and 642. Therefore, a part formed by the opposed sections 641 and 642 and the connecting section 643 in the first link 64R is formed in a substantially U shape sideways to hold the case member 32R in the up-down direction.

The extending section 644 extends substantially in parallel to the opposed sections 641 and 642 to project from surfaces on the opposite side of surfaces on the connection side of the opposed sections 641 and 642 in the connecting section 643. As shown in FIG. 18, projecting sections 6441 project upward and downward at the distal end portion of the extending section 644. The projecting sections 6441 are inserted into hole sections 6721 and 6731 formed in the contact section 67R. Consequently, the first link 64R and the contact section 67R are integrated.

Configuration of the Second Link

The second link 65R is formed in a substantially T shape sideways when viewed from a side direction. One end of the second link 65R is turnably supported by the supporting section 625. The other end of the second link 65R is connected to the contact section 67R. The second link 65R includes the main body section 651 formed in a bar shape, the shaft section 652 located at one end of the main body section 651, and projecting sections 653 located at the other end of the main body section 651.

The shaft section 652 is provided to project in the up-down direction. The shaft section 652 is configured by the rod spring extendable upward and downward as explained above. The upper end of the shaft section 652 is inserted into the hole section 6253 of the supporting section 625. The lower end of the shaft section 652 is inserted into the hole section 6254. Consequently, the second link 65R is supported by the supporting section 625 to be turnable around the turning axis AX2 (see FIGS. 19 and 20) formed by the shaft section 652 and is turnable in the forward direction and the rearward direction of the second link 65R (a −D2 direction and a +D2 direction explained below).

The projecting sections 653 are respectively formed to project in the up-down direction. The projecting sections 653 are inserted into the hole sections 6722 and 6732 formed in the contact section 67R. Consequently, the second link 65R and the contact section 67R are integrated.

Configuration of the Urging Section

The urging section 66R urges the second link 65R such that an end portion on the projecting section 653 side (an end portion on the contact section 67R side) of the second link 65R is located on the forward side (the −D2 direction side) in the turnable range of the second link 65R and the entire contact section 67R is located on the forward side and on the other temple 7L side and the head side. In this embodiment, the urging section 66R is configured by a torsion coil spring including wound sections 661 and 662, a connecting section 663, and arms 664 and 665.

The wound sections 661 and 662 are respectively parts obtained by winding a wire rod in a coil shape. The wound section 661 is disposed to be wound around a part projecting upward in the shaft section 652. The wound section 662 is disposed to be wound around a part projecting downward in the shaft section 652.

The connecting section 663 is a part that connects the wound sections 661 and 662 and is formed in a substantially U shape sideways. The connecting section 663 is set in contact with a side surface on the rear side among the side surfaces of the main body section 651.

The arms 664 and 665 extend forward from end portions on the opposite side of the connecting section 663 side in the winding sections 661 and 662. The arms 664 and 665 are fixed to the inner cover 62R, whereby the connecting section 663 set in contact with the main body section 651 causes an urging force in the forward direction (the −D2 direction) to act on the main body section 651.

Configuration of the Contact Section

The contact section 67R is set in contact with the head (the temporal region or the back of the head) of the user and suspended on the ear of the user. The contact section 67R is connected to the first link 64R and the second link 65R of the link mechanism 63R. The entire contact section 67R is moved to the front side and a position close to the temple 6L (in other words, the right temporal region) according to forward turning of the links 64R and 65R and moved to the rear side and a position away from the temple 6L according to rearward turning of the links 64R and 65R. The contact section 67R includes a sandwiching member 671 and a contact piece 674 sandwiched by the sandwiching member 671.

The sandwiching member 671 is configured by a pair of sandwiching pieces 672 and 673, which is located in upper and lower parts. As shown in FIG. 17, the sandwiching member 671 includes an opening section 6711 that is formed by concave sections of the sandwiching pieces 672 and 673 and into which an end portion (an end portion on the projecting section 6441 side) of the first link 64R is inserted. The sandwiching member 671 includes an opening section 6712 that is formed by concave sections of the sandwiching pieces 672 and 673 and into which an end portion (an end portion on the projecting section 653 side) of the second link 65R is inserted.

Of the pair of sandwiching pieces 672 and 673, which configure the sandwiching member 671, as shown in FIG. 18, the sandwiching piece 673 located in the lower part includes the hole section 6731 into which the projecting section 6441 on the lower side in the first link 64R inserted via the opening section 6711 is inserted. The sandwiching piece 673 includes the hole section 6732 into which the projecting section 653 on the lower side in the second link 65R inserted via the opening section 6712 is inserted.

Although not shown in detail, in the sandwiching piece 672 located on the upper side, the hole section 6721 into which the projecting section 6441 on the upper side in the first link 64R is inserted and the hole section 6722 into which the projecting section 653 on the lower side in the second link 65R is inserted are formed.

Further, as shown in FIG. 17, the sandwiching member 671 includes, at an end portion on the rearward side, a sandwiching section 6713 formed by the pair of sandwiching pieces 672 and 673. The sandwiching section 6713 sandwiches the contact piece 674.

Note that the sandwiching member 671 includes, substantially in the center, a curved section 6714 curved in an arcuate shape to the outer side (a side away from the temple 6L). The curved section 6714 is a finger hook section on which the user hooks a finger such as an index finger when the user mounts the HMD 1 on the head. The curved section 6714 is a part that moves the contact sections 67R and 67L in directions in which the contact sections 67R and 67L move away from each other and makes it easy to increase the dimension L1.

The contact piece 674 is a tabular body curved in an arcuate shape conformed to the shapes of the temporal region and the back of the head on the disposition side of the contact piece 674 in the head of the user. The contact piece 674 is set in contact with the temporal region and the back of the head and suspended on the ear. A dimension in the up-down direction of the contact piece (the width direction of the contact piece 674) and a dimension in the left-right direction (the thickness direction of the contact piece 674) are set smaller than the respective dimensions of the sandwiching member 671. Since the contact piece 674 is apart set in direct contact with the temporal region and the back of the head, an elastic member such as a cushion may be provided on an end face on the temporal region side.

Not only the contact piece 674 but also a part of the sandwiching member 671 may be set in contact with the head.

The contact section 67R is combined with the first link 64R and the second link 65R to thereby be urged to be located on the forward side as explained above by an urging force of the urging section 66R acting on the second link 65R. That is, the contact piece 674 in the contact section 67R is urged by the urging force in a direction in which the contact piece 674 moves close to the head side of the user.

Configuration of the Attenuating Mechanism

As shown in FIGS. 17 and 18, the attenuating mechanism 68, which configures the temple 6R, engages with the opposed section 642 of the first link 64R. When the contact piece 674 moves, with an urging force of the urging section 66R acting on the second link 65R, in a direction in which the contact piece 674 moves close to the head side, the attenuating mechanism 68 attenuates a turning force of the first link 64R (a moving force of the contact section 67R) connected to the second link 65R via the sandwiching member 671 and prevents sudden movement of the contact piece 674.

The attenuating mechanism 68 includes a main body section 681, the shaft section 682 projecting from the main body section 681, and a pair of hole sections 683.

The shaft section 682 is inserted into the hole section 6421 of the opposed section 642. The shaft section 682 is supported by the main body section 681 to be turnable around a turning axis on the same axis as the turning axis AX1 of the first link 64R (refer to FIGS. 19 and 20). The turning force of the first link 64R by the urging force is attenuated by rotation resistance of the shaft section 682.

The pair of holes 683 is formed in positions across the shaft section 682 when viewed from above in the main body section 681. A projecting section 6201 protrudingly provided in the disposing section 620 of the inner cover 62R is inserted into one hole section 683. Consequently, turning of the main body section 681 (the attenuating mechanism 68) involved in the turning of the shaft section 682 is prevented and the attenuating mechanism 68 is positioned in the disposing section 620.

Operation of the Temple During HMD Mounting

Figure 19:
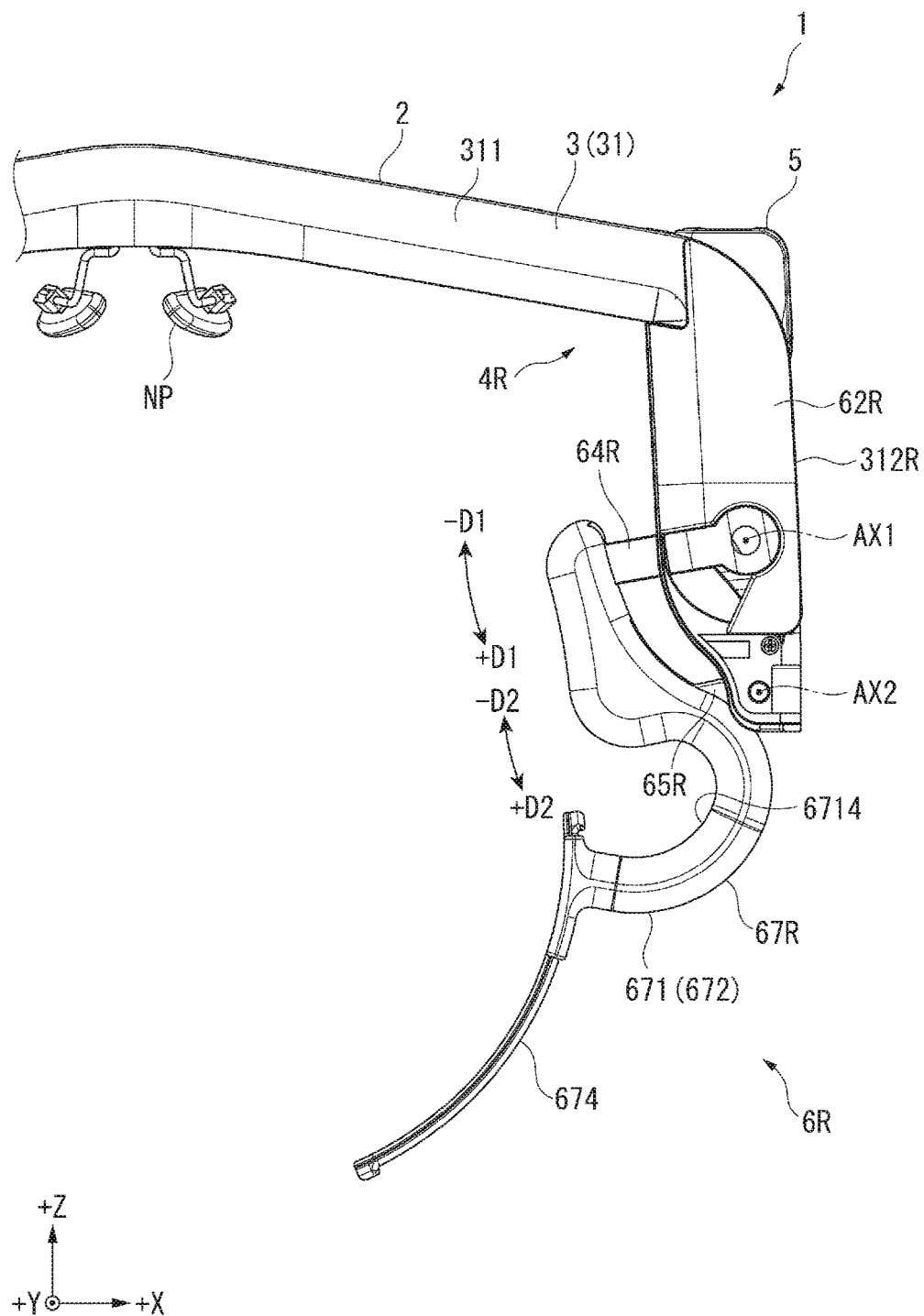
FIG. 19 is a plan view showing a moving state of the contact section in the first embodiment.
Figure 20:
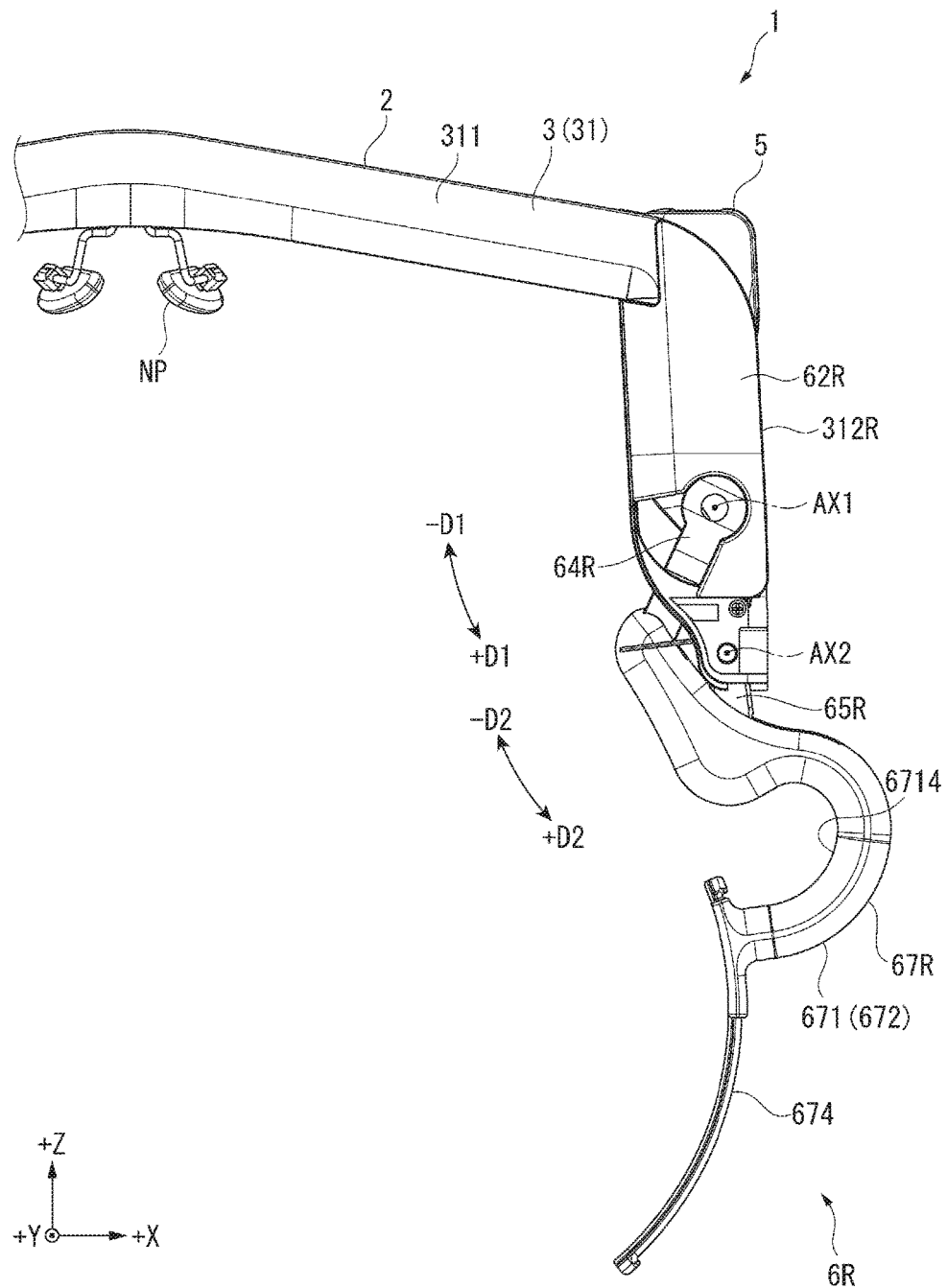
FIG. 20 is a plan view showing a moving state of the contact section in the first embodiment.

FIGS. 19 and 20 are plan views showing a moving state of the contact section 67R of the temple 6R. Specifically, FIG. 19 is a diagram of the HMD 1 viewed from above in a state in which the entire contact section 67R is located in a first position where the contact section 67R is closest to the temple 6L. In the figure, the temple 6R, the outer cover 61R of which is not shown in the figure, is enlarged and shown in a state shown in FIG. 3. FIG. 20 is a diagram of the HMD 1 viewed from above in a state in which the entire contact section 67R is located in a second position where the contact section 67R is most away from the temple 6L. In the figure, the temple 6R, the outer cover 61R of which is not shown in the figure, is enlarged and shown in a state shown in FIG. 4.

In the temple 6R having the configuration explained above, the contact section 67R is moved as explained below.

In a state in which the HMD 1 is not mounted on the head HE, as shown in FIG. 19, the second link 65R is urged by the urging section 66R in, of the +D2 direction and the −D2 direction (the opposite direction of the +D2 direction), which are turning directions around the turning axis AX2 extending along the up-down direction, the −D2 direction forward in the turnable range of the second link 65R. For this reason, the entire contact section 67R combined with the second link 65R is located on the front side. In this case, the first link 64R combined with the contact section 67R is located in, of the +D1 direction and the −D1 direction (the opposite direction of the +D1 direction), which are turning directions around the turning axis AX1 extending along the up-down direction, the −D1 direction forward in the turnable range of the first link 64R. In this state, the entire contact section 67R is located in the first position where the contact section 67R is closest to the temple 6L and the head. Although not shown in the figure, in the temple 6L as well, the entire contact section 67L is located in the first position where the contact section 67L is closest to the temple 6R and the head by the urging force of the urging section.

In a state in which the contact sections 67L and 67R are located in the first positions is a state in which the dimension L1 (see FIGS. 3 and 4) is the shortest. In this embodiment, the dimension L1 in the state is set to 128 mm to match the head of a child.

Note that the turnable ranges of the first link 64R and the second link 65R are set by an end edge of the opening section 622 or an end edge of the guide hole 624, which is formed in a fan shape in the inner cover 62R and on the inner side of which a part of the first link 64R is disposed. The same applies to a first link 64L and a second link 65L.

In the state in which the entire contact sections 67L and 67R are located in the first positions, when forces are applied to the contact sections 67L and 67R by left and right fingers or the like hooked on the curved section 6714 in directions in which the contact sections 67L and 67R move away from each other, in the temple 6R, the links 64R and 65R are respectively turned in the +D1 and +D2 directions rearward in the turnable ranges of the links 64R and 65R. In this case, as shown in FIG. 20, the entire contact section 67R is moved rearward to a position away from the temple 6L. Although not shown in the figure, in the temple 6L as well, when the links 64L and 65L are respectively turned in directions rearward in the turnable ranges of the links 64L and 65L, the entire contact section 67L is moved rearward to a position away from the temple 6R.

In this way, the positions of the contact sections 67L and 67R at the time when the entire contact sections 67L and 67R are in the rearmost positions and spaced apart from the other temple most are the second positions. A state in which the entire contact sections 67L and 67R are located in the second positions is a state in which the dimension L1 is the longest. In this embodiment, the dimension L1 in this state is set to 170 mm to match an adult having a relatively large head.

In this way, the temples 6L and 6R are configured such that the contact sections 67L and 67R are movable in ranges of the first positions to the second positions.

Note that, as shown in FIGS. 3 and 4, the contact sections 67L and 67R turn around engaging positions with the first links 64R and 64L from the first positions toward the second positions. Therefore, the contact sections 67L and 67R (the contact pieces 674) in the second positions are in a state in which the contact sections 67L and 67R are opened with respect to the temple on the opposite side (a state in which an inclination angle with respect to the +Z direction is large). However, not only this, but the contact sections 67L and 67R may be translated without turning.

When the head is disposed in a position where the head is sandwiched by the temples 6L and 6R and forces in the directions in which the contact sections 67L and 67R move away from each other are reduced, in the temple 6R, the links 64R and 65R are respectively turned in the −D1 and −D2 directions by the urging force of the urging section 66R. Consequently, the contact section 67R (the contact piece 674) is set in contact with the right temporal region and the back (specifically, the right side part in the back) of the head. In the temple 6L as well, the contact section 67L (the contact piece 674) is moved in the same manner and set in contact with the left temporal region and the back (specifically, the left side part in the back) of the head. In other words, the entire contact sections 67L and 67R are moved in a direction in which the contact sections 67L and 67R move close to the head until the contact sections 67L and 67R come into contact with the head.

Since the urging forces by the urging sections (the urging section 66R in the contact section 67R) are caused to act on the contact sections 67L and 67R, the head is sandwiched by the contact sections 67L and 67R. Note that, as explained above, when the contact sections 67L and 67R are moved by the urging forces, moving forces are attenuated by the attenuating mechanism 68. Therefore, sudden movement of the contact sections 67L and 67R is prevented.

Effects of the First Embodiment

With the HMD 1 according to this embodiment explained above, effects explained below can be achieved.

The outer cover 61R and the inner cover 62R functioning as the right supporting section support the first link 64R and the second link 65R and support the contact section 67R (the target contact section) connected to the links 64R and 65R. The entire contact section 67R is enabled to move between the first position and the second position respectively by the links 64R and 65R. The outer cover 61L and the inner cover 62L functioning as the left supporting section support the first link 64L and the second link 65L and support the contact section 67L (the target contact section) connected to the links 64L and 65L. The entire contact section 67L is enabled to move between the first position and the second position respectively by the links 64L and 65L.

The dimension L1 in the left-right direction between the contact sections 67L and 67R is larger when the entire contact sections 67L and 67R are respectively located in the second positions than when the contact sections 67L and 67R are respectively located in the first positions. Consequently, the head of the user is located between the contact sections 67L and 67R, whereby it is possible to surely set the contact sections 67L and 67R in contact with positions (temporal regions) corresponding to the sizes of heads having different sizes in the left-right direction. Therefore, it is possible to prevent contact areas of the head and the contact sections 67L and 67R from changing according to the size of the head and maintain the contact areas substantially constant. Therefore, it is possible to stably mount the HMD 1 on the head.

Note that, even when one contact section of the contact sections 67L and 67R is fixed and the entire other contact section is configured to be movable by the configuration explained above, since the entire other contact section is movable in a direction in which other contact section moves close to and away from the head, it is possible to achieve the effects.

The size of the head is different depending on a user. As the size of the head, not only the dimension in the left-right direction but also the dimension in the front-back direction is different depending on a user. That is, the dimension in the left-right direction and the dimension in the front-back direction of the head are in a proportional relation. For this reason, when the position of the face is the same, the position of the back of the head and the positions of the ears slant to the rear side according to the size of the head. The left and right contact sections 67L and 67R have a curved shape in contact with the temporal regions to the back of the head. Therefore, in a configuration in which the entire contact sections 67L and 67R are moved only in the left-right direction, although the contact sections 67L and 67R can be set in contact with the temporal regions, it is sometimes difficult to appropriately set the contact sections 67L and 67R in contact with the temporal regions and the back of the head. Since the left and right contact sections 67L and 67R are suspended on the ears of the user, in the configuration in which the entire contact sections 67L and 67R are moved only in the left-right direction, it is sometimes difficult to appropriately suspend the contact sections 67L and 67R on the ears.

On the other hand, the contact section 67R is connected to the first link 64R and the second link 65R respectively supported to be turnable around the turning axis AX1 (the first turning axis) and the turning axis AX2 (the second turning axis) extending along the up-down direction. Similarly, the contact section 67L is connected to the first link 64L and the second link 65L respectively supported to be turnable around the turning axes extending along the up-down direction. Consequently, it is possible to move the entire contact sections 67L and 67R in the left-right direction and the front-back direction according to the turning of the links 64L, 65L, 64R, and 65R. For this reason, by turning the links 64L, 65L, 64R, and 65R to the front side, it is possible to move the entire contact sections 67L and 67R to the front side and positions where the contact sections 67L and 67R are close to the other contact section and the head. By turning the links 64L, 65L, 64R, and 65R to the rear side, it is possible to move the entire contact sections 67L and 67R to the rear side and positions where the contact sections 67L and 67R are away from the other contact section and the head. Consequently, it is possible to move the entire left and right contact sections 67L and 67R according to the heads of the users having different sizes in the front-back and left-right directions. Therefore, since it is possible to make it easy to set the entire left and right contact sections 67L and 67R in contact with appropriate positions in the head, it is possible to make it easy to stably mount the HMD 1 on the head.

Note that, even when one contact section of the contact sections 67L and 67R is fixed and the entire other contact section is configured to be movable by the configuration explained above, the entire other contact section is movable not only in the left-right direction but also in the front-back direction. Therefore, it is possible to achieve the effects.

The temple 6R includes the urging section 66R that urges the second link 65R in a turning direction in which the entire contact section 67R is located in the first position. Although not shown in the figure, the temple 6L also includes the urging section that urges the second link 65L in a turning direction in which the entire contact section 67L is located in the first position. Consequently, the contact sections 67L and 67R are urged by the urging sections (e.g., the urging section 66R) in a direction in which the dimension L1 decreases. Therefore, it is possible to maintain a state in which the contact sections 67L and 67R in contact with the head and sandwich the head with the contact sections 67L and 67R. Therefore, it is possible to more stably mount the HMD 1 on the head.

Note that, even when one contact section of the contact sections 67L and 67R is fixed and the entire other contact section is configured to be movable by the configuration explained above, the entire other contact section is urged to the head side. Therefore, it is possible to achieve the effects.

The temple 6R includes the attenuating mechanism 68 that attenuates an urging force by the urging section 66R. Although not shown in the figure, the temple 6L includes the attenuating mechanism 68 that attenuates an urging force by the urging section. Consequently, even when the urging forces are strong, it is possible to prevent, with the attenuating mechanism 68, the contact sections 67L and 67R from suddenly moving. Therefore, it is possible to gently set the contact sections 67L and 67R in contact with the head.

In the temple 6R, the outer cover 61R and the inner cover 62R respectively functioning as the right supporting section are combined with each other. The outer cover 61R includes the upper surface section 61A, the bottom surface section 61B, the front surface section 61C, the side surface section 61D, and the back surface section 61E functioning as the exterior sections that configure a part of the exterior of the HMD 1. The inner cover 62R includes the side surface section 62C functioning as the exterior section. Consequently, by attaching the covers 61R and 62R, in which the link mechanism 63R, the contact section 67R, and the attenuating mechanism 68 are provided, to the outer side of the image display section 2, it is possible to configure the HMD 1 that can achieve the effects. Therefore, it is possible to simplify a manufacturing process of the HMD 1. The same applies to the temple 6L.

In the outer cover 61R and the inner cover 62R, the upper surface section 61A, the bottom surface section 61B, and the front surface section 61C, the side surface section 61D, the back surface section 61E, and the side surface section 62C respectively functioning as the exterior sections cover the sides, the top, and the bottom of the case member 32R that configures the image display section 2. Consequently, by attaching the covers 61R and 62R to hold the case member 32R, it is possible to easily configure the HMD 1 that achieves the effects. Since the top and the bottom and the left and the right of the case member 32R are covered, it is possible to increase the strength of the HMD 1.

When mounting the HMD on the head, the user often grips a relatively thin part and mounts the HMD. On the other hand, the contact piece 674 located rearward in the contact section 67R is thinner than the sandwiching member 671 functioning as the main body section. Consequently, it is possible to make it easy for the user to grip a position that the user should grip. Therefore, it is possible to make it easy to wear the HMD 1.

A dimension in the left-right direction in the head of a child is approximately 128 mm. A dimension in the left-right direction in the head of an adult having a relatively large head is approximately 170 mm.

On the other hand, the outer cover 61L and the inner cover 62L and the outer cover 61R and the inner cover 62R movably support the entire contact sections 67L and 67R with the first links 64L and 64R and the second links 65L and 65R such that the dimension L1 in the left-right direction between the contact sections 67L and 67R is in a range of 128 mm or more and 170 mm or less. Consequently, it is possible to stably mount the HMD 1 on the heads of a wide variety of users ranging from children to adults. Therefore, it is possible to further improve universality of the HMD 1.

Second Embodiment

A second embodiment of the invention is explained.

An HMD according to this embodiment includes the same components and functions as the HMD 1. However, the configuration of temples is different. Note that, in the following explanation, the same or substantially same portions as the portions explained above are denoted by the same reference numerals and signs and explanation of the portions is omitted.

Figure 21:
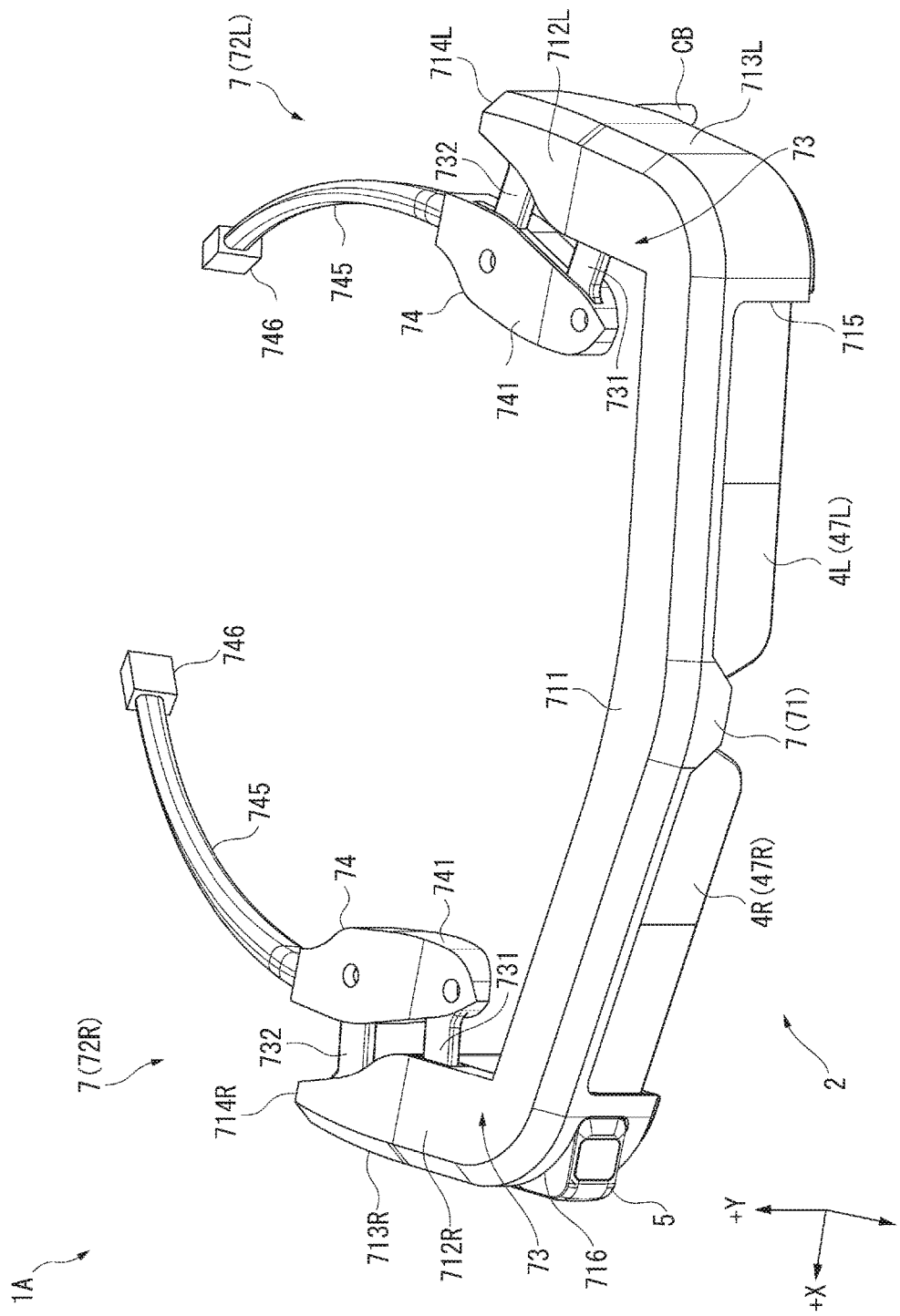
FIG. 21 is a perspective view showing the exterior of an HMD according to a second embodiment of the invention.
Figure 22:
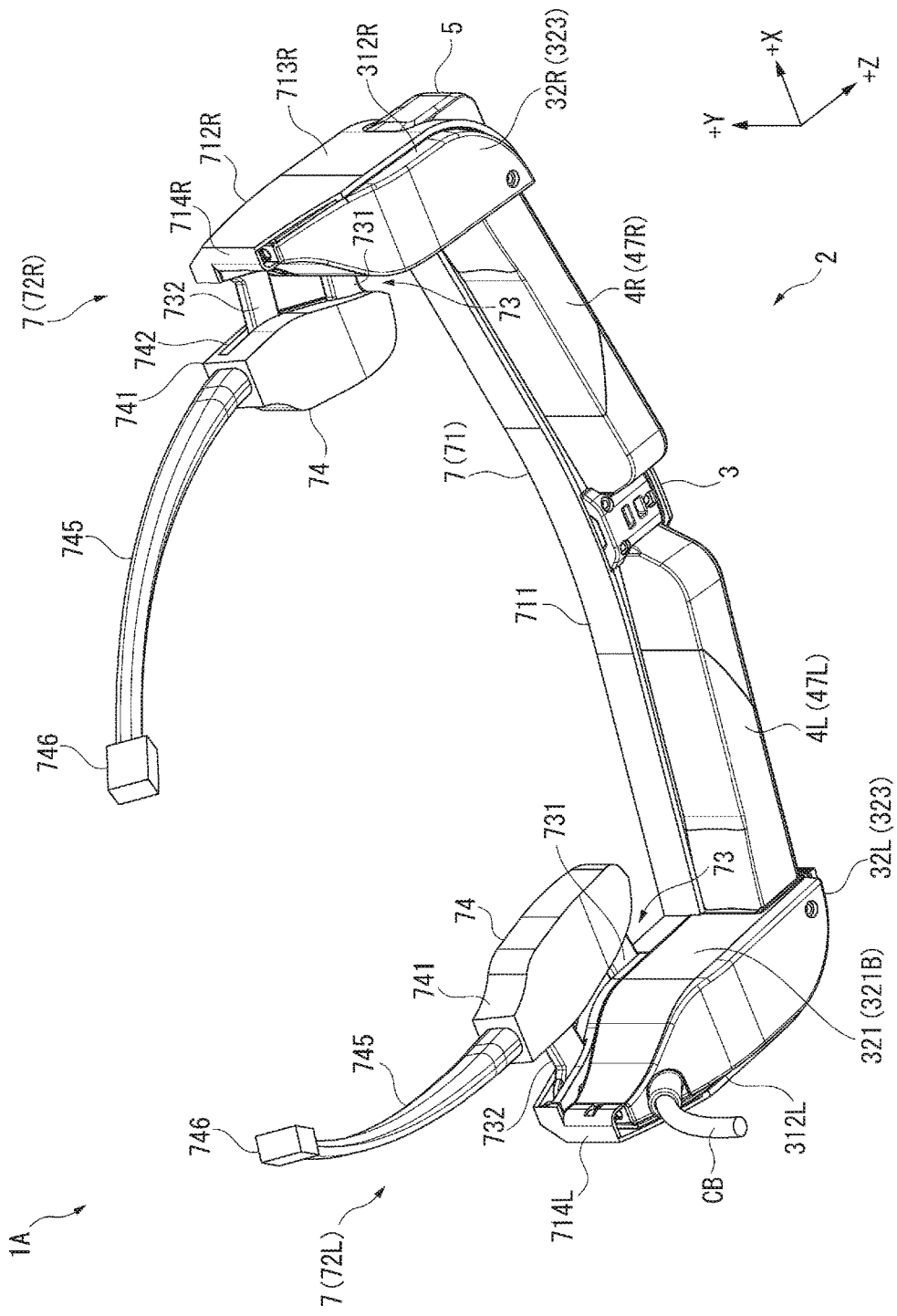
FIG. 22 is a perspective view showing the exterior of the HMD in the second embodiment.
Figure 23:
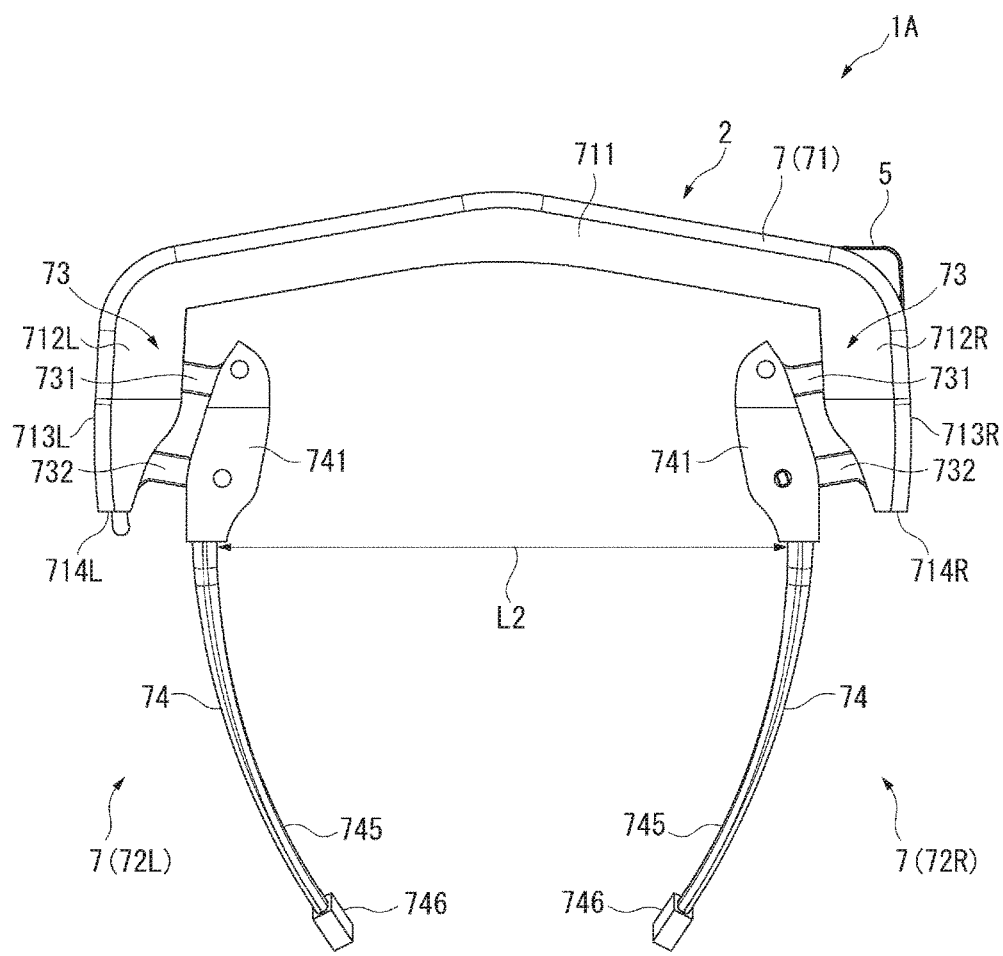
FIG. 23 is a plan view showing the HMD in a state in which the dimension between temples is reduced most in the second embodiment.
Figure 23:
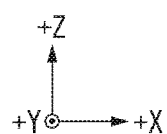
Figure 24:
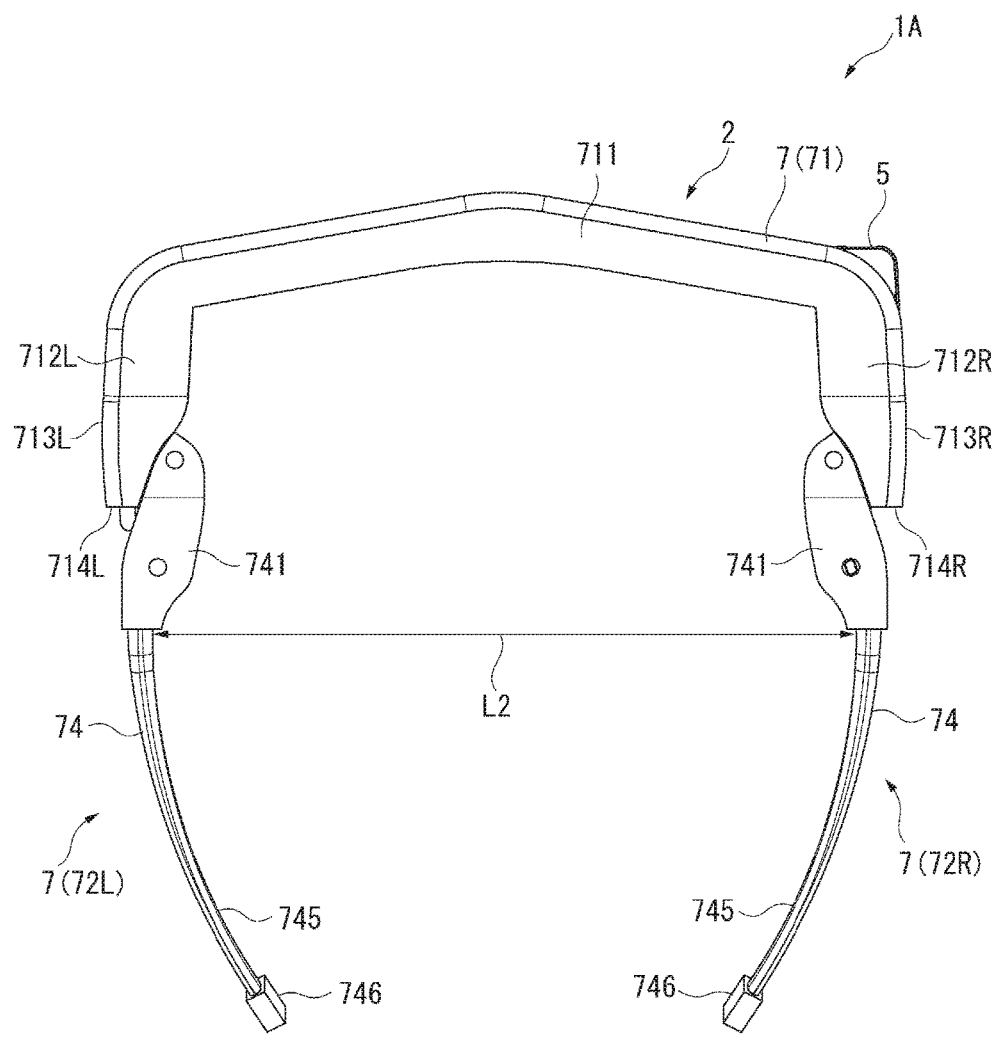
FIG. 24 is a plan view showing the HMD in a state in which the dimension between the temples is increased most in the second embodiment.

FIGS. 21 to 24 are diagrams showing the exterior of an HMD 1A according to this embodiment. Specifically, FIGS. 21 and 22 are respectively perspective views of the HMD 1A viewed from above on the front side and below on the back side. FIG. 23 is a plan view of the HMD 1A viewed from above in a state in which a dimension L2 between a left temple 72L and a right temple 72R is reduced most. FIG. 24 is a plan view of the HMD 1A viewed from above in a state in which the dimension L2 is increased most.

As shown in FIGS. 21 to 24, the HMD 1A according to this embodiment includes the same components and functions as the HMD 1 except that the HMD 1A includes a temple 7 instead of the temples 6L and 6R. As shown in FIGS. 23 and 24, as one characteristic of the HMD 1A, the HMD 1A is configured such that entire contact sections 726 of a right temple 72R and a left temple 72L, which configure the temple 7, are movable in directions in which contact sections 726 move away from each other and the dimension L2 between the entire contact sections 726 is adjusted according to the size of the head of a user, whereby the HMD 1A is configured to be mountable irrespective of the size of the head. Like the dimension L1, the dimension L2 is not the dimension between specific parts in the left and right contact sections 726 and is the dimension between parts spaced apart from each other most in the left-right direction in the contact sections 726 moved to certain positions.

The configuration of the temple 7 is explained below.

Configuration of the Temple

Figure 25:
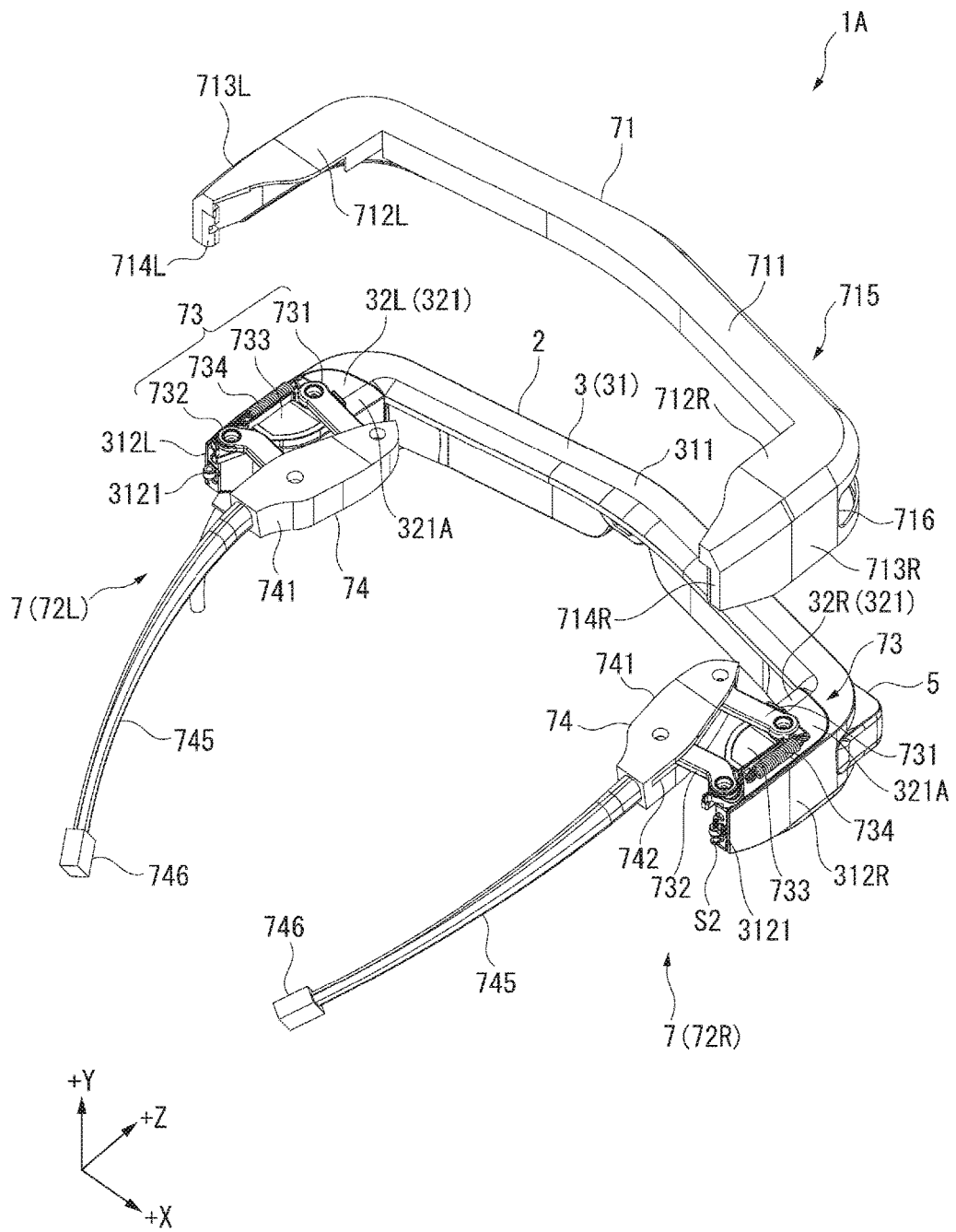
FIG. 25 is a perspective view showing the HMD in which a cover member is separated in the second embodiment.

FIG. 25 is a perspective view showing the HMD 1A in which a cover member 71, which configures the temple 7, is separated.

Like the temples 6L and 6R, the temple 7 is a mounting member for mounting the HMD 1A (the image display section 2) on the head of the user. The temple 7 is attached to the image display section 2 to cover the image display section 2 (the frame main body 31 and the case members 32L and 32R) from above. The temple 7 includes, as shown in FIG. 25, the cover member 71 and the left temple 72L and the right temple 72R supported by the cover member 71.

The temple 7 is configured such that, in the left temple 72L and the right temple 72R, the entire contact sections 74 set in contact with the left and right temporal regions of the user are movable in the front-back direction and directions in which the contact sections 74 move close to and away from the temples on the opposite side of the temples 72L and 72R and the head.

Configuration of the Cover Member

Figure 26:
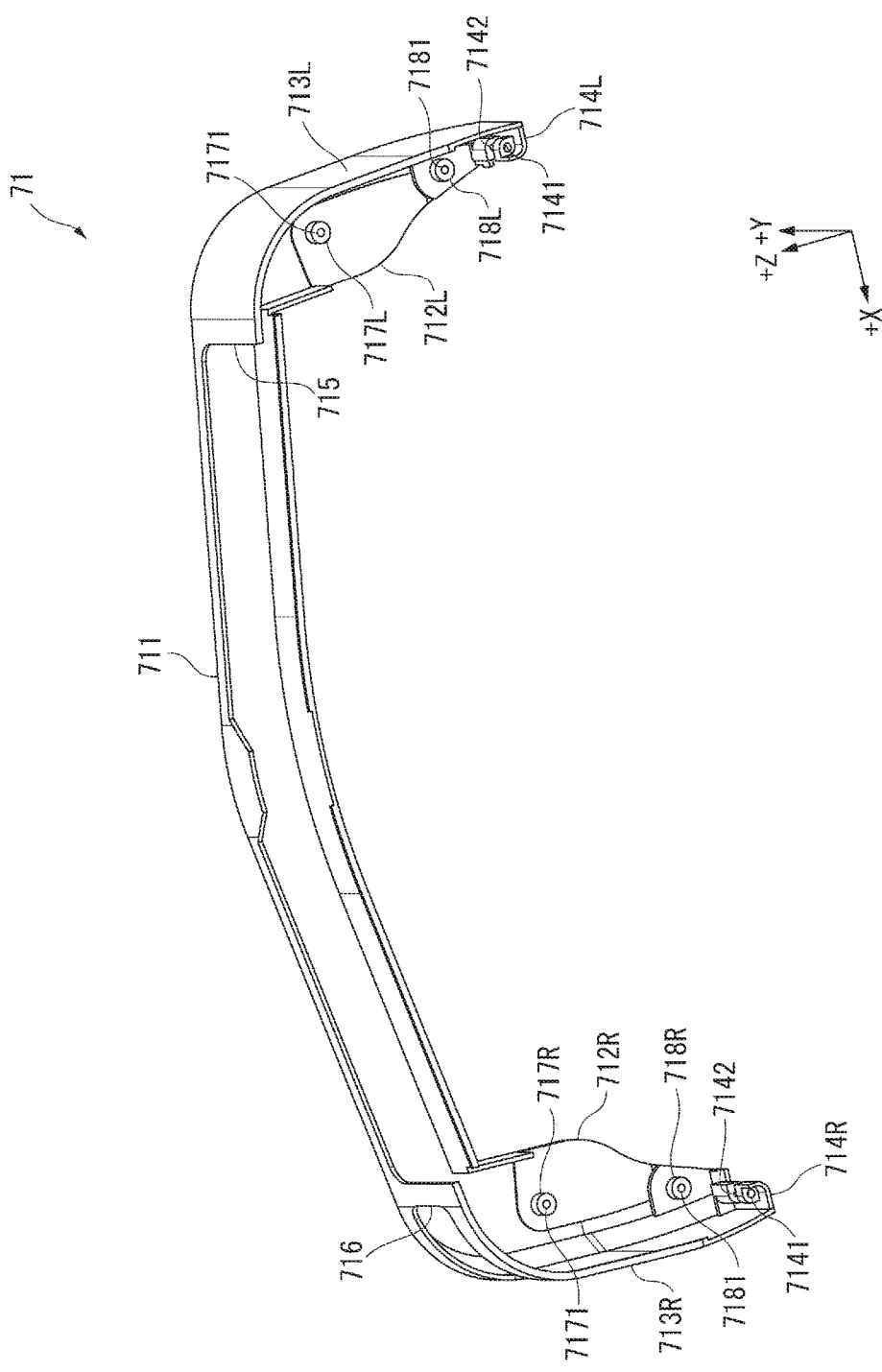
FIG. 26 is a perspective view showing the cover member in the second embodiment.

FIG. 26 is a perspective view of the cover member 71 viewed from below on the front side.

The cover member 71 is formed in a substantially U shape and fixed to the case members 32L and 32R to cover the front section 311 and the case members 32L and 32R from above and cover the side surface sections 312L and 312R from the outer side.

The cover member 71 includes, as shown in FIGS. 25 and 26, a front section 711, extending sections 712L and 712R, side surface sections 713L and 713R, fixing sections 714L and 714R, a concave section 715, an opening section 716, first shaft sections 717L and 717R, and second shaft sections 718L and 718R. The sections are integrally formed.

The front section 711 covers the front section 311 of the frame main body 31 from above.

The extending sections 712L and 712R extend rearward from a left end portion and a right end portion in the front section 711. The extending sections 712L and 712R cover upper surface sections of the case members 32L and 32R (upper surface sections 321A of the upper cases 321) from above.

The side surface sections 713L and 713R respectively cover the side surface sections 312L and 312R from the outer side (the opposite side of the head side of the user).

That is, the front section 711, the extending sections 712L and 712R, and the side surface sections 713L and 713R are equivalent to exterior sections that configure a part of the exterior of the HMD 1A.

As shown in FIG. 26, of the fixing sections 714L and 714R, the fixing section 714L is located at the rear end of each of the extending section 712L and the side surface section 713L and the fixing section 714R is located at the rear end of each of the extending section 712R and the side surface section 713R. The fixing sections 714L and 714R include hole sections 7141 and screw holes 7142 corresponding to the left and right fixing sections 3121. Screws S2 (see FIG. 25) inserted through the hole sections 7141 and the fixing sections 3121 from below are screwed in the screw holes 7142, whereby the cover member 71 is fixed to the frame 3 (the frame main body 31 and the case members 32L and 32R).

As shown in FIG. 26, the concave section 715 is formed on the front surface in the front section 711 and exposes the light guide members 47L and 47R supported by the frame main body 31.

The opening section 716 exposes the image pickup device 5.

The first shaft sections 717L and 717R are respectively protrudingly provided in a cylindrical shape on the lower surfaces of the extending sections 712L and 712R. The first shaft section 717L is inserted into a first link 731 of the left temple 72L to be a turning axis of the first link 731. Similarly, the first shaft section 717R is inserted into the first link 731 of the right temple 72R to be a turning axis AX3 (see FIGS. 29 and 30) of the first link 731. Screw holes 7171 extending along the axial directions of the first shaft sections 717L and 717R are respectively formed in the first shaft sections 717L and 717R.

The second shaft sections 718L and 718R are respectively protrudingly provided in a cylindrical shape further rearward than the first shaft sections 717L and 717R on the lower surfaces of the extending sections 712L and 712R. The second shaft section 718L is inserted into a second link 732 of the left temple 72L to be a turning axis of the second link 732. Similarly, the second shaft section 718R is inserted into the second link 732 of the right temple 72R to be a turning axis AX4 (see FIGS. 29 and 30) of the second link 732. Screw holes 7181 are respectively formed in the second shaft sections 718L and 718R as well.

That is, the cover member 71 configures a right supporting section that supports the right temple 72R and a left supporting section that supports the left temple 72L.

Configuration of the Right Temple

Figure 27:
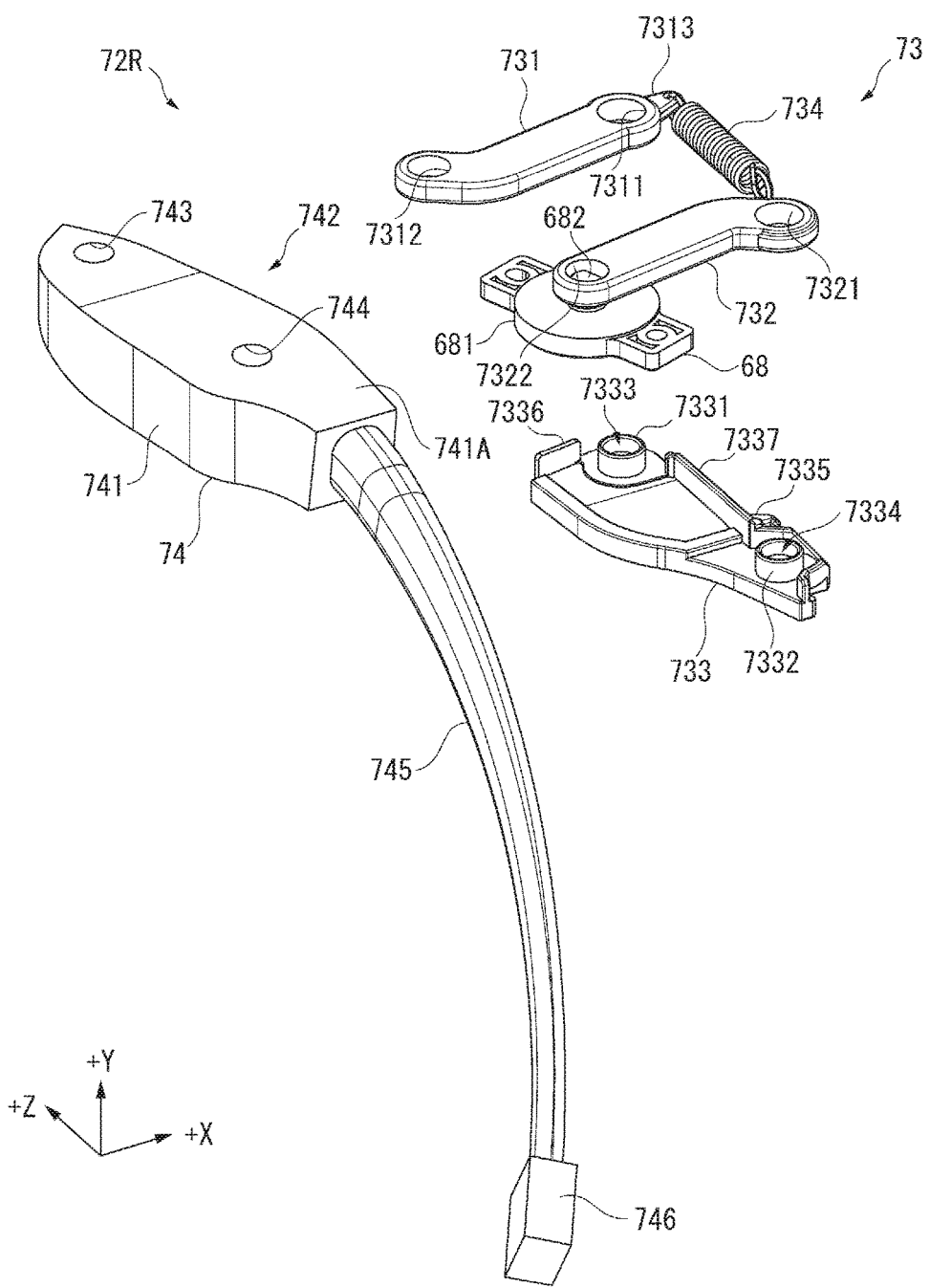
FIG. 27 is an exploded perspective view showing a right temple in the second embodiment.
Figure 28:
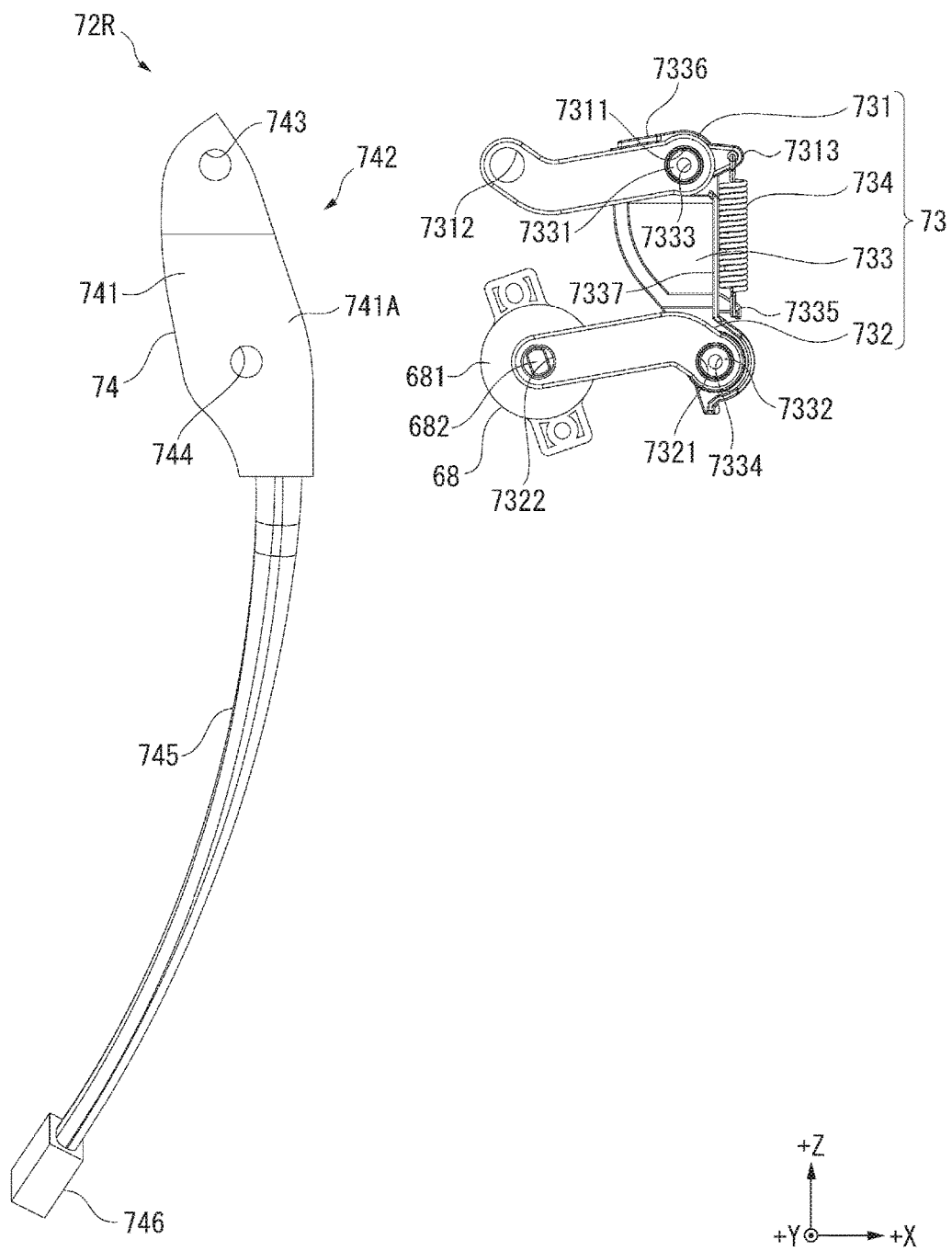
FIG. 28 is a plan view showing the right temple in which a contact section is separated from a first link and a second link in the second embodiment.

FIG. 27 is an exploded perspective view showing the right temple 72R. FIG. 28 is a plan view showing the right temple 72R in which a contact section 74 is separated from the first link 731 and the second link 732 that configure the link mechanism 721.

The right temple 72R is set in contact with the right temporal region and the back of the head (specifically, a part on the right side of the back of the head) of the user and sandwiches the head of the user in conjunction with the left temple 72L set in contact with the left temporal region and the back of the head (specifically, a part on the left side in the back of the head). The right temple 72R includes, as shown in FIG. 25 and FIGS. 27 and 28, a link mechanism 73, the contact section 74, and the attenuating mechanism 68.

Configuration of the Link Mechanism

The link mechanism 73 is attached to the lower surface of the extending section 712R in the cover member 71, supports the contact section 74, and moves the entire contact section 74. The link mechanism 73 includes the first link 731, the second link 732, a base member 733, and an urging section 734.

Configurations of the First Link and the Second Link

The first link 731 and the second link 732 are respectively formed in flat shapes. The first link 731 is disposed on the front side and the second link 732 is disposed on the rear side such that extending directions of the first link 731 and the second link 732 are substantially parallel to each other. One ends of the first link 731 and the second link 732 are turnably supported by the base member 733 attached to the lower surface of the extending section 712R. The other ends of the first link 731 and the second link 732 are connected to the contact section 74.

The first link 731 includes substantially circular hole sections 7311 and 7312 at both ends. The second link 732 includes substantially cylindrical hole sections 7321 and 7322 at both ends.

Cylinder sections 7331 and 7332 of the base member 733 are inserted into the hole sections 7311 and 7321 located on the same side in the links 731 and 732. Consequently, the first link 731 and the second link 732 are turnably supported by the base member 733.

An end portion where the hole section 7312 is located in the first link 731 is inserted into the contact section 74. A fitting member (not shown in the figure) inserted into a hole section 743 of the contact section 74 is inserted into the hole section 7312. Consequently, the first link 731 and the contact section 74 are combined.

The shaft section 682 of the attenuating mechanism 68 is inserted into the hole section 7322 in the second link 732. An end portion where the hole section 7322 is located in the second link 732 and the attenuating mechanism 68 are inserted into the contact section 74. The attenuating mechanism 68 is fixed in the contact section 74, whereby the second link 732 and the contact section 74 are combined via the attenuating mechanism 68.

In the first link 731, an end portion on a connecting side to the contact section 74 is bent to the front side. On the other hand, in the second link 732, an end portion on a supported side by the base member 733 is bent to the rear side. Bending directions of bent portions of the first link 731 and the second link 732 are substantially parallel to each other. Parts excluding the bent portions in the links 731 and 732 are also substantially parallel to each other. These are components for making it easy to house the links 731 and 732 in the cover member 71 and the contact section 74.

Note that, besides the hole sections 7311 and 7312, the first link 731 includes, at an end portion on a side where the hole section 7311 is located, an attaching section 7313 projecting to the outer side. One end of the urging section 734 is attached to the attaching section 7313.

Configuration of the Base Member

The base member 733 supports the first link 731, the second link 732, and the urging section 734 and is attached to the lower surface in the extending section 712R of the cover member 71. The base member 733 includes, as shown in FIGS. 27 and 28, boss-like cylinder sections 7331 and 7332, insert-through holes 7333 and 7334, an attaching section 7335, and erected sections 7336 and 7337.

The cylinder section 7331 is inserted into the hole section 7311 of the first link 731 and configures the turning axis (the turning axis AX3) of the first link 731. The cylinder section 7332 is inserted into the hole section 7321 of the second link 732 and configures the turning axis (the turning axis AX4) of the second link 732.

The insert-through hole 7333 is a hole section that pierces through the cylinder section 7331 along the axial direction of the cylinder section 7331. The insert-through hole 7334 is a hole section that pierces through the cylinder section 7332 along the axial direction of the cylinder section 7332. A screw (not shown in the figure) inserted through the insert-through hole 7333 from below is screwed in the screw hole 7171 of the first shaft section 717R and a screw (not shown in the figure) inserted through the insert-through hole 7334 from below is screwed in the screw hole 7181 of the second shaft section 718R, whereby the base member 733 is attached to the lower surface of the extending section 712R. Consequently, the extending section 712R supports the first link 731 and the second link 732 of the right temple 72R to be turnable around turning axes extending along the up-down direction.

The attaching section 7335 projects to the outer side from a side surface on the opposite side of the contact section 74 side among the side surfaces of the base member 733. The attaching section 7335 is a hook formed in a hook shape. The other end of the urging section 734 is attached to the attaching section 7335.

Of the erected sections 7336 and 7337, the erected section 7336 is located at an end portion on the front side of the base member 733. The erected section 7337 is located at the end portion on the left side. The first link 731 turned to the front side is set in contact with the erected section 7336, whereby a forward turnable range of the first link 731 is defined. Similarly, the first link 731 turned to the rear side is set in contact with the erected section 7337, whereby rearward turnable range of the first link 731 is defined.

Configuration of the Urging Section

In this embodiment, the urging section 734 is configured by a tension spring (a helical tension spring). As explained above, one end of the urging section 734 is attached to the attaching section 7313 of the first link 731 and the other end of the urging section 734 is attached to the attaching section 7335 of the base member 733. The first link 731 is urged by the urging section 734 in a direction (a −D3 direction explained below) in which an end portion on the hole section 7312 side moves forward in the turnable range of the first link 731.

Configuration of the Contact Section

Like the contact section 67R, the contact section 74 is a member set in contact with the head (the temporal region and the back of the head) of the user and suspended on the ear of the user. The entire contact section 74 is connected to the first link 731 and the second link 732. The entire contact section 74 is moved to the front side and a position close to the left temple 72L and the head according to forward turning of the links 731 and 732 and moved to the rear side and a position away from the left temple 72L and the head according to rearward turning of the links 731 and 732. The contact section 74 includes a main body section 741 and a contact piece 745 supported by the main body section 741.

The main body section 741 is a part connected to the first link 731 and the second link 732. An insertion port 742 long in the front-back direction is formed on a side surface on the links 731 and 732 side in the main body section 741. End portions on the hole sections 7312 and 7322 sides in the links 731 and 732 are inserted into the main body section 741 via the insertion port 742.

Hole sections 743 and 744 are formed on an upper surface 741A of the main body section 741. Fitting members (not shown in the figure) fit in the hole sections 7312 and 7322 of the links 731 and 732 inserted into the main body section 741 are inserted into the hole sections 743 and 744. Consequently, the first link 731 and the second link 732 and the contact section 74 (the main body section 741) are combined.

The contact piece 745 extends rearward from the main body section 741. The contact piece 745 has a curved shape conforming to the shapes of the right temporal region and the back of the head (specifically, a part on the right side in the back of the head) of the user. That is, the contact piece 745 is curved in a direction in which the contact piece 745 moves closer to the left temple 72L further rearward. The contact piece 745 is formed to be thinner further rearward.

A center-of-gravity adjusting section 746 is provided at the distal end portion (the rear side end portion) of the contact piece 745.

In this embodiment, the center-of-gravity adjusting section 746 is formed in a substantially square pole shape. The center-of-gravity adjusting section 746 functions as a counterweight of the HMD 1A, whereby a center-of-gravity position of the HMD 1A, which the center of gravity of which tends to deviate forward, can be shifted to the rear side compared with when the center-of-gravity adjusting section 746 is absent. Improvement of a wearing feeling and a reduction in a fatigue feeling are achieved. Besides, since the center-of-gravity adjusting section 746 is formed thick in the contact piece 745, the center-of-gravity adjusting section 746 prevents a slant of the contact piece 745 suspended on the ear.

Configuration of the Left Temple

The left temple 72L is set in contact with the left temporal region and the back of the head of the user and sandwiches the head of the user in conjunction with the right temple 72R. Like the right temple 72R, the left temple 72L includes, as shown in FIG. 25, the link mechanism 73 including the first link 731, the second link 732, the base member 733, and the urging section 734, the contact section 74, and the attenuating mechanism 68 (not shown in FIG. 25). The left temple 72L and the right temple 72R are mirror-symmetrically configured.

Operation of the Temple During HMD Mounting

Figure 29:
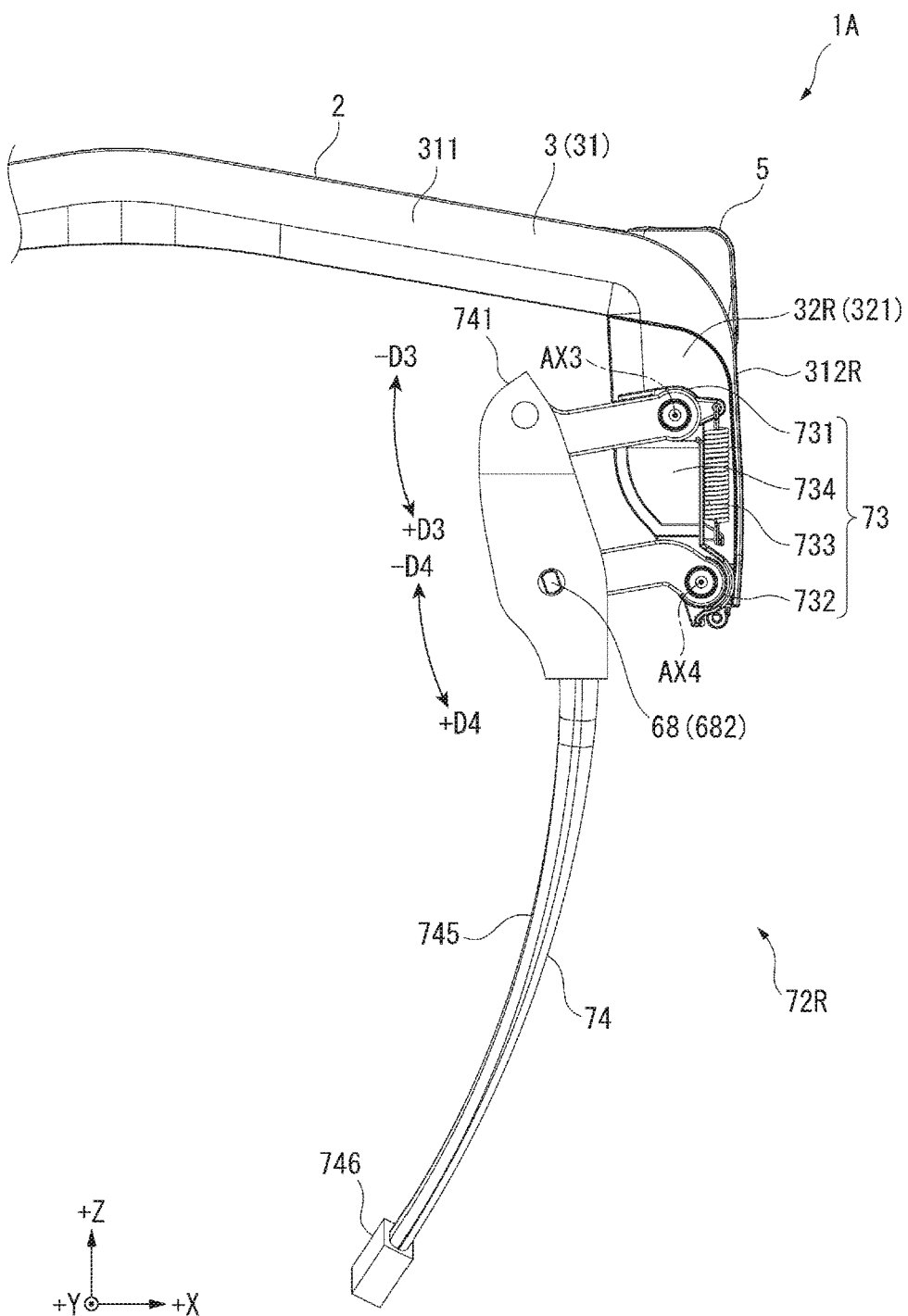
FIG. 29 is a plan view showing a moving state of the contact section in the second embodiment.
Figure 30:
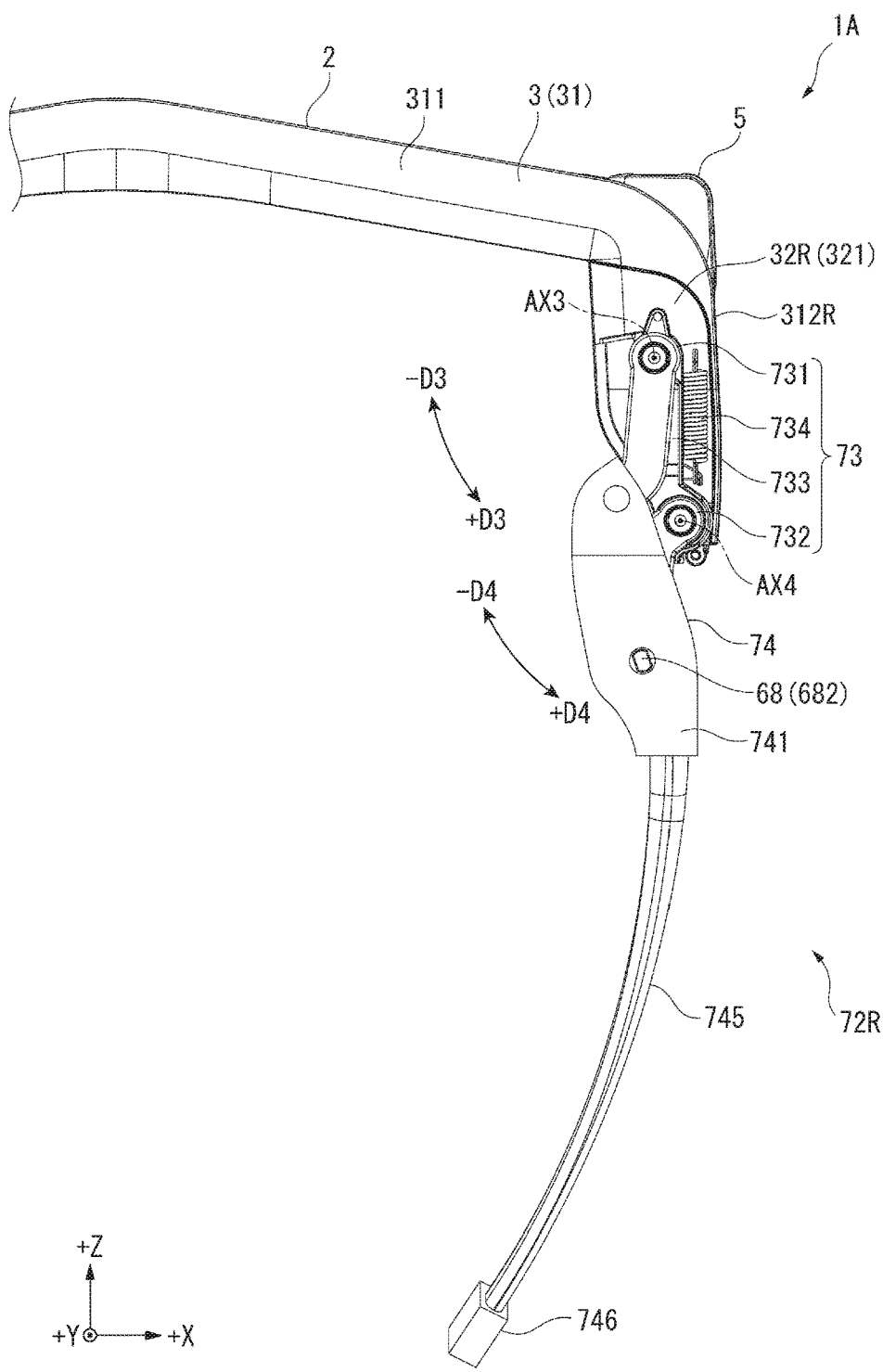
FIG. 30 is a plan view showing a moving state of the contact section in the second embodiment.

FIGS. 29 and 30 are plan views showing a moving state of the contact section 74 of the right temple 72R. Specifically, FIG. 29 is a plan view showing a state in which the entire contact section 74 is closest to the left temple 72L and the head. In FIG. 29, the cover member 71 is not shown and the right temple 72R is enlarged in the state shown in FIG. 23. FIG. 30 is a plan view showing a state in which the entire contact section 74 is spaced apart from the left temple 72L and the head most. In FIG. 30, the cover member 71 is not shown and the right temple 72R is enlarged in the state shown in FIG. 24. Note that, in FIG. 30, for convenience of illustration, the urging section 734 and the attaching section 7313 are disengaged.

In the right temple 72R having the configuration explained above, the contact section 74 is moved as explained below.

In a state in which the HMD 1A is not mounted on the head, as shown in FIG. 29, the first link 731 is urged by the urging section 734 in, of a +D3 direction and a −D3 direction (an opposite direction of the +D3 direction), which are turning directions around the turning axis AX3 extending along the up-down direction, the −D3 direction forward in the turnable range of the first link 731. For this reason, the entire contact section 74 combined with the first link 731 is located on the front side. In this case, the second link 732 combined with the contact section 74 is located in, of a +D4 direction and a −D4 direction (an opposite direction of the +D4 direction), which are turning directions around the turning axis AX4 extending along the up-down direction, the −D4 direction forward in the turnable range of the second link 732. In this state, the first link 731 is in contact with the erected section 7336. The entire contact section 74 is located in the first position closest to the left temple 72L and the head. Although not shown in the figure, in the left temple 72L as well, the entire contact section 74 is located in the first position closest to the right temple 72R and the head by the urging force of the urging section.

A state in which the entire contact sections 74 are located in the first positions is a state in which the dimension L2 (see FIGS. 23 and 24) is the shortest. In this embodiment, the dimension L2 in the state is set to 128 mm.

When the contact section 74 is expanded to the outer side and the links 731 and 732 are respectively turned in the +D3 and +D4 directions in the state in which the contact sections 74 are located in the first positions, as shown in FIG. 30, the entire contact section 74 moves rearward and is moved to a position spaced apart from the left temple 72L and the head. Although not shown in the figure, in the left temple 72L as well, when the links 731 and 732 are respectively turned in rearward directions in the turnable ranges of the links 731 and 732, the entire contact section 74 moves rearward and is moved to a position spaced apart from the right temple 72R and the head.

The positions of the entire contact sections 74 at the time when the links 731 and 732 of the right temple 72R are respectively turned most in the +D3 and +D4 directions and the links 731 and 732 of the left temple 72L are turned rearward most in this way are the second positions. A state in which the respective entire contact sections 74 are located in the second positions is a state in which the dimension L2 is the longest. In this state, the first link 731 is in contact with the erected section 7337. In this embodiment, the dimension L2 is set to 170 mm.

As explained above, the temple 7 is configured such that the entire contact sections 74 are movable in ranges of the respective first positions to the respective second positions.

When the head is placed in a position between the contact sections 74 and a force for opening the contact sections 74 to the outer side is reduced, the links 731 and 732 of the right temple 72R are respectively turned in the −D3 and −D4 directions by an urging force of the urging section 734. Consequently, the contact section 74 (the contact piece 745) of the right temple 72R is set in contact with the right temporal region and the back of the head. At this point, the links 731 and 732 of the left temple 72L are also turned to the front side. The entire contact section 74 is set in contact with the left temporal region and the back of the head. In other words, the entire contact sections 74 are moved in a direction in which the contact sections 74 move close to the head until the contact sections 74 come into contact with the head.

Since the urging force by the urging section 734 is caused to act on the contact sections 74, the head is sandwiched by the contact sections 74 (the contact pieces 745). In this embodiment, as in the first embodiment, when the entire contact sections 74 are moved by the urging section 734, a moving force is attenuated by the attenuating mechanism 68 and sudden movement of the contact sections 74 is prevented.

Note that, unlike the contact sections 67L and 67R, the movement of the contact sections 74 is translation between the first positions and the second positions. However, not only this, but, like the contact sections 67L and 67R, the contact sections 74 may be configured to turn around an engaging position with one of the links 731 and 732 (in particular, the first link 731) such that an interval between the rear ends of the contact sections 74 increases as the contact sections 74 move from the first positions to the second positions (the interval decreases as the contact sections 74 move from the second positions to the first positions). Consequently, as in the case of the HMD 1, the rear ends of the contact sections 74 close to the inner side when the head of the user is relatively small and the rear ends of the contact sections 74 is opened to the outer side when the head is relatively large. Therefore, in the respective cases, it is possible to make it easy to maintain contact areas of the contact sections 74 (the contact pieces 745) with the head. The turning of the contact sections 74 can be realized by, for example, increasing the dimension of the first link 731 (a dimension from an engaging position with the base member 733 to an engaging position with the contact section 74) to be larger than the dimension of the second link 732.

Effects of the Second Embodiment

With the HMD 1A according to this embodiment explained above, the same effects as the HMD 1 can be achieved and effects explained below can be achieved.

The cover member 71 functioning as the left supporting section and the right supporting section supports the first link 731 and the second link 732, which configure the right temple 72R, and supports the contact section 74 (the target contact section) connected to the links 731 and 732. The cover member 71 supports the first link 731 and the second link 732, which configure the left temple 72L, and supports the contact section 74 (the target contact section) connected to the links 731 and 732. The entire contact sections 74 are moved between the first positions and the second positions by the links 731 and 732 respectively corresponding to the contact sections 74. The dimension L2 in the left-right direction between the contact sections 74 at the time when the contact sections 74 are respectively located in the second positions is larger than the dimension L2 at the time when the contact sections 74 are respectively located in the first positions. The head of the user is located between the contact sections 74, whereby it is possible to surely set the entire contact sections 74 in contact with positions (temporal regions) corresponding to the sizes of heads having different sizes in the left-right direction. Therefore, it is possible to prevent contact areas of the head and the contact sections 74 from changing according to the size of the head and maintain the contact areas substantially constant. Therefore, it is possible to stably mount the HMD 1A on the head.

Note that, even when one contact section of the left and right contact sections 74 is fixed and the entire other contact section is configured to be movable by the configuration explained above, since the entire other contact section is movable in the direction in which the other contact section moves close to and away from the head, it is possible to achieve the effects.

The contact section 74 of the right temple 72R is connected to the first link 731 and the second link 732 respectively supported to be turnable around the turning axis AX3 (the first turning axis) and the turning axis AX4 (the second turning axis) extending along the up-down direction. Similarly, the contact section 74 of the left temple 72L is connected to the first link 731 and the second link 732 respectively supported to be turnable around the turning axes extending along the up-down direction. Consequently, it is possible to move the entire contact sections 74 in the left-right direction and the front-back direction according to the turning of the links 731 and 732 corresponding to the contact sections 74. For this reason, by turning the links 731 and 732 to the front side, it is possible to move the entire contact sections 74 to the front side and a position close to the other contact section and the head. By turning the links 731 and 732 to the rear side, it is possible to move the entire contact sections 74 to the rear side and a position spaced apart from the other contact section and the head. Consequently, it is possible to move the entire left and right contact sections 74 according to the heads of users having different front-back and left-right sizes. Therefore, since it is possible to set the entire left and right contact sections 74 in appropriate positions in the head, it is possible to stably mount the HMD1A on the head.

Note that, even when one contact section of the left and right contact sections 74 is fixed and the entire other contact section is configured to be movable by the configuration explained above, the entire other contact section is movable not only to the left and the right but also to the front and the rear. Therefore, it is possible to achieve the effects.

The right temple 72R includes the urging section 734 that urges the first link 731 in a turning direction in which the entire contact section 74 is located in the first position. Although not shown in the figure, the left temple 72L also includes the urging section 734 that urges the first link 731 in a turning direction in which the entire contact section 74 is located in the first position. Consequently, the contact sections 74 are urged by the urging sections 734 in a direction in which the dimension L1 decreases. Consequently, it is possible to maintain a state in which the contact sections 74 are in contact with the head and sandwich the head with the contact sections 74. Therefore, it is possible to more stably mount the HMD 1A on the head.

Note that, even when one contact section of the left and right contact sections 74 is fixed and the entire other contact section is configured to be movable by the configuration explained above, since the entire other contact section is urged to the head side, it is possible to achieve the effects.

The cover member 71 functioning as the left supporting section and the right supporting section includes the front section 711, the extending sections 712L and 712R, and the side surface sections 713L and 713R functioning as the exterior sections that configure a part of the exterior of the HMD 1A. The front section 711 and the extending sections 712L and 712R cover the front section 311 and the case members 32L and 32R of the frame main body 31 from above. The side surface sections 713L and 713R cover the case members 32L and 32R from the outer side (the sides). Consequently, by attaching the cover member 71 including the left temple 72L and the right temple 72R to the outer side if the image display section 2, it is possible to easily configure the HMD 1A that can achieve the effects. Therefore, it is possible to simplify a manufacturing process of the HMD 1A. Besides, since the cover member 71 covers the top and the sides of the image display section 2, it is possible to increase the strength of the HMD 1A.

Note that, even when only one of the left temple 72L and the right temple 72R is provided in the cover member 71, it is possible to achieve the same effects.

As explained above, when mounting the HMD 1A on the head, the user often grips a relatively thin part and wears the HMD 1A. On the other hand, the contact piece 745 in the contact section 74 is provided behind the main body section 741. A portion excluding the center-of-gravity adjusting section 746 in the contact piece 745 is thinner than the main body section 741. Consequently, it is possible to make it easy for the user to grip a position that the user should grip. Therefore, it is possible to make it easy to wear the HMD 1A.

In the HMD 1A, the light guide members 47L and 47R that make image light incident on the eyes of the user are often disposed in front of the eyes of the user. Therefore, the center-of-gravity position easily deviates to the front side. In such a case, the mounted HMD 1 easily slants to the front side and the wearing feeling is spoiled.

On the other hand, since the center-of-gravity adjusting section 746 located on the opposite direction side of the observation direction for the user, that is, the rear side in the contact piece 745 functions as the counterweight, it is possible to keep a balance between the front and the rear of the HMD 1A. Therefore, it is possible to prevent a wearing feeling from being spoiled and reduce a fatigue feeling of the user. Since the center-of-gravity adjusting section 746 is formed thick in the part on the rear side in the contact section 74, it is possible to prevent the contact section 74 (the contact piece 745) from coming off the ear of the user.

Third Embodiment

A third embodiment of the invention is explained.

An HMD according to this embodiment has the same configuration of the HMD 1A. However, the configurations of a frame and temples are different. Note that, in the following explanation, the same or substantially same portions as the portions explained above are denoted by the same reference numerals and signs and explanation of the portions is omitted.

Figure 31:
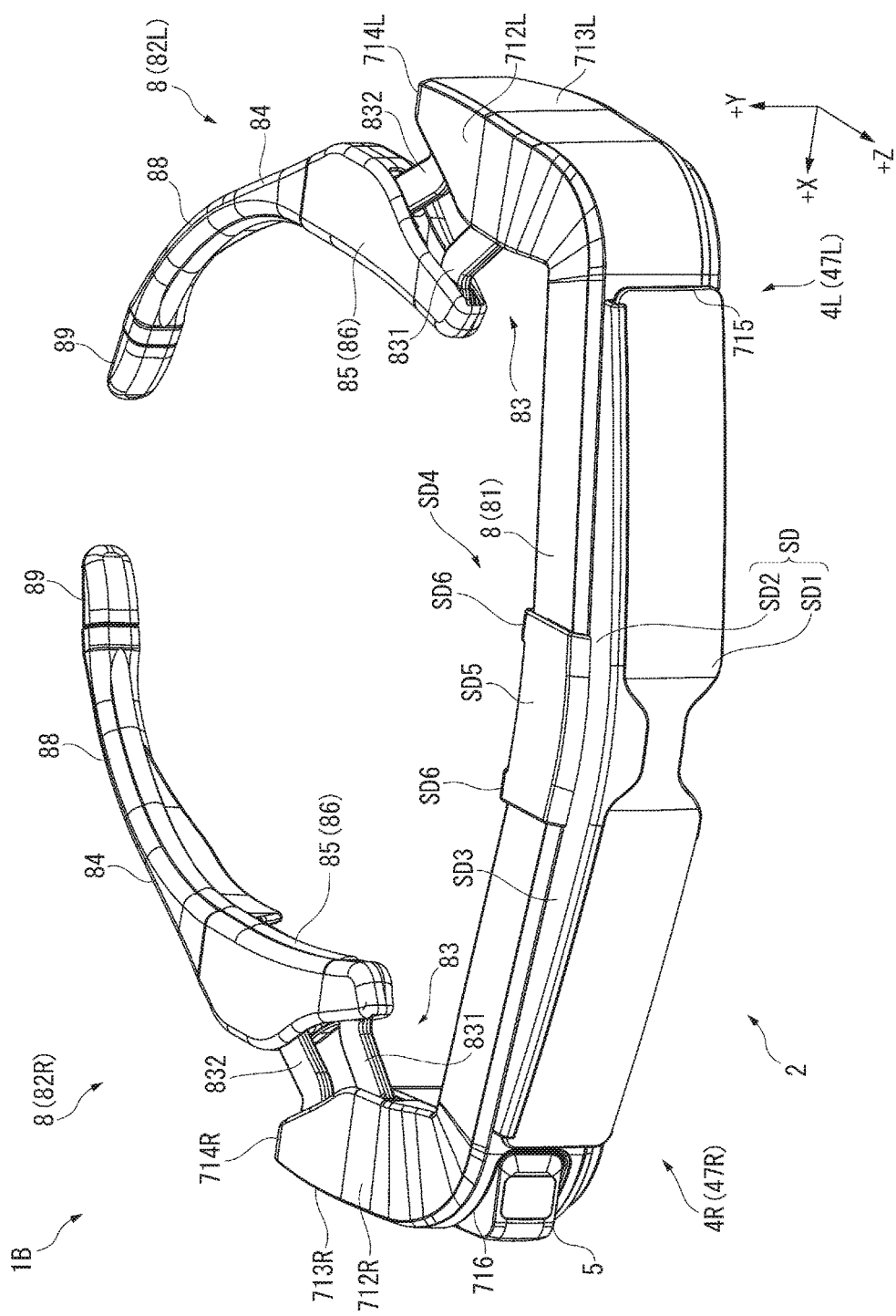
FIG. 31 is a perspective view showing the exterior of an HMD according to a third embodiment of the invention.
Figure 32:
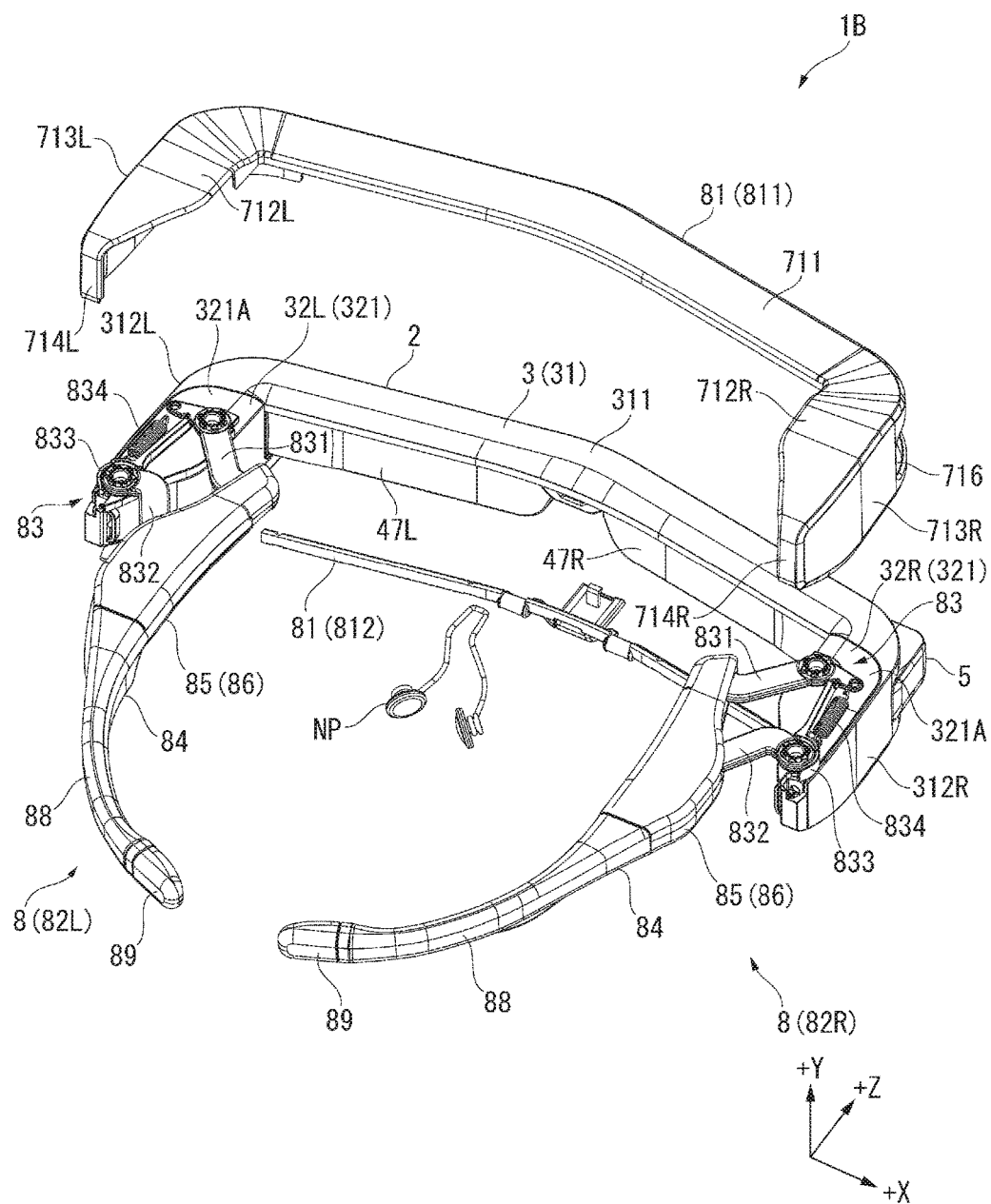
FIG. 32 is an exploded perspective view showing the HMD in the third embodiment.

FIGS. 31 and 32 are perspective views showing the exterior of an HMD 1B according to this embodiment. FIG. 31 is a perspective view of the HMD 1B viewed from above on the front side. FIG. 32 is a perspective view of the HMD 1B, in which a part of a temple 8 is separated, viewed from above on the back side. Note that, in FIG. 32, for convenience of illustration, first links 831 and urging sections 834 are disengaged. In FIG. 32, a blocking member SD is omitted.

As shown in FIGS. 31 and 32, the HMD 1B according to this embodiment includes the same components and functions as the HMD 1A except that the HMD 1B includes the blocking member SD (FIG. 31) and includes the temple 8 instead of the temple 7. The temple 8 includes a cover member 81, a left temple 82L, and a right temple 82R. Note that the configuration of the blocking member SD is explained in detail below.

The temple 8 has the same functions as the temple 7. The entire contact sections 84 of the right temple 82R and the left temple 82L, which configure the temple 8, are configured to be movable between first positions where the contact sections 84 are closest to the other temple and the head of a user and second positions where the contact sections 84 are spaced apart from the other temple and the head of the user most. Besides, as explained in detail below, as characteristics of the temple 8, the temple 8 has a function of sandwiching the head with a substantially constant pressing force irrespective of the size of the head of the user and the temple 8 is configured to further conform to the shape of the head.

Note that, in this embodiment, as in the embodiments explained above, the dimension between the contact sections 84 in a state in which the entire contact sections 84 are located in the first positions is set to 128 mm and the dimension between the contact sections 84 in a state in which the entire contact sections 84 are located in the second positions is set to 170 mm.

The components of the temple 8 are explained below.
Configuration of the Cover Member FIG. 33 is a perspective view of the cover member 81 viewed from below on the front side.

The cover member 81 includes a cover main body 811 and an attaching member 812.

The cover main body 811 is formed in a substantially U shape when viewed from above. Like the cover member 71, the cover main body 811 is attached to the frame 3 to support the left temple 82L and the right temple 82R and cover the tops of the frame main body 31 and the case members 32L and 32R and side surfaces (side surfaces on the opposite side of the head side of the user) of the case members 32L and 32R.

Figure 33:
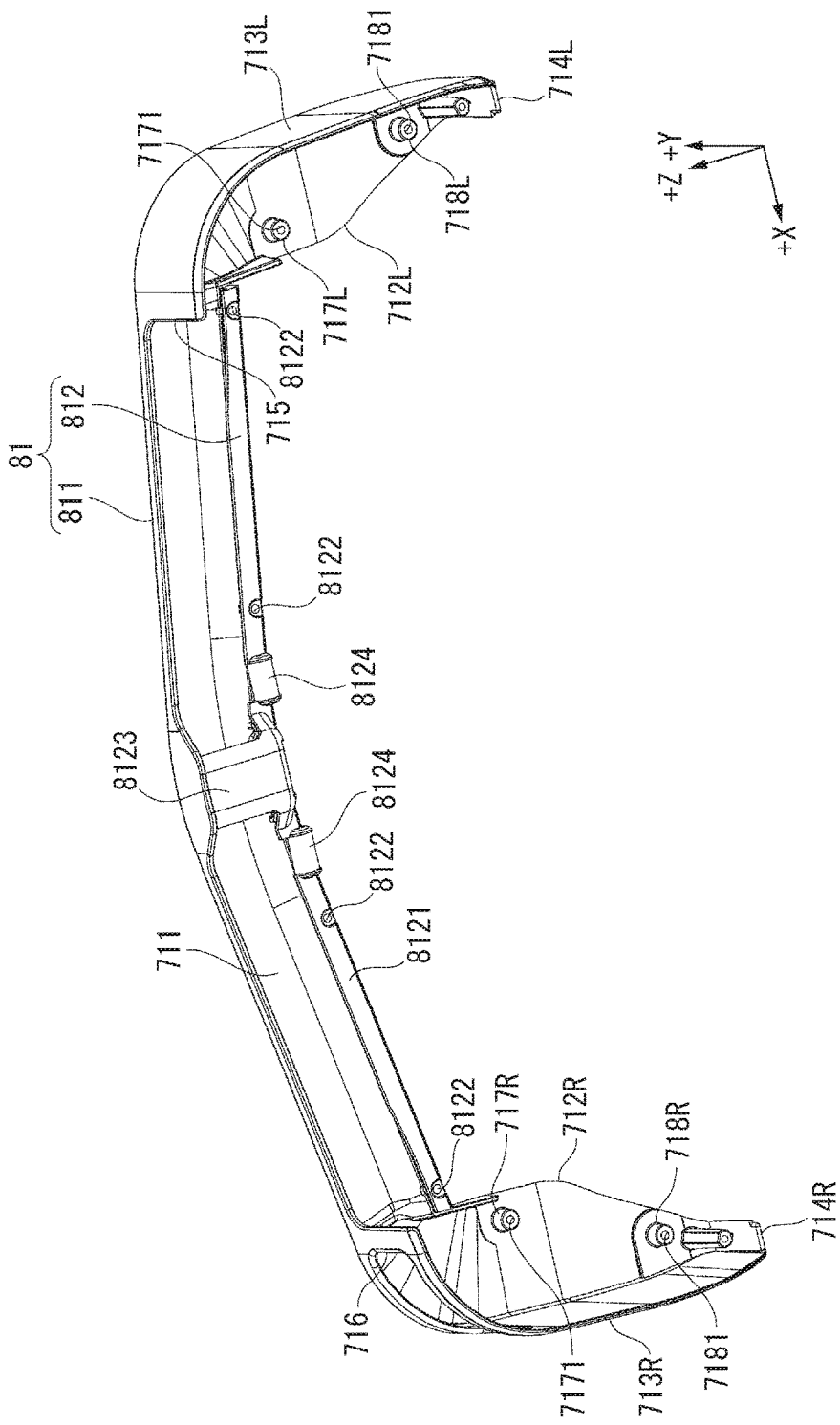
FIG. 33 is a perspective view showing a cover member in the third embodiment.

The cover main body 811 includes, as shown in FIG. 33, the front section 711, the extending sections 712L and 712R, the side surface sections 713L and 713R, the fixing sections 714L and 714R, the concave section 715, the opening section 716, the first shaft sections 717L and 717R including the screw holes 7171, and the second shaft sections 718L and 718R including the screw holes 7181. The sections are integrally formed.

Note that, in the cover main body 811, the positions of the first shaft sections 717L and 717R respectively inserted into the first links 831 explained below are located on the head side of the user compared with the positions of the first shaft sections 717L and 717R in the cover member 71.

The attaching member 812 is fixed to the cover main body 811 along an end edge on the back side in the front section 711 of the cover main body 811. The attaching member 812 includes an extending section 8121 extending along the end edge, an sandwiching section 8123 located substantially in the center of the extending section 8121, and a pair of attaching sections 8124 to which the blocking member SD is turnably attached. The attaching member 812 is formed in a substantially T shape when viewed from below.

The extending section 8121 includes a plurality of hole sections 8122 through which screws (not shown in the figure) for fixing the attaching member 812 to the cover main body 811 are inserted.

When the attaching member 812 is attached to the cover main body 811, the sandwiching section 8123 is disposed in a position corresponding to the mounting section 3111 and vertically sandwiches the mounting section 3111 in conjunction with the cover main body 811. Note that, although not shown in the figure, a concave section, into which a projecting section (not shown in the figure) of the cover main body 811 is inserted, is formed on an end face on the front side in the sandwiching section 8123. Positioning of the attaching member 812 with respect to the cover main body 811 is performed by the concave section and the projecting section.

An opening section, through which a part of the nose pad NP inserted into the mounting section 3111 is inserted, is formed on an end face on the back side in the sandwiching section 8123.

A pair of attaching section 8124 is provided to hold the sandwiching section 8123. The attaching sections 8124 are formed in a substantially cylindrical shape having a center axis in an extending direction of the extending section 8121. The blocking member SD (see FIGS. 34 and 35) is turnably attached to the attaching section 8124.
Configuration of the Blocking Member Like the blocking member explained above, the blocking member SD blocks at least a part of external light made incident on both the eyes of the user via the light guide members 47R and 47L to make the external world less easily seen. Consequently, the blocking member SD improves visibility of a displayed image. The blocking member SD includes a light blocking section SD1 and a supporting section SD2 as shown in FIG. 31. In this embodiment, the light blocking section SD1 and the supporting section SD2 are respectively configured as separate members. The blocking member SD is configured by combining these members. However, not only this, but the blocking member SD may be integrally formed.

The light blocking section SD1 is a part that covers the light guide members 47R and 47L and blocks external light made incident on the light guide members 47R and 47L. In this embodiment, the light blocking section SD1 is formed of a material having predetermined light transmittance. The predetermined light transmittance includes transmittance 0 for not transmitting light. Note that a configuration and a material of the light blocking section SD1 may be any configuration and any material as long as the light blocking section SD1 can prevent transmission of at least a part of incident light. For example, the light blocking section SD1 may be configured to include a filter that transmits incident light at constant transmittance or may be configured to include a polarization element. At least a part of the light blocking section SD1 may be formed of a material (e.g., a photochromic material), transmittance of which changes according to a light amount of incident light. Further, the light blocking section SD1 may be configured to include a shutter device (e.g., a liquid crystal shutter) capable of adjusting the transmittance of light according to an applied voltage.

The supporting section SD2 is a part turnably attached to the attaching section 8124 (see FIG. 33) in a state in which the supporting section SD2 supports the light blocking section SD1. The supporting section SD2 includes, as shown in FIG. 31, a gripping section SD3 that grips the upper end of the light blocking section SD1 long in the left-right direction (the +X direction) and an arm SD4 that extends from substantially the center in the left-right direction to the back side in the gripping section SD3.

Figure 34:
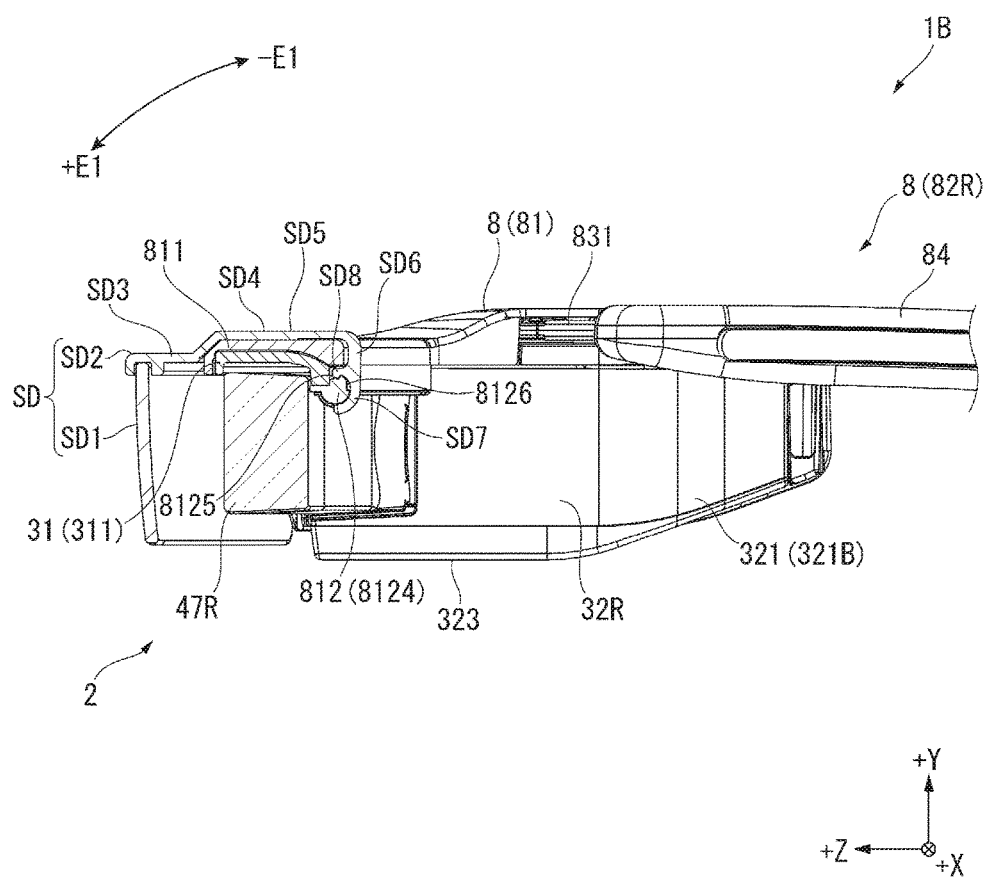
FIG. 34 is a sectional view showing the cover member and a blocking member in the third embodiment.
Figure 35:
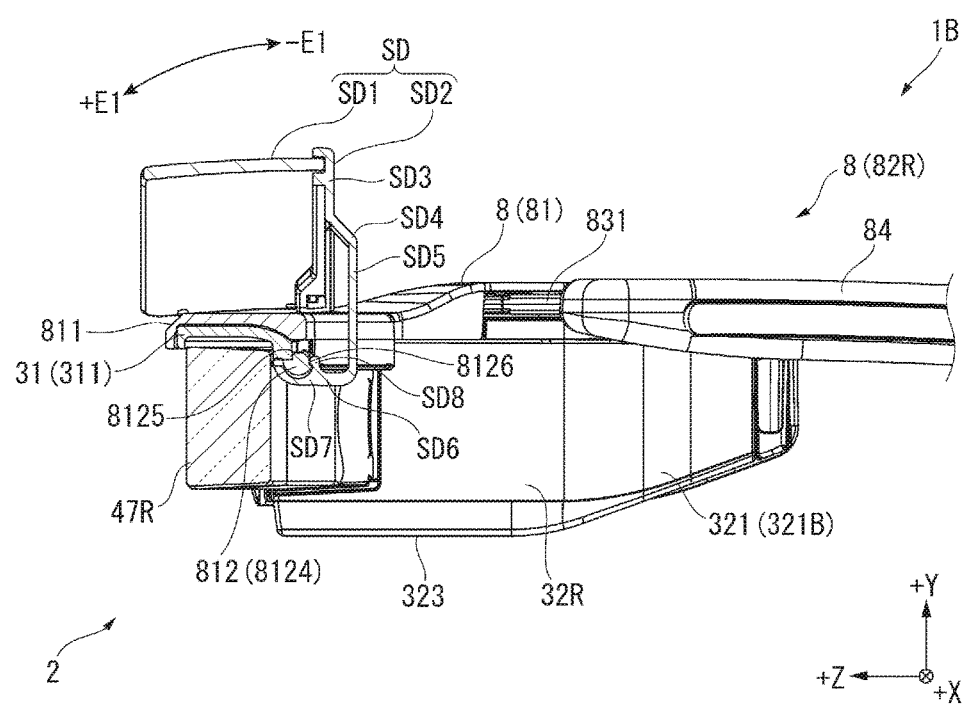
FIG. 35 is a sectional view showing the cover member and the blocking member in the third embodiment.

FIGS. 34 and 35 are sectional views showing the cover member 81 (the attaching member 812) and the blocking member SD attached to the cover member 81. FIG. 34 is a sectional view of a state in which the blocking member SD is disposed on a viewing direction of the user. FIG. 35 is a sectional view of a state in which the blocking member SD is turned to a position outside the viewing direction.

As shown in FIGS. 34 and 35, the arm SD4 is a part that is turnably attached to the attaching section 8124 and moves the gripping section SD3 and the light blocking section SD1. The arm SD4 includes a first extending section SD5 extending from the gripping section SD3 to the back side, a second extending section SD6 substantially orthogonal to the first extending section SD5 at an end portion on the back side in the first extending section SD5, and a pair of attaching sections SD7 provided in the second extending section SD6.

Each of the pair of attaching sections SD7 is formed in a substantially U shape in cross section and holds the attaching section 8124 corresponding to the attaching section SD7. Consequently, the blocking member SD is capable of vertically turning around the attaching section 8124.

For this reason, by turning the blocking member SD in a +E1 direction, it is possible to switch the light guide members 47L and 47R to a blocked state in which the light guide members 47L and 47R (the light guide member 47L is not shown in the figure) are covered by the light blocking section SD1 on the front side as shown in FIG. 34 and an unblocked state in which the light guide members 47L and 47R (the light guide member 47L is not shown in the figure) is not covered by the light blocking section SD1 as shown in FIG. 35. In other words, it is possible to switch the position of the blocking member SD to a blocking position where the light blocking section SD1 is located on the viewing direction of the user to thereby block the external world, improve visibility of an image, and enable improvement of a sense of immersion and an unblocked position where the light blocking section SD1 is not located on the viewing direction to thereby enable observation of the external world.

As shown in FIGS. 34 and 35, each of the pair of attaching sections 8124 includes concave sections 8125 and 8126 on the outer circumferential surface of the attaching section 8124. The concave section 8125 is formed in a position on the upper side in the attaching section 8124 and the concave section 8126 is formed in a position on the back side.

On the other hand, each of the pair of attaching sections SD7 includes, on a surface opposed to the attaching section 8124 corresponding to the attaching section SD7, a protrusion SD8 capable of fitting in one of the concave sections 8125 and 8126.

When the blocking member SD turns in the +E1 direction and the light guide members 47L and 47R change to the blocked state, the protrusion SD8 fits in the concave section 8125. The blocking member SD is positioned in a position where the blocking member SD covers the light guide members 47L and 47R on the front side.

When the blocking member SD turns in a −E1 direction and the light guide members 47L and 47R change to the unblocked state, the protrusion SD8 fits in the concave section 8126. Consequently, the blocking member SD is positioned in a position where the blocking member SD does not cover the light guide members 47L and 47R.

Note that combinations of the attaching sections 8124 and the attaching sections SD7 do not have to be the pairs. One attaching section 8124 may be provided in the attaching member 812. One attaching section SD7 may be provided in the blocking member SD. That is, the numbers of the attaching sections 8124 and the attaching sections SD7 can be changed as appropriate. The positions of the attaching sections 8124 and the attaching sections SD7 can also be changed as appropriate. A configuration may be adopted in which the attaching sections 8124 include protrusions and the attaching sections SD7 include pluralities of concave sections in which the protrusions can fit. The positions of the protrusions and the positions and the number of the concave sections can also be changed as appropriate.

Further, the position of the attaching section 8124 functioning as the turning axis (the turning axis of the blocking member SD) extending along the +X direction can be changed as appropriate. A supporting structure in which the blocking member SD is turnably supported by the cover member 81 can also be changed as appropriate. For example, the blocking member SD does not have to be detachably attachable to the cover member 81 or may be turnably coupled to the cover member 81. A right side region and a left side region in the blocking member SD may turn independently from each other. A turning axis in this case may extend along the left-right direction (the +X direction) or may extend along the up-down direction (the +Y direction).

Configuration of the Right Temple

Figure 36:
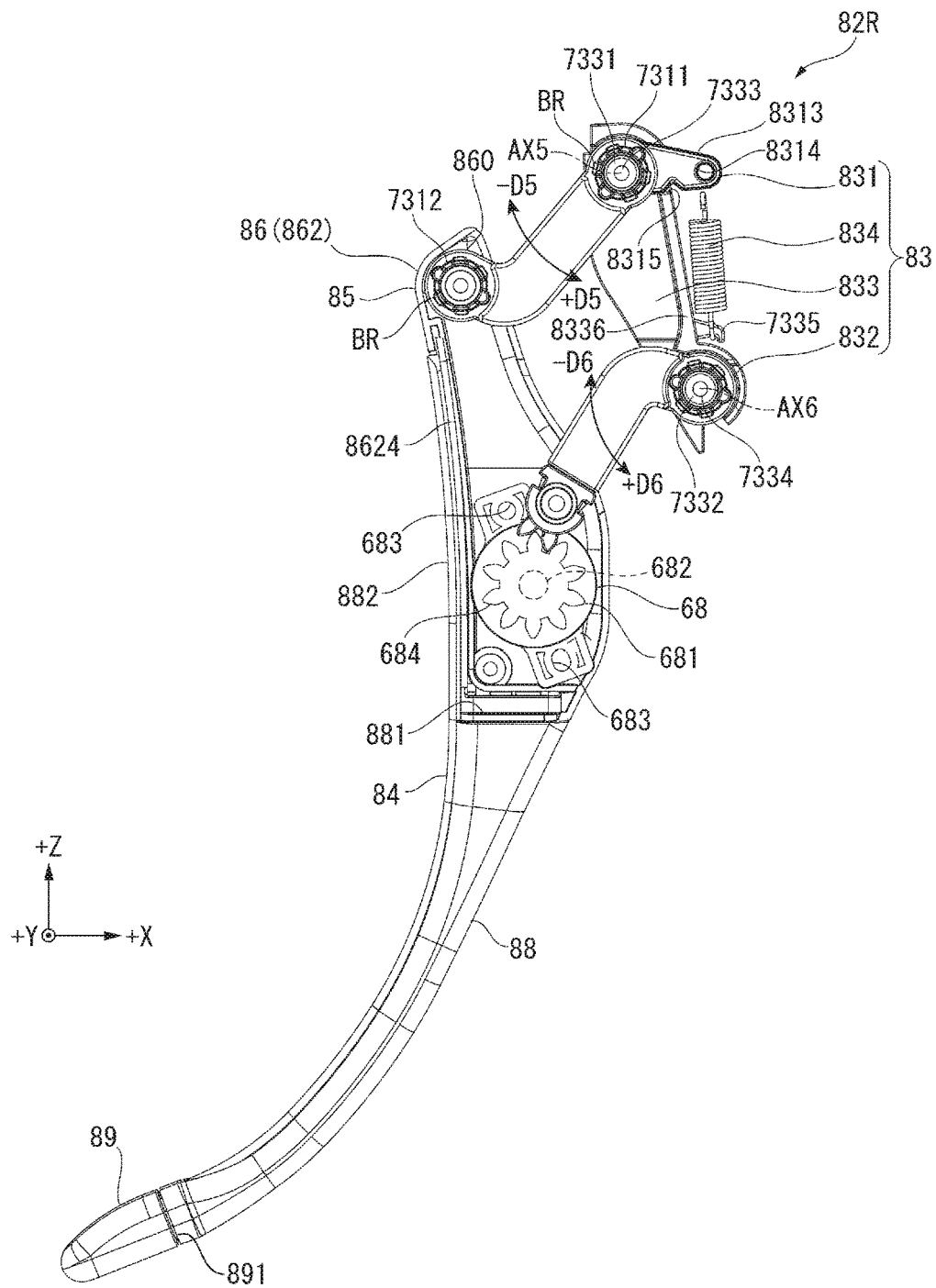
FIG. 36 is a plan view of a right temple viewed above in the third embodiment.

FIG. 36 is a plan view of the right temple 82R viewed from above. Note that, in FIG. 36, the right temple 82R in which an upper housing section 861, which configures a contact section 84, is removed is shown. For convenience of illustration, the first link 831 and the urging section 834 are disengaged.

As shown in FIGS. 31 and 32, the right temple 82R is located on the right side with respect to the head of the user, set in contact with the right temporal region and the right side portion of the back of the head of the user, and sandwiches the head in conjunction with the left temple 82L. As shown in FIG. 36, like the right temple 72R, the right temple 82R includes a link mechanism 83, the contact section 84, and the attenuating mechanism 68.

Configuration of the Link Mechanism

The link mechanism 83 is attached to the lower surface of the extending section 712R in the cover member 81 and moves the entire contact section 84 in a direction in which contact section 84 moves close to and away from the left temple 82L and the head. The link mechanism 83 includes the first link 831, a second link 832, a base member 833, and the urging section 834.

Configuration of the First Link and the Second Link

The first link 831 and the second link 832 are formed in substantially the same shapes as the first link 731 and the second link 732. That is, the first link 831 includes the hole section 7311 functioning as a first-link-side first turning section, which is a turning center with respect to the base member 833, and the hole section 7312 functioning as a first-link-side second turning section, which is a turning center with respect to the contact section 84. The cylinder section 7331 of the base member 833 is inserted into the hole section 7311, whereby the first link 831 is supported by the base member 833 to be turnable around a turning axis AX5 extending along the up-down direction in a +D5 direction, which is a direction in which the first link 831 moves away from the left temple 82L and the head of the user and a −D5 direction, which is the opposite direction of the +D5 direction (a direction in which the first link 831 moves close to the left temple 82L and the head), around the cylinder section 7331.

The second link 832 includes the hole section 7321 functioning as a second-link-side first turning section, which is a turning center with respect to the base member 833, and the hole section 7322 functioning as a second-link-side second turning section, which is a turning center with respect to the contact section 84. The cylinder section 7332 of the base member 833 is inserted into the hole section 7321, whereby the second link 832 is supported in a position further on the back side than the first link 831 in the base member 833 to be turnable around a turning axis AX6 extending along the up-down direction in a +D6 direction, which is a direction in which the second link 832 moves away from the left temple 82L and the head of the user and a −D6 direction, which is the opposite direction of the +D6 direction (a direction in which the second link 832 moves close to the left temple 82L and the head), around the cylinder section 7332.

The first link 831 includes, instead of the attaching section 7313, an attaching section 8313 that projects from an end portion on the hole 7311 side. An attaching hole 8314, to which one end of the urging section 834 is attached, is formed in the attaching section 8313. A projection amount of the attaching section 8313 is larger than a projection amount of the attaching section 7313 in the first link 731. This is to prevent the urging section 834 from hitting the first link 831 during the turning of the first link 831. A concave section 8315 is formed at an end edge on the second link 832 side in the attaching section 8313.

Further, the second link 832 includes, at an end portion on the contact section 84 side, a meshing section 8323 configured by a plurality of teeth. The meshing section 8323 is provided in the shaft section 682 of the attenuating mechanism 68 and meshes with a meshing section 684, which is a gear that turns together with the shaft section 682 (in FIG. 36, for convenience of illustration, the meshing sections 8323 and 684 are seen as if the meshing sections 8323 and 684 do not mesh with each other, but, actually, the meshing sections 8323 and 684 mesh with each other).

In the first link 831 and the second link 832, bearings BR are provided on the inner sides of the hole sections 7311 and 7312 and the hole section 7321. The first link 831 and the second link 832 are configured such that turning of the links 831 and 832 is smoothly performed.

Configuration of the Base Member

Like the base member 733, the base member 833 supports the first link 831, the second link 832, and the urging section 834 and is attached to the lower surface in the extending section 712R of the cover member 81. The base member 833 includes the cylinder sections 7331 and 7332, the insert-through holes 7333 and 7334, the attaching section 7335, and an erected section 8836.

The erected section 8836 linearly extends from the first link 831 toward the second link 832, which are respectively supported by the base member 833, and is thereafter formed in an arcuate shape that surrounds a part of the cylinder section 7332. Like the erected sections 7336 and 7337, the erected section 8836 is in contact with a part (e.g., the concave section 8312) of the turned links 831 and 832 and defines turning ranges of the links 831 and 832.

Configuration of the Urging Section

Like the urging section 734, the urging section 834 is configured by a tension spring (a helical tension spring). One end of the urging section 834 is attached to the attaching section 8313 (the attaching hole 8314) and the other end of the urging section 834 is attached to the attaching section 7335. Consequently, when the first link 831 is turned in the +D5 direction (when the first link 831 is turned in a direction in which the entire contact section 84 moves away from the head of the user), the urging section 834 causes an urging force for turning the first link 831 in the opposite direction of the turning direction of the first link 831 (in the −D5 direction) to act on the first link 831. Note that a pressing force of the contact section 84 against the head involved in the urging force of the urging section 834 is explained in detail below.

Configuration of the Contact Section

Like the contact sections 67R and 74, the contact section 84 is a member set in contact with the head (the temporal region and the back of the head) of the user and suspended on the ear of the user. The entire contact section 84 is moved to the front side and a position close to the left temple 82L and the head according to forward turning of the links 831 and 832 connected to the contact section 84 and is moved to the rear side and a position away from the left temple 82L and the head according to rearward turning of the links 831 and 832. The contact section 84 includes a main body section 85, a cover 88, and a restricting member 89.

Configuration of the Main Body Section

Figure 37:
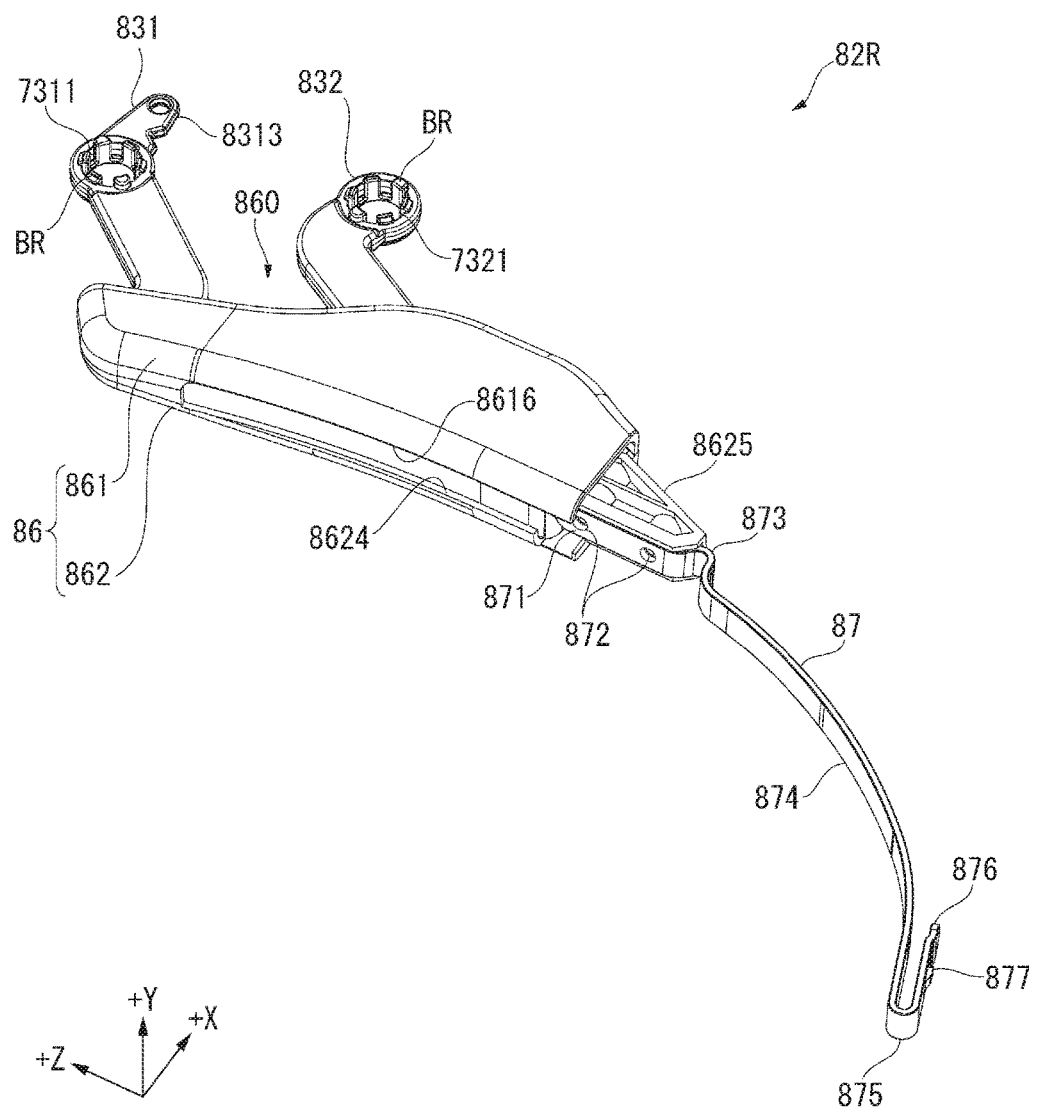
FIG. 37 is a perspective view showing a link mechanism and a main body section of a contact section in the third embodiment.
Figure 38:
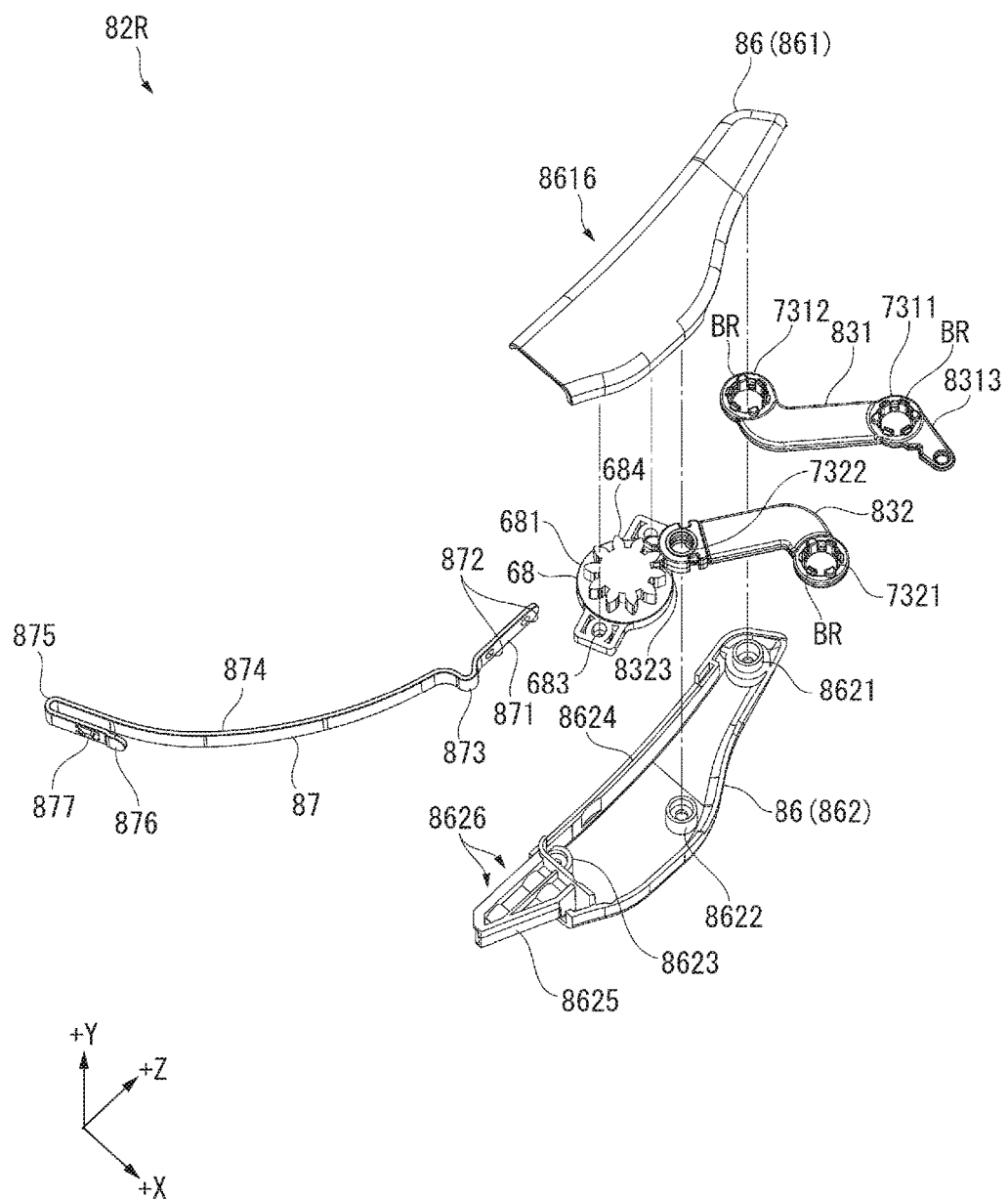
FIG. 38 is an exploded perspective view showing the main body section in the third embodiment.
Figure 39:
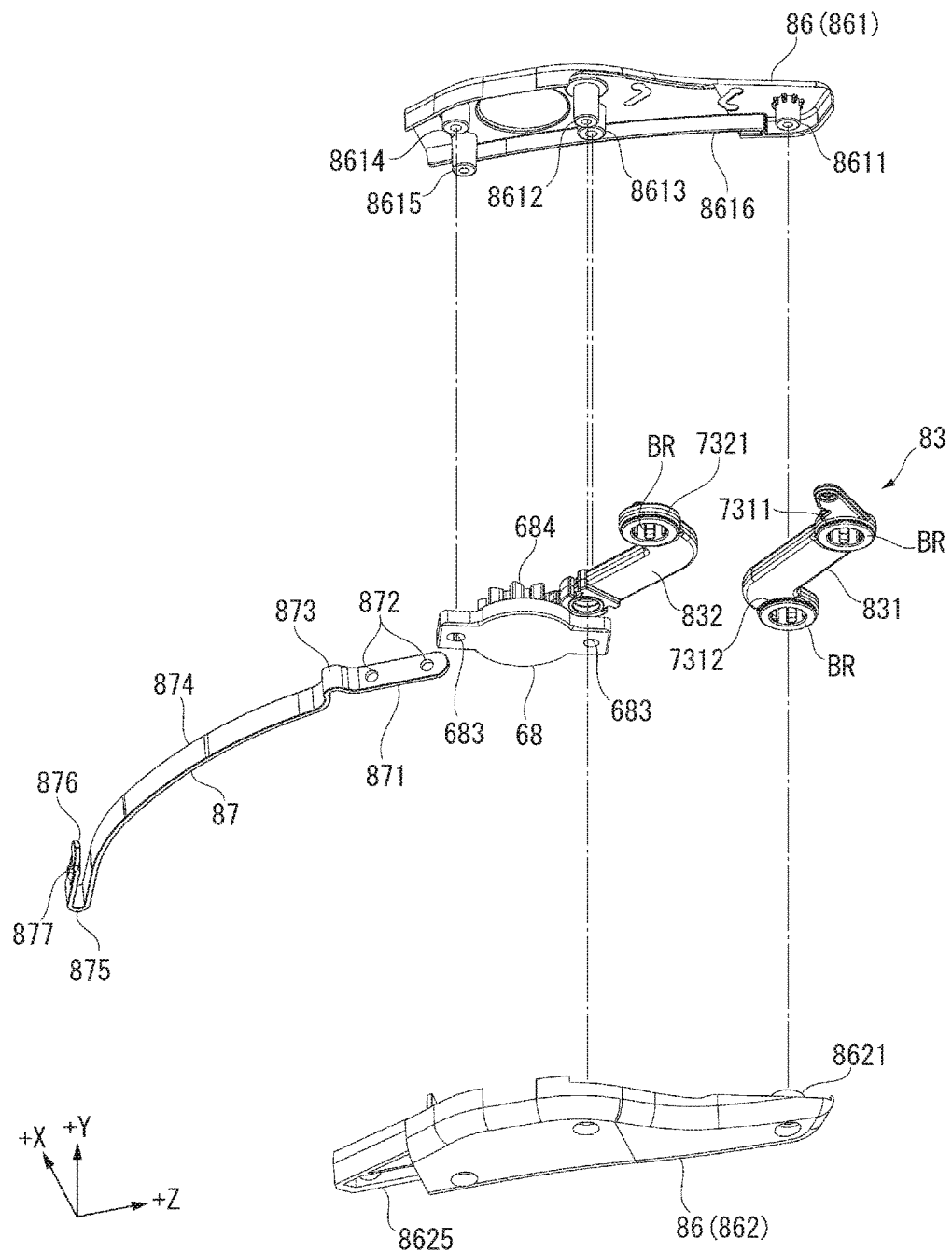
FIG. 39 is an exploded perspective view showing the main body section in the third embodiment.

FIG. 37 is a perspective view showing the link mechanism 83 and the main body section 85. FIGS. 38 and 39 are respectively exploded perspective views showing the main body section 85 viewed from above on the back side and below on the front side.

The main body section 85 configures a main part of the contact section 84. The main body section 85 includes, as shown in FIGS. 37 to 39, a connecting section 86 and a temple frame 87.

Configuration of the Connecting Section

The connecting section 86 is a part connected to the first link 831 and the second link 832 in the contact section 84. The connecting section 86 is configured by combining an upper housing section 861 and a lower housing section 862, which are a pair of housing sections that vertically holds a part of the links 831 and 832. The housing sections 861 and 862 are respectively formed of synthetic resin. The connecting section 86 includes an opening section 860 formed by concave sections formed in the housing sections 861 and 862. Parts of the links 831 and 832 are inserted into the opening section 860.

The upper housing section 861 turnably supports the links 831 and 832 and supports the attenuating mechanism 68. The upper housing section 861 includes, as shown in FIG. 39, a boss 8611 located on the front side, bosses 8612 to 8615 located on the back side, and a groove section 8616.

The boss 8611 is protrudingly provided downward. The boss 8611 is inserted into the bearing BR in the hole section 7312 of the first link 831. Consequently, the first link 831 is turnably supported by the contact section 84 (the connecting section 86).

The boss 8612 is formed on the link mechanism 83 side and the front side. The boss 8612 is inserted into the hole section 7322 of the second link 832. Consequently, the second link 832 is turnably supported by the contact section 84 (the connecting section 86). That is, the bosses 8611 and 8612 are equivalent to the turning supporting section.

Screws (not shown in the figure) inserted through the pair of hole sections 683 included in the attenuating mechanism 68 are respectively fixed to the bosses 8613 and 8614. The bosses 8613 and 8614 are disposed in positions spaced apart from the bosses 8611 and 8612. That is, the bosses 8613 and 8614 are bosses different from the bosses 8611 and 8612 equivalent to the turning supporting section and are equivalent to the attenuating-mechanism supporting section.

A screw inserted through the lower housing section 862 is fixed to the boss 8615. Similarly, screws inserted through the lower housing section 862 are fixed to the bosses 8611 and 8612 as well. Consequently, the upper housing section 861 and the lower housing section 862 are combined.

The groove section 8616 is located on a side surface on the opposite side of the link mechanism 83 side in the upper housing section 861. A part of the cover 88 explained below is inserted into the groove section 8616.

As shown in FIG. 38, the lower housing section 862 is combined with the upper housing section 861. The cover 88 is attached to a part of the lower housing section 862. The lower housing section 862 includes bosses 8621 to 8623, a groove section 8624, and a covered section 8625.

The boss 8621 is inserted into the bearing BR in the hole section 7312 of the first link 831 together with the boss 8611. The boss 8622 is inserted into the hole section 7322 of the second link 832 together with the boss 8612.

The boss 8623 includes a hole section through which a screw fixed to the boss 8615 is inserted from below. Note that the bosses 8621 and 8622 also include hole sections through which screws fixed to the bosses 8611 and 8612 are inserted from below.

The groove section 8624 is located on a side surface on the opposite side of the link mechanism 83 side in the lower housing section 862. The groove section 8624 locks a part of the front side of the inserted cover 88 in conjunction with the groove section 8616.

The covered section 8625 is a part covered by the cover 88. The covered section 8625 is a part to which the temple frame 87 is fixed. The covered section 8625 includes two screw holes 8626 to which screws (not shown in the figure) inserted through the temple frame 87 are fixed.

Configuration of the Temple Frame

The temple frame 87 is equivalent to the frame section in the aspect of the invention. As shown in FIG. 37, the temple frame 87 is fixed to the covered section 8625 to extend to the back side from the covered section 8625. The temple frame 87 is formed of a material having flexibility in an arcuate shape. In this embodiment, the temple frame 87 is formed of metal. The temple frame 87 includes a fixed section 871, a curved section 873, an extending section 874, and an attachment section 875.

The fixed section 871 is a part fixed to the connecting section 86 (the covered section 8625) in the temple frame 87. The fixed section 871 includes two insert-through holes 872 in positions corresponding to the two screw holes 8626. Screws inserted through the insert-through holes 872 are fixed to the screw holes 8626, whereby the temple frame 87 is fixed to the lower housing section 862 (the covered section 8625). That is, the fixed section 871 is a fixing position of the temple frame 87 to the connecting section 86.

The curved section 873 is located near the fixed section 871 and further on the back side than the fixed section 871 and is curved in an arcuate shape to the opposite side of the left temple 82L. A part of the curved section 873 is in contact with an end portion on the back side in the covered section 8625 and functions as a fulcrum when the extending section 874 extending from the curved section 873 to the back side bends. Since the curved section 873 is curved in the arcuate shape, the extending section 874 easily bends. It is possible to increase the strength of the curved section 873 functioning as the fulcrum.

Note that a plurality of bending sections 873 may be provided in the temple frame 87 rather than one curved section 873. That is, the temple frame 87 may be formed in a wavy shape including the plurality of curved sections 873. In this case, the temple frame 87 (the extending section 874) can be configured to more easily bend.

As explained above, the extending section 874 is the part extending from the connecting section 86 to the back side together with the curved section 873. The extending section 874 has a shape curved in an arcuate shape further to the left temple 82L, which is the other temple, toward the back side. The extending section 874 can bend to the opposite side of the left temple 82L with the curved section 873 as the fulcrum.

The attachment section 875 is located at the distal end of the extending section 874. The attachment section 875 is formed to have the largest dimension in the thickness direction (a direction away from the head and a direction crossing the extending direction of the extending section 874) in the temple frame 87. Specifically, the attachment section 875 is formed in a substantially U shape obtained by folding back the extending section 874 to the opposite side of the left temple 82L (the head of the user). The restricting member 89 explained below is attached to the attachment section 875. The attachment section 875 includes a first locking section 876 and a second locking section 877.

The first locking section 876 is located at the distal end of the substantially U shape and formed in a step shape projecting to the opposite side of the left temple 82L and the head of the user. A dimension of the first locking section 876 in a direction crossing the extending direction of the extending section 874 is increased by the step shape. When the cover 88 covering the extending section 874 is attached, the first locking section 876 locks an end portion of the cover 88.

The second locking section 877 is located between the first locking section 876 and a folded-back portion of the extending section 874. The second locking section 877 is a projecting section that locks the restricting member 89 attached to the attachment section 875.

Configuration of the Cover

Figure 40:
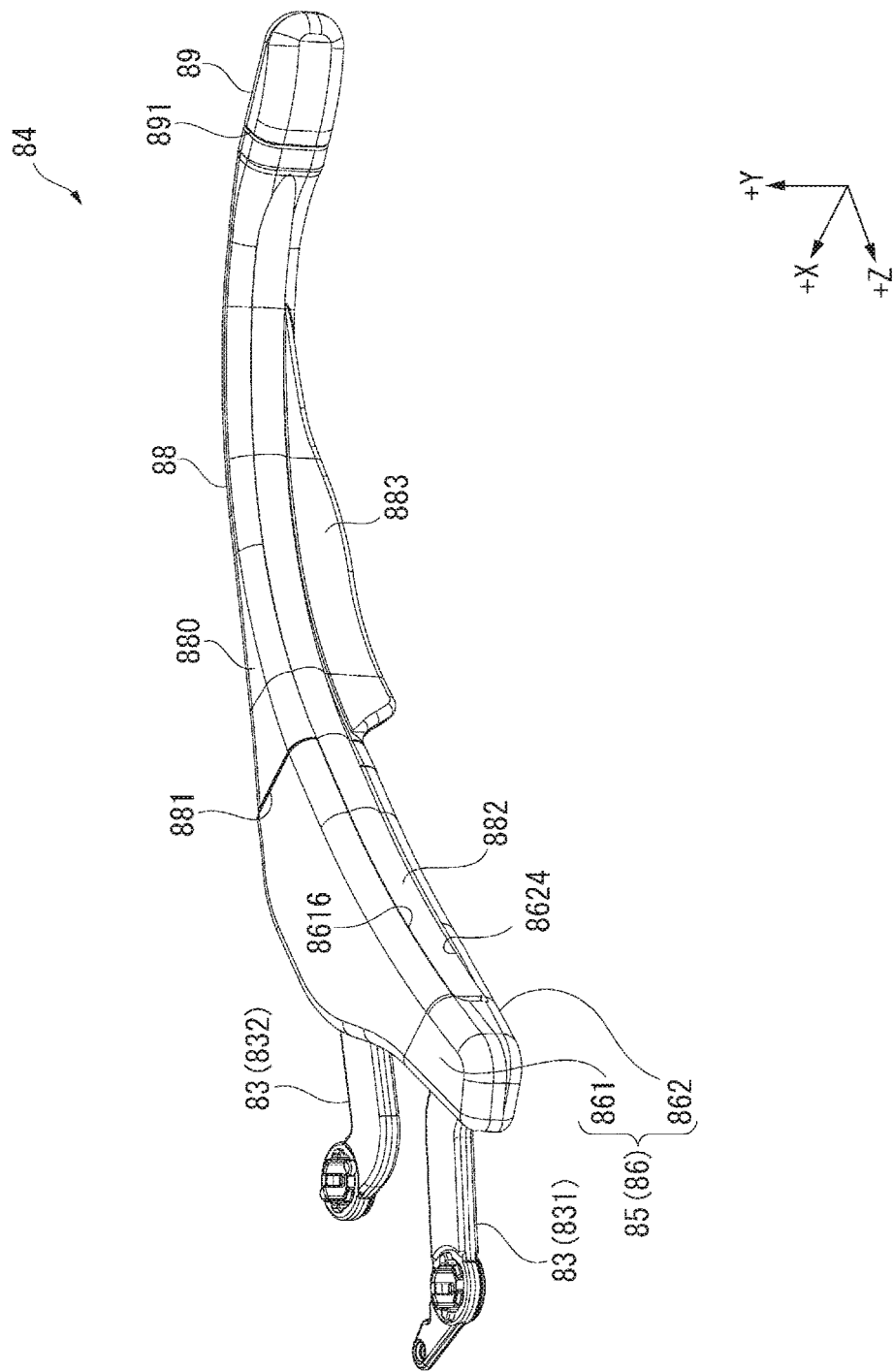
FIG. 40 is a perspective view showing a contact section in the third embodiment.
Figure 41:
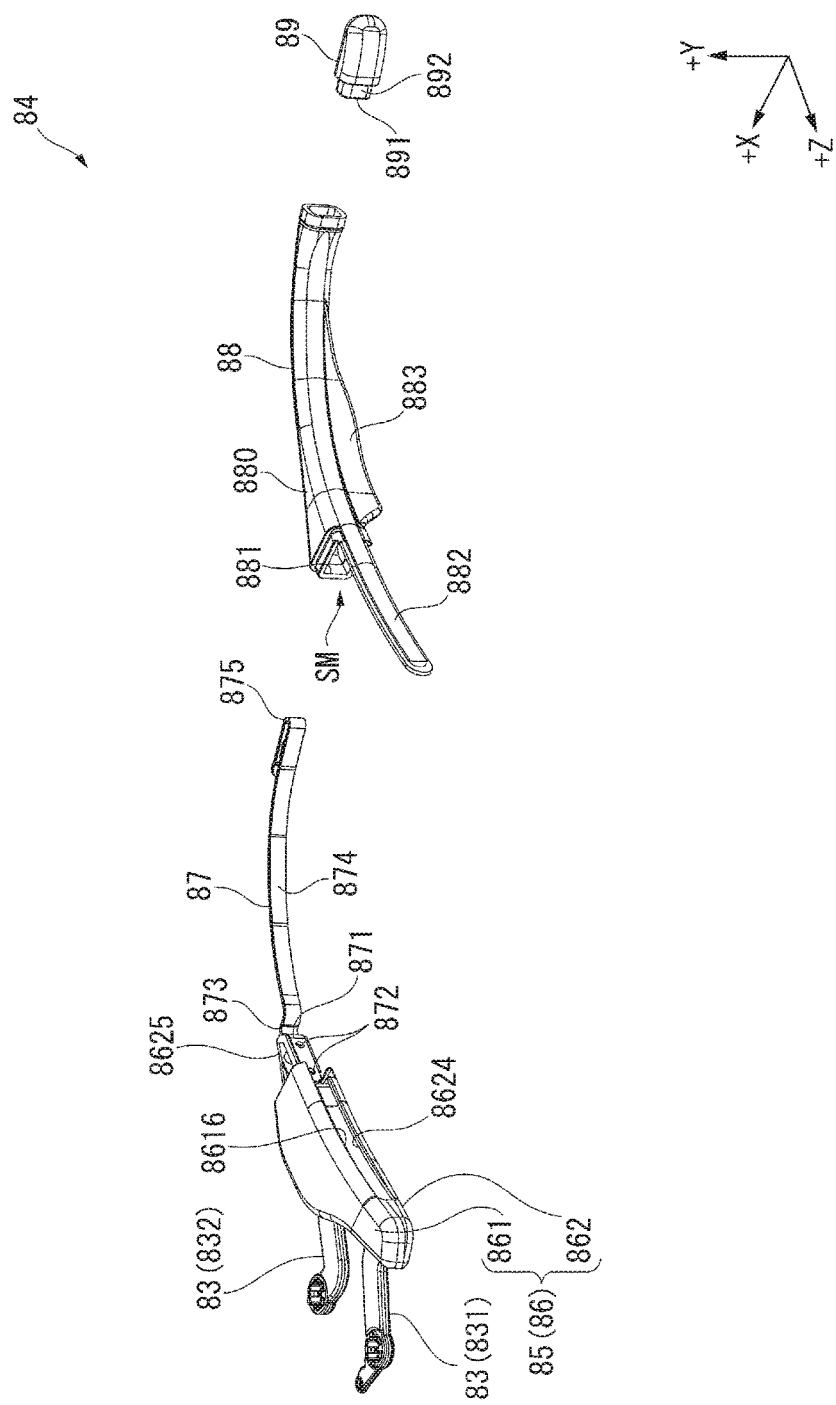
FIG. 41 is an exploded perspective view showing the contact section in the third embodiment.

FIGS. 40 and 41 are a perspective view and an exploded perspective view of the contact section 84 viewed from the opposite side of the link mechanism 83.

The cover 88 is a member that is attached to the main body section 85 to cover the temple frame 87 and is in contact with the head (a part from the temporal region to the back of the head) of the user. The cover 88 includes, as shown in FIGS. 40 and 41, a cover main body 880, an insert-through port 881, an extending section 882, and an expanded section 883.

The cover main body 880 is formed in a cylindrical shape having a smaller outer diameter further rearward from the connecting section 86.

The insert-through port 881 is a hole section that pierces through the cover main body 880 along the longitudinal direction of the cover main body 880. When the cover 88 is attached to the main body section 85, the temple frame 87 is inserted through the insert-through port 881. At this point, the attachment section 875 of the temple frame 87 is exposed to the outer side from an end portion on the back side of the cover 88 (the cover main body 880). In this state, the cover 88 is locked by the first locking section 876. That is, the cover 88 is detachably attachable to the main body section 85 to be inserted into and pulled out from the temple frame 87.

The extending section 882 is a part extending to the front side from the cover main body 880. The extending section 882 is inserted into the groove sections 8616 and 8624 of the connecting section 86 and locked.

Figure 42:
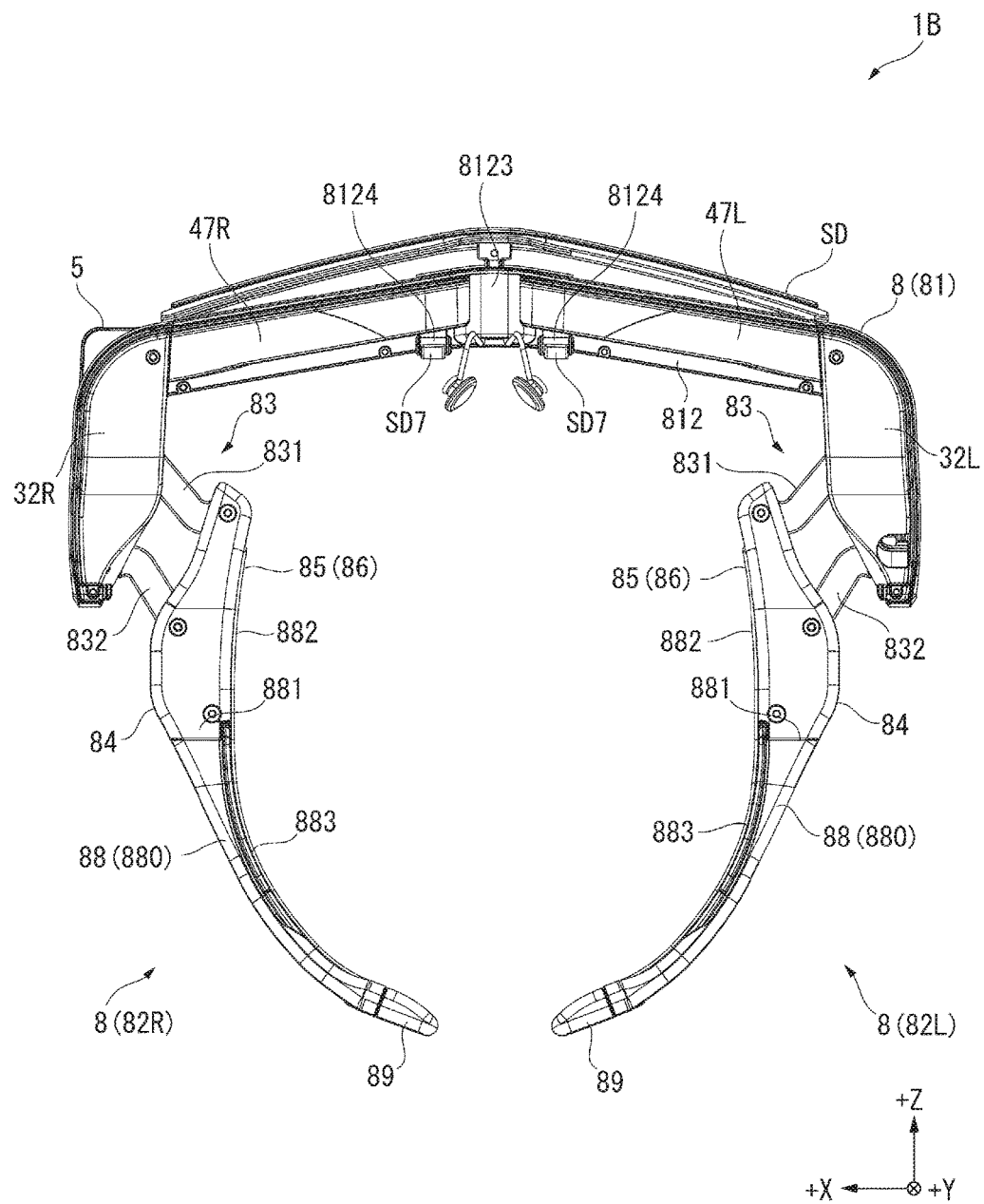
FIG. 42 is a diagram of the HMD viewed from below in the third embodiment.

FIG. 42 is a diagram of the HMD 1B viewed from below.

The expanded section 883 is a part hanging down from the cover main body 880. The expanded section 883 is a part disposed between the temporal region and the ear of the user and placed on the ear (e.g., an upper part of the root of the ear) and is a part for enlarging a contact area of contact with the head of the user in the cover 88. That is, the expanded section 883 is a part functioning as a position stabilizing section that stabilizes the position of the contact section 84.

As shown in FIG. 42, the expanded section 883 is formed in a part on the temporal region side of the user in the cover main body 880 such that a width dimension (a dimension along the +X direction, which is the left-right direction) decreases further downward. Therefore, it is easy to set the expanded section 883 in contact with the temporal region irrespective of the size of the head of the user. It is easy to place the expanded section 883 on the upper part of the root of the ear having a different shape depending on the user. Further, with such a configuration, even when a rear part (a part where the temple frame 87 and the cover 88 are located) in the contact section 84 is bent, the part is prevented from being less easily bent because of the presence of the expanded section 883.

Note that the expanded section 883 is formed in a substantially conical shape (a substantially truncated cone shape) having a smaller width dimension further downward. However, the expanded section 883 may be formed in a tabular shape, the width dimension of which does not substantially change.

Figure 43:
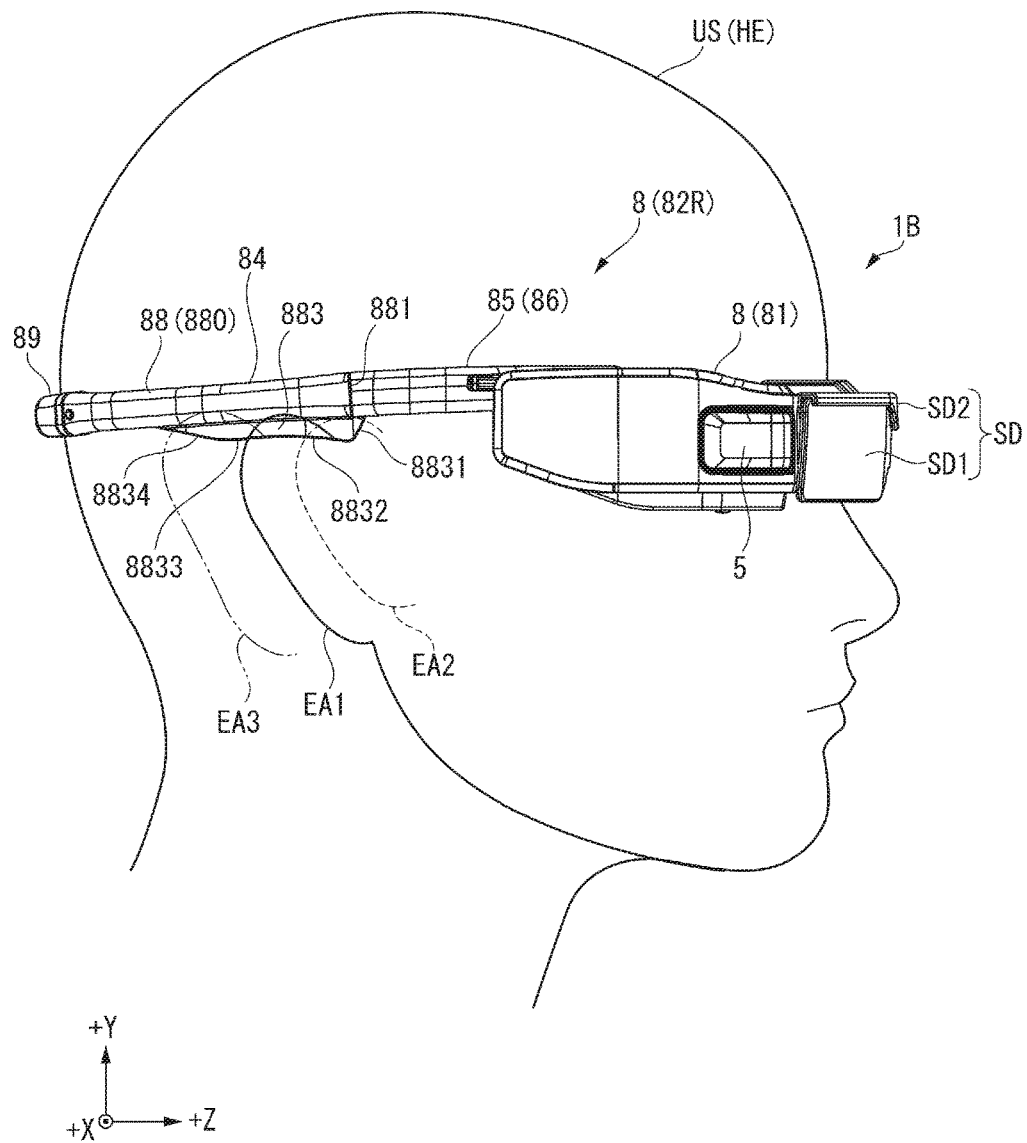
FIG. 43 is a right side view showing the HMD mounted on a user in the third embodiment.

FIG. 43 is a right side view showing the HMD 1B mounted on the user US. Note that, in FIG. 43, the shape of a head HE and the position of an ear EA1 of an average adult female are indicated by solid lines, the position of an ear EA2 of a child having a head smaller than the head of the adult female is indicated by a dotted line, and the position of an ear EA3 of an average adult male having a head larger than the head of the adult female is indicated by an alternate long and two short dashes line.

As shown in FIG. 43, the expanded section 883 includes inclined sections 8831 to 8834 at a lower outer edge in order from the front side.

The inclined section 8831 is a part located on the frontmost side in the expanded section 883 and inclined to be further spaced apart from the cover main body 80 further rearward from the cover main body 880.

The inclined section 8832 is a part inclined to be closer to the cover main body 880 further rearward from a back side end portion in the inclined section 8831.

The inclined section 8833 is a part inclined to be further spaced apart from the cover main body 880 further rearward from a back side end portion in the inclined section 8832.

The inclined section 8834 is a part located on the backmost side in the expanded section 883 and inclined to be closer to the cover main body 880 further rearward from the back side end portion in the inclined section 8833.

Note that, in this embodiment, the inclined sections 8832 and 8833 are formed in an integral arcuate shape. However, the inclined sections 8832 and 8833 may be respectively formed in linear shapes.

In the expanded sections 883, the back side end portion in the inclined section 8831 is a part having the largest projection amount downward from the cover main body 880. The back side end portion in the inclined section 8833 is a part having the next largest projection amount downward from the cover main body 880. That is, in the back side end portion in the inclined section 8832, the projection amount from the cover main body 880 is smaller than the projection amounts of the back side end portions in the inclined sections 8831 and 8833.

When the HMD 1B including the cover 88 is mounted on an adult female having an average size of a head, a part on the rear side in the inclined section 8832 is in contact with an upper part of the root of the ear EA1 indicated by the solid line in FIG. 43.

When the HMD 1B is mounted on a child having a head smaller than the head of the adult female, a part on the front side in the inclined section 8832 is in contact with an upper part of the root of the ear EA2 indicated by the dotted line in FIG. 43.

On the other hand, when the HMD 1B is mounted on an average adult male having a head larger than the head of the adult female, the inclined section 8833 is in contact with an upper part of the root of the ear EA3 indicated by the alternate long and two short dashes line in FIG. 43.

That is, the expanded section 883 is configured such that the ear of the user is in contact with the part of either one of the inclined sections 8832 and 8833 irrespective of the size of the head of the user.

Since the expanded section 883 is formed in such a shape, even when a plurality of users having different sizes of heads and different positions of ears wear the HMD 1B, it is possible to make it easy to maintain the contact section 84 in a constant disposition state (e.g., a disposition state in which the contact section 84 is substantially parallel to the viewing direction of the user). Consequently, it is possible to make it easy to locate the optical devices 4L and 4R (in particular, the light guide members 47L and 47R) in positions at an angle that makes it easy to visually recognize the outside world and an image based on image light when the user naturally views forward (e.g., a position where a crossing angle of the viewing direction and an optical path of image light incident on the eyes of the user when the viewing direction is set along the horizontal direction is 5°).

Further, since the contact section 84 can be disposed to be substantially parallel to the viewing direction of the user, it is possible to make it easy to locate the center-of-gravity position of the HMD 1B on the rear side with the temple frame 87 and the restricting member 89 explained below.

Such an effect is particularly effective when each of the viewing direction and the contact section 84 is set along the substantially horizontal direction. Therefore, it is possible to reduce a load applied to the nose of the user via the nose pads NP irrespective of the shape and the size of the user.

In addition, since the inclined sections 8832 and 8833 are formed in the integral arcuate shape as explained above, it is possible to make it easy to increase a contact area with the ear.

Note that, in the above explanation, the expanded section 883 is in contact with the upper part of the root of the ear of the user. However, the expanded section 883 only has to be in contact with the ear of the user and may be in contact with any part of the ear. Further, the contact position of the expanded section 883 with the head does not have to be the ear as long as the HMD 1B is stably mounted on the head.

The expanded section 883 includes the inclined sections 8831 to 8834. The inclined sections 8832 and 8833 are formed in the integral arcuate shape. However, not only this, but each of the inclined sections 8831 to 8834 may be formed in a linear shape or an arcuate shape. Further, the expanded section 883 may include a plurality of arcuate shape parts that can be in contact with the head (e.g., the ear). In addition, the expanded section 883 may be formed in a substantially triangular shape in side view having a smaller projection amount from the cover main body 800 (becoming thinner) further rearward.

A seal member SM is disposed between the cover 88 and the temple frame 87. The seal member SM prevents a gap from being formed between the temple frame 87 and the inner surface of the cover 88. In this embodiment, the seal member SM is provided on the inside of the cover 88. However, not only this, but the seal member SM may be provided on the outer surface of the temple frame 87.

Configuration of the Restricting Member

The restricting member 89 is detachably attached to the attachment section 875. The restricting member 89 is attached to the attachment section 875 to thereby restrict the cover 88 from coming off the main body section 85 and is detached from the attachment section 875 to thereby enable detachment of the cover 88 from the main body section 85. The restricting member 89 includes an opening section 891 into which the attachment section 875 is inserted. The inner surface of the opening section 891 is locked by the second locking section 877, whereby the restricting member 89 is prevented from unexpectedly coming off the attachment section 875.

Pressing Force Applied to the Head by the Contact Section

Figure 44:
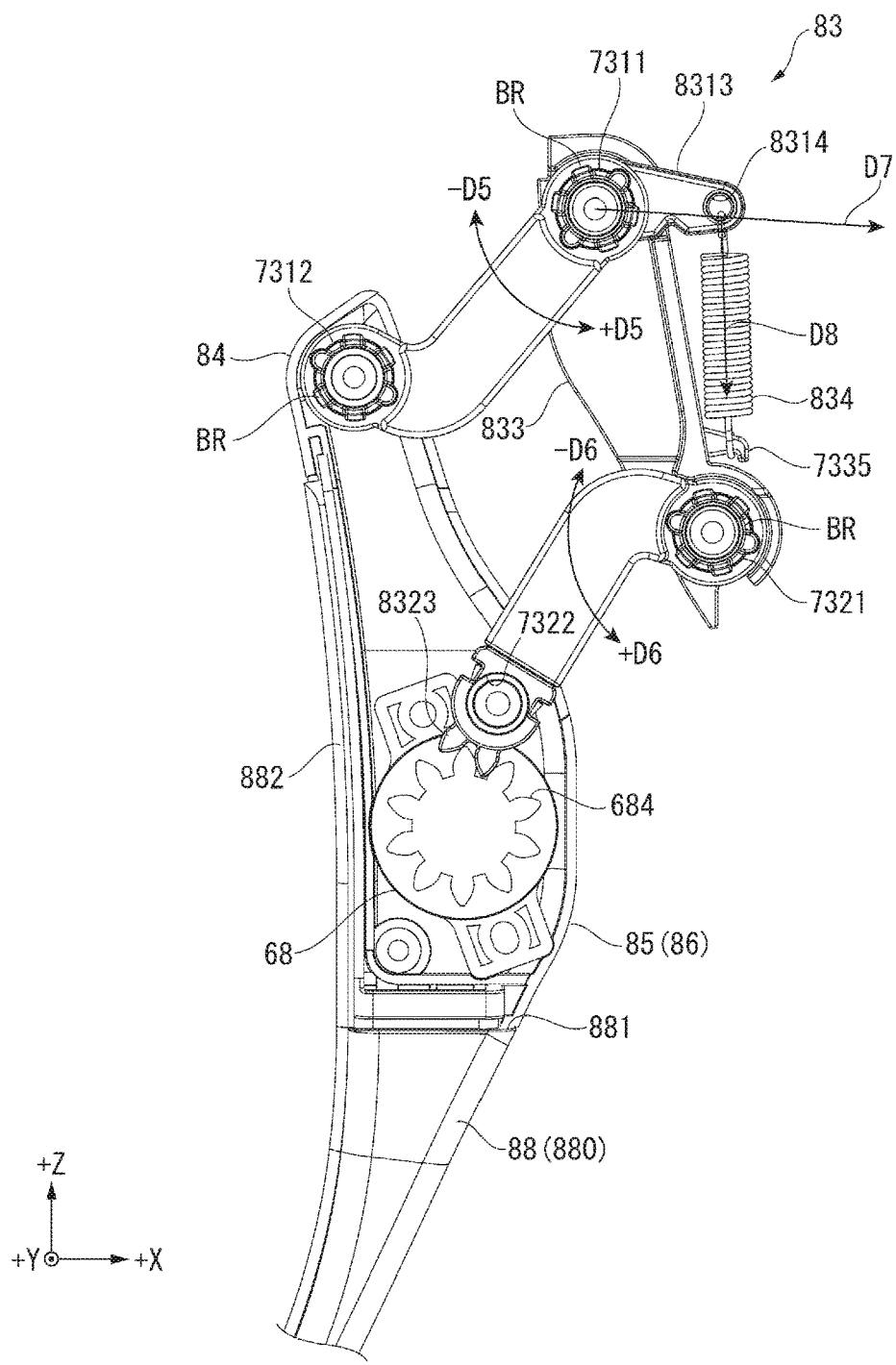
FIG. 44 is a plan view showing the link mechanism and the contact section in the third embodiment.

FIG. 44 is an enlarged plan view of the link mechanism 83 and the contact section 84.

In the right temple 82R, the contact section 84 is urged in a direction in which the contact section 84 moves close to the left temple 82L and the head of the user by an urging force in the −D5 direction by the urging section 834 via the first link 831 connected to the urging section 834. The right temple 82R is configured such that a pressing force acting when the contact section 84 is in contact with the head does not greatly change according to a turning state of the first link 831 (in other words, the position of the contact section 84) and has a value within a predetermined range.

Specifically, as shown in FIG. 44, when a direction from the turning center of the first link 831 (the center of the hole section 7311) toward an attachment position (the attaching hole 8314), to which one end of the urging section 834 is attached in the attaching section 8313, is represented as a D7 direction (a first direction), the D7 direction crosses (is substantially orthogonal to) the axial direction of the urging section 834, which is the helical tension coil, when the contact section 84 is located within a range between the first position and the second position. In other words, the D7 direction crosses (is substantially orthogonal to) a D8 direction (a second direction), which is a direction along the axial direction of the urging section 834 and from the attaching hole 8314 toward the attaching section 7335 of the base member 833.

The urging force by the urging section 834 increases as the first link 831 further turns in the +D5 direction (a direction in which the contact section 84 moves away from the head) and the dimension in the extending direction of the urging section 834 increases. That is, the urging force increases as the first link 831 further turns in the +D5 direction.

On the other hand, a force that acts on the attaching section 8313 along the D8 direction and is necessary for turning the first link 831 in the −D5 direction (a necessary turning force) increases as a crossing angle of the D7 direction and the D8 direction increases. That is, the necessary turning force increases as the first link 831 further turns in the +D5 direction.

A pressing force of the contact section 84 pressing the head of the user according to the turning of the first link 831 in the −D5 direction is a force obtained by combining the urging force by the urging section 834 and the necessary turning force. That is, the pressing force has a value obtained by subtracting the necessary turning force from the urging force by the urging section 834.

Consequently, it is possible to set the pressing force against the head by the contact section 84 to a value within a fixed range irrespective of the turning state of the first link 831, that is, the position of the contact section 84. Therefore, it is possible to prevent the pressing force from changing according to the position of the contact section 84 and the size of the head with which the contact section 84 is in contact.

Configuration of the Left Temple

As shown in FIGS. 31 and 32, the left temple 82L is located on the left side with respect to the head of the user and set in contact with the left temporal region and the back of the head of the user to sandwich the head of the user in conjunction with the right temple 82R. The left temple 82L is configured mirror-symmetrical to the right temple 82R. Although not shown in the figure in detail, the left temple 82L includes the link mechanism 83 including the first link 831, the second link 832, the base member 833, and the urging section 834, the main body section 85, the contact section 84 including the cover 88 and the restricting member 89, and the attenuating mechanism 68.

The left temple 82L operates the same as the right temple 82R. The temple 8 functions the same as the temple 7. The right temple 82R and the left temple 82L sandwich the head.

Effects of the Third Embodiment

With the HMD 1B according to this embodiment explained above, it is possible to achieve the same effects as the HMDs 1 and 1A and achieve effects explained below.

In the right temple 82R, the contact section 84 includes the boss 8612 functioning as the turning supporting section that turnably supports the second link 832, which is an attenuation target link, and the bosses 8613 and 8614 functioning as the attenuating-mechanism supporting section that supports the attenuating mechanism 68. The bosses 8612 to 8614 are respectively disposed in the different positions. The attenuating mechanism 68 and the second link 832 include the meshing sections 684 and 8323 that mesh with each other. Consequently, if the meshing sections 684 and 8323 mesh with each other, the turning force of the second link 832 can be transmitted to the attenuating mechanism 68. Therefore, it is possible to make it easy to engage the attenuating mechanism 68 and the second link 832 compared with when the second link 832 is supported by the attenuating mechanism 68. Since the bosses 8612 to 8614 are disposed in the positions different from one another in the upper housing section 861, it is possible to reduce a load of the attenuating mechanism 68 involved in the turning of the second link 832 compared with when the attenuating mechanism 68 supports the second link 832. Therefore, it is possible to achieve an extension of the life of the HMD 1B.

Note that the left temple 82L having the same configuration as the right temple 82R can achieve the same effects as the above.

The contact section 84 includes the pair of housing sections (the upper housing section 861 and the lower housing section 862) that holds a part of each of the first link 831 and the second link 832 along the up-down direction. The bosses 8612 to 8614 functioning as the turning supporting section and the attenuating-mechanism supporting section are located in the upper housing section 861. Consequently, the contact section 84 can be configured by attaching the lower housing section 862 to the upper housing section 861 after attaching the links 831 and 832 and the attenuating mechanism 68 to the upper housing section 861. Therefore, it is possible to simplify assembly of the contact section 84.

The urging section 834 is the tension spring (the helical tension spring), one end of which engages with the attaching hole 8314 of the first link 831, which is the urging target link, and the other end of which engages with the attaching section 7335 of the base member 833. In the first link 831, when the contact section 84 is located within the range between the first position and the second position, the D7 direction, which is the direction from the turning center (the center of the hole section 7311) with respect to the base member 833 toward the attaching hole 8314 serving as the attachment position with which one end of the urging section 834 engages, and the D8 direction along the axial direction of the urging section 834 cross each other. Consequently, as explained above, it is possible to set the pressing force to a value within a fixed range irrespective of the turning state of the first link 831, that is, the position of the contact section 84. That is, it is possible to apply a substantially constant pressing force to the head irrespective of the size of the head of the user on which the HMD 1B is mounted. Therefore, it is possible to reduce a load applied to the user by the size of the head.

The first link 831 includes the hole section 7311 functioning as the first-link-side first turning section and the hole section 7312 functioning as the first-link-side second turning section turnably supported by the contact section 84. The second link 832 includes the hole section 7321 functioning as the second-link-side first turning section and the hole section 7322 functioning as the second-link-side second turning section turnably supported by the contact section 84. The hole sections 7311, 7312, and 7321 are supported by the base member 833 and the contact section 84 via the bearings BR. Consequently, it is possible to prevent wear of the links 831 and 832, the base member 833, and the contact section 84 due to the turning of the links 831 and 832 and smoothly perform the turning of the links 831 and 832.

The contact section 84 includes the main body section 85 and the cover 88 that is provided to be detachably attachable to the main body section 85 and covers at least a part of the main body section 85. Consequently, it is possible to keep the HMD 1B in a clean state by replacing the cover 88 in contact with the head of the user according to necessity.

Note that the cover 88 is considered to be relatively easily deteriorated because the cover 88 is in contact with the head. When the cover 88 is deteriorated in this way, it is likely that a wearing feeling of the HMD 1B is spoiled. On the other hand, it is possible to prevent the wearing feeling from being spoiled by replacing the cover 88 according to necessity.

These effects are particularly effective when a plurality of users use one HMD 1B.

The main body section 85 includes the connecting section 86 connected to the first link 831 and the second link 832 and the temple frame 87 fixed to the connecting section 86 at one end and extending from the connecting section 86. As explained above, the temple frame 87 has flexibility. Consequently, it is possible to deform, with the flexibility of the temple frame 87, the contact section 84 to conform to the shape of the head of the user. Therefore, it is possible to dispose the contact section 84 along the head and improve the wearing feeling of the HMD 1B.

If a configuration without the curved section 873 is assumed, when the temple frame 87 bends, a load is easily applied to the fixing section 871 (the fixing position to the connecting section 86). For this reason, taking into account deformation and deterioration of the fixing section 871 and a fixing structure for fixing the connecting section 86 and the temple frame 87, it is necessary to reinforce the fixing section 871 or the fixing structure. Note that, in this embodiment, the temple frame 87 is fixed to the connecting section 86 by the screws. The same applies when other fixing structures are adopted.

On the other hand, the temple frame 87 includes the curved section 873 located on the distal end side in the extending direction of the temple frame 87 from the connecting section 86 with respect to the fixing section 871 fixed to the connecting section 86. Consequently, when the temple frame 87 (the extending section 874) bends, a position where the temple frame 87 bends can be defined in the curved section 873. Therefore, it is unnecessary to reinforce the fixing section 871 and the fixing structure. Since the curved section 873 is curved, it is possible to increase the strength of the position where the temple frame 87 bends. Further, since the temple frame 87 easily bends, it is possible to make it easy to deform the temple frame 87 and the contact section 84 along the shape of the head.

The contact section 84 includes the seal member SM between the temple frame 87 and the cover 88. Consequently, it is possible to prevent a gap from being formed between the temple frame 87 and the cover 88. Therefore, it is possible to prevent the wearing feeling of the HMD 1B from being deteriorated because, for example, the cover 88 is deformed.

The temple frame 87 is formed of metal. Consequently, it is possible to increase the strength of the temple frame 87 and the contact section 84. Besides, since a part on the back side of the contact section 84 is heavy, it is possible to impart a function of a counterweight to the temple frame 87. Therefore, it is possible to not only improve the wearing feeling of the HMD 1B but also reduce a fatigue feeling of the user who uses the HMD 1B.

The cover 88 includes the insert-through port 881 through which the temple frame 87 is inserted. The contact section 84 includes the restricting member 89 that restricts come-off of the cover 88, through the insert-through port 881 of which the temple frame 87 is inserted. Consequently, the cover 88 is attached such that the temple frame 87 is inserted through the insert-through port 881. Therefore, it is possible to easily attach the cover 88 to the temple frame 87 and the main body section 85. Since the come-off of the cover 88 is restricted by the restricting member 89, it is possible to prevent the cover 88 from unexpectedly coming off the main body section 85.

The temple frame 87 includes, at the extending direction distal end portion of the temple frame 87 from the connecting section 86, the attachment section 875 to which the restricting member 89 is attached. The attachment section 875 has a thickness dimension larger than a thickness dimension of other parts of the temple frame 87. Consequently, it is possible to prevent the restricting member 89 from coming off the attachment section 875 and surely prevent the cover 88 from coming off the temple frame 87.

The attachment section 875 is formed by folding back a part of the temple frame 87 (the extending section 874) to the opposite side of the side close to the head of the user. Consequently, it is possible to easily configure the attachment section 875 that can prevent the come-off of the restricting member 89. Besides, since the part on the back side in the contact section 84 is heavy, it is possible to cause the attachment section 875 to function as a counterweight in the HMD 1B.

Fourth Embodiment

A fourth embodiment of the invention is explained.

An HMD according to this embodiment has the same configuration as the HMD 1. However, the configuration of a temple is different. Note that, in the following explanation, the same or substantially same portions as the portions explained above are denoted by the same reference numerals and signs and explanation of the portions is omitted.

Figure 45:
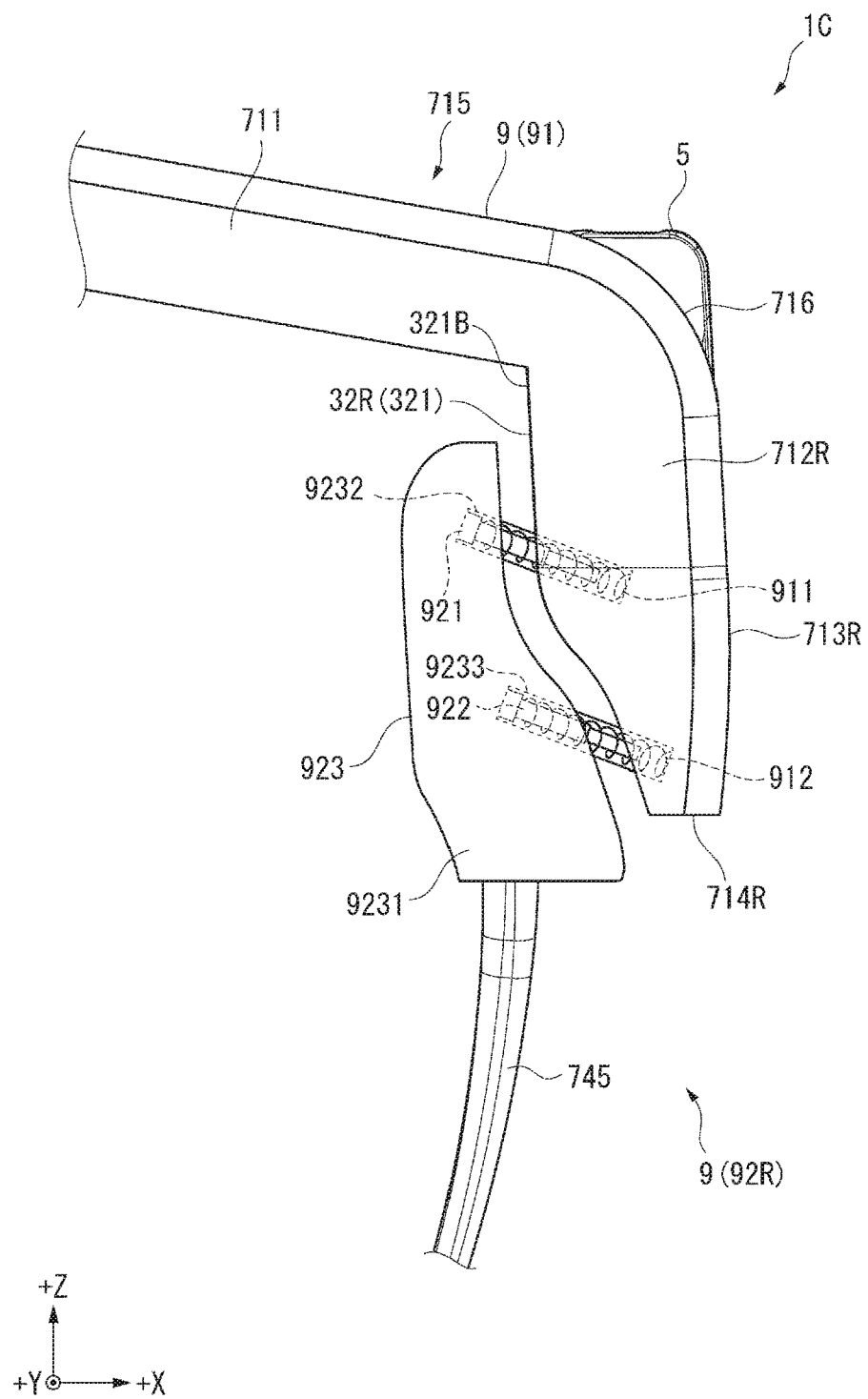
FIG. 45 is a plan view showing a temple of an HMD according to a fourth embodiment of the invention.

FIG. 45 is a plan view of a temple 9 included in an HMD 1C according to this embodiment.

As shown in FIG. 45, the HMD 1C according to this embodiment includes the same components and functions as the HMD 1A except that the HMD 1C includes the temple 9 instead of the temple 7.

Configuration of the Temple

Like the temple 7, the temple 9 includes a cover member 91, a right temple 92R, and a left temple (not shown in the figure). Note that, although not shown in the figure, the left temple is configured mirror-symmetrical to the right temple 92R. Therefore, explanation of the left temple is omitted.

Configuration of the Cover Member

Like the cover member 71, the cover member 91 is formed in a substantially U shape and attached to the image display section 2 (the case members 32L and 32R). The cover member 91 covers the front section 311 and the case members 32L and 32R from above and covers the side surface sections 312L and 312R from the outer side.

The cover member 91 includes the front section 711, the extending sections 712L and 712R, and the side surface sections 713L and 713R respectively functioning as the exterior sections, the fixing sections 714L and 714R, the concave section 715, and the opening section 716 (in FIG. 43, the extending section 712L, the side surface section 713L, and the fixing section 714L are not shown). Besides, the cover member 91 includes disposing sections 911 and 912 functioning as supporting sections in which extendable members 921 and 922 are disposed and that support a contact section 923 via the extendable members 921 and 922.

The disposing sections 911 and 912 are hole sections that are located on the lower surface of the extending section 712R and in which one ends of the extendable members 921 and 922 are respectively disposed. The disposing sections 911 and 912 are opened to the head side of a user, that is, the contact section 923 that configures the right temple 92R.

Note that, although not shown in the figure, two disposing sections that are opened to a contact section, which configures the left temple, and in which the same extendable members as the extendable members 921 and 922 are disposed are located on the lower surface of the extending section 712L as well.

In this way, the cover member 91 is a right supporting section that supports the right temple 92R and a left supporting section that supports the left temple. The cover member 91 configures an exterior section that covers the top and the sides of the frame 3 (the frame main body 31 and the case members 32L and 32R) and configures the exterior of the HMD 1C.

Configuration of the Right Temple

Like the right temples 72R and 82R, the right temple 92R is set in contact with the right temporal region and the back of the head (specifically, a part on the right side in the back of the head) of the user and sandwiches the head of the user in conjunction with the left temple set in contact with the left temporal region and the back of the head (specifically, apart on the left side in the back of the head). The right temple 92R includes the extendable members 921 and 922, one ends of which are disposed in the disposing sections 911 and 912, and the contact section 923 connected to the extendable members 921 and 922.

Note that, as explained above, the left temple is configured mirror-symmetrical to the right temple 92R. Like the right temple 92R, the left temple includes the extendable members 921 and 922 and the contact section 923.

The one ends of the extendable members 921 and 922 are disposed in the disposing sections 911 and 912 and the other ends of the extendable members 921 and 922 are disposed in the contact section 923. The extendable members 921 and 922 connect the cover member 91 and the contact section 923. The extendable members 921 and 922 respectively extend and contract to thereby enable the entire contact section 923 to move in a direction in which the contact section 923 moves close to and away from the cover member 91 and urge the entire contact section 923 in a direction in which the entire contact section 923 moves away from the cover member 91 (an extending section 812R), that is, a direction in which the contact section 923 moves close to the head of the user. In this embodiment, the extendable members 921 and 922 are respectively configured by rod springs obtained by combining compression coil springs and bar-like members.

Like the contact sections 74 and 84, the contact section 923 is a member set in contact with the right temporal region and the back of the head of the user and suspended on the ear of the user. The contact section 923 includes a main body section 9231 connected to the extendable members 921 and 922 and the contact piece 745 provided in the main body section 9231.

Like the main body section 741, the main body section 9231 is disposed to be opposed to the case member 32R (the side surface section 321B of the upper case 321). The main body section 9231 includes disposing sections 9232 and 9233, which are hole sections in which the other ends of the extendable members 921 and 922 are disposed.

Note that the extendable member 921 and the extendable member 922 are disposed substantially in parallel to each other. However, the extendable members 921 and 922 are disposed to incline with respect to the front-back direction and the left-right direction to be located forward from one end side (an end portion side disposed in the disposing sections 911 and 912 and an engaging position side with the cover member 91) toward the other end side (an end portion side disposed in the disposing section 9232 and 9233 and an engaging position side with the contact section 923). Note that the extendable members 921 and 922 may be disposed to incline in the up-down direction to be located upward or downward from the one end side toward the other end side.

The right temple 92R explained above and the left temple mirror-symmetrical to the right temple 92R are provided in the HMD 1C. Therefore, the entire contact section of each of the right temple 92R and the left temple can be moved in a range of a first position spaced apart from the extending sections 712L and 712R of the cover member 91 (the first position closest to the head) most to a second position closest to the extending sections 712L and 712R (the second position most away from the head). Consequently, it is possible to set the contact sections 923 in contact with the temporal regions and the back of the head with an appropriate urging force irrespective of the size of the head of the user on which the HMD 1C is mounted. Therefore, it is possible to sandwich the head of the user with the contact sections 923 and surely mount the HMD 1C on the head.

Note that, in this embodiment, movement of the contact sections 923 is translation between the first positions and the second positions. However, not only this, but the contact sections 923 may turn around an engaging position with one of the extendable members 921 and 922 such that an interval between the rear ends of the contact sections 923 increases as the contact sections 923 move from the first positions to the second positions.

Effects of the Fourth Embodiment

With the HMD 1C according to this embodiment explained above, it is possible to achieve the same effects as the HMD 1, the HMD 1A, and the HMD 1B and achieve effects explained below.

The cover member 91 functioning as the right supporting section supports the extendable members 921 and 922, which configure the right temple 92R, and supports the contact section 923 (the target contact section) connected to the extendable members 921 and 922. Although not shown in the figure, the cover member 91 functioning as the left supporting section as well supports the extendable members 921 and 922, which configures the left temple configured mirror-symmetrical to the right temple 92R, and supports the contact section 923 (the target contact section) connected to the extendable members 921 and 922. The entire contact sections 923 are movable between the first positions and the second positions with the extendable members 921 and 922 respectively corresponding to the contact sections 923. The dimension in the left-right direction between the contact sections 923 at the time when the contact sections 923 are respectively located in the second positions is larger than the dimension at the time when the contact sections 923 are respectively located in the first positions. Consequently, the head of the user US is located between the contact sections 923, whereby it is possible to surely set the entire contact sections 923 in contact with positions (temporal regions) corresponding to the sizes of heads having different sizes in the left-right direction. Therefore, it is possible to prevent contact areas of the head and the contact sections 923 from changing according to the size of the head and maintain the contact areas substantially constant. Therefore, it is possible to stably mount the HMD 1C on the head.

Note that, even when one contact section of the left and right contact sections 923 is fixed and the entire other contact section is movable by the configuration explained above, since the entire contact section is movable in the direction in which the contact section moves close to and away from the head, it is possible to achieve the effects.

As explained above, the center of gravity of the HMD is located on the relatively front side. Therefore, if the extendable members 921 and 922 are disposed to incline with respect to the front-back direction and the left-right direction to be located rearward from one end side (the engaging position side with the cover member 91) toward the other end side (the engaging position side with the contact section 923), a force of the head of the user pushing back the contact section 923 acts forward when the HMD is mounted. In this case, it is likely that the HMD drops to the front side from the head, for example, when the user casts the face down.

On the other hand, the extendable members 921 and 922 are disposed to incline to the front-back direction and the left-right direction to be located forward from the one end side toward the other end side. Consequently, it is possible to cause the force of the head of the user pushing back the contact section 923 to act rearward. Therefore, it is possible to prevent the HMD 1C from dropping from the head and stably mount the HMD 1C on the head.

When the contact section 923 is located in the first position, the contact section 923 is located on a side closer to the other contact section 926 and the head of the user and the front side. When the contact section 923 is located in the second position, the contact section 923 is located on a side away from the other contact section 923 and the user and the rear side. Consequently, it is possible to appropriately set the contact sections 923 in contact with the temporal regions and the back of the head irrespective of the size of the head.

Modifications of the Embodiment

The invention is not limited to the embodiments. Modifications, improvements, and the like in a range in which the object of the invention can be achieved are included in the invention.

In the first embodiment, the left and right temples 6L and 6R are provided in the image display section 2. In the second and third embodiments, the left temples 72L and 82L and the right temples 72R and 82R are provided in the cover members 71 and 81 attached to the image display section 2. In the fourth embodiment, the left temple and the right temple 92R are provided in the cover member 91 attached to the image display section 2. That is, the contact sections are movably provided on the left and the right of the image display section 2. However, not only this, but one contact section of the left and right contact sections respectively set in contact with the head (temporal regions) of the user may be fixed and the other contact section may be movably provided. A contact part of the contact section in the head may be set in contact with the temporal region and does not always have to be the range from the temporal region to the back of the head. Further, the contact section does not have to be suspended on the ear.

In the first embodiment, the temples 6L and 6R include the first links 64L and 64R and the second links 65L and 65R that move the entire contact sections 67R and 67L in the left-right direction and the front-back direction. In the second and third embodiments, the temples 7 and 8 include the first links 731 and 831 and the second links 732 and 832 that move the entire contact sections 74 and 84 in the left-right direction and the front-back direction. In the fourth embodiment, the temple 9 includes the extendable members 921 and 922 that move the entire contact sections 923 in the left-right direction and the front-back direction. However, not only this, but a configuration for moving the contact sections set in contact with the head of the user in the left-right direction and the front-back direction may be other configurations such as a combination of rail members and slide members. Further, the contact sections do not have to move in the front-back direction and may move in the up-down direction as long as the entire contact sections are capable moving at least in the left-right direction, which is the directions in which the contact sections move close to and away from the head.

The first links 64L and 64R and the second links 65L and 65R, the first links 731 and 831 and the second links 732 and 832, and the extendable members 921 and 922 are respectively provided in the parts on the upper side (the upper side with respect to the case members 32R and 32L) in the image display section 2. On the other hand, the links and the members may be provided in parts on the lower side (the lower side with respect to the case members 32R and 32L) or parts substantially in the center (substantially in the center of the case members 32R and 32L in the up-down direction) in the image display section 2. The positions of the supporting sections that support the links and the members with respect to the image display section 2 can be changed as appropriate. For example, the cover members 71, 81, and 91 may be provided in the image display section 2 to cover the image display section 2 (the frame 3) from the lower side.

In the first embodiment, when the contact section 67R is located in the first position, the extending directions of the first link 64R and the second link 65R from the engaging positions with the outer cover 61R and the inner cover 62R are parallel to each other. The same applies to the first link 64L and the second link 65L. In the second and third embodiments, when the contact sections 74 and 84 are located in the first positions, the extending directions of the first links 731 and 831 and the second links 732 and 832, which respectively configure the right temples 72R and 82R, from the engaging positions with the base members 733 and 833 are parallel to each other. The same applies to the first links 731 and 831 and the second links 732 and 832 that configure the left temple 72L. In the fourth embodiment, the extendable members 921 and 922, which configure the right temple 92R, are disposed in parallel to each other. However, not only this, but one link and the other link may be disposed to be vertically shifted as long as extending directions of the links (extending directions of portions excluding the bent portions in the first links 731 and 831 and the second links 732 and 832) are parallel. Similarly, one of the extendable members 921 and 922 may be disposed to be vertically shifted from the other.

In the fourth embodiment, the extendable members 921 and 922 are disposed to incline to be located further on the front side from the engaging position with the cover member 91 toward the engaging position with the contact section 923. However, not only this, but the disposition of the extendable members 921 and 922 can be changed as appropriate. For example, as explained above, the extendable members 921 and 922 may be disposed to incline to be located further on the rear side from the engaging position with the cover member 91 toward the engaging position with the contact section 923.

The extendable members 921 and 922 may be disposed such that one of the extendable members 921 and 922 inclines with respect to the other without being parallel to each other. For example, in a disposition state of the extendable members 921 and 922 inclining with respect to the front-back direction and the left-right direction such that a direction from the engaging position with the cover member 91 toward the engaging position with the contact section 923 is the front side, one extendable member of the extendable members 921 and 922 may be disposed to incline such that an interval between the end portions on the contact section 923 side in the extendable members 921 and 922 is larger than an interval between the end portions on the cover member 91 side. In this case, if an engaging section of at least one of the extendable members 921 and 922 and the contact section 923 is movable in the front-back direction along the contact section 923, compared with when the contact sections 923 are moved in parallel in the movement of the contact section 923 to the second positions, it is possible to move the contact section 923 while turning the contact section 923 such that the interval between the contact sections 923 further increases.

Further, the number of extendable members connected to the contact section is not limited to two and may be one or three or more.

In the first embodiment, in the temples 6L and 6R, the contact sections 67L and 67R are set in contact with the head of the user. In the second to fourth embodiments, in the temples 7 to 9, the contact sections 74, 84, and 923 disposed on the left and the right of the user are set in contact with the head of the user. In addition to the movable contact sections 67L, 67R, 74, 84, and 923, the HMD may include other contact sections that are fixed to the frame 3 (the frame main body 31 or the case members 32L and 32R) of the image display section 2, the outer covers 61L and 61R, or the inner covers 62L and 62R and set in contact with parts different from the contact parts of the contact sections 67L, 67R, 74, 84, and 923 in the head. As such other contact sections (second contact sections in the case in which the contact sections 67L, 67R, 74, 84, and 923 are represented as first contact sections), arms extending from the frame 3 of the image display section 2, the outer covers 61L and 61R, or the inner covers 62L and 62R can be illustrated. As the contact parts of the other contact sections, parts further on the upper side or the lower side than the contact parts of the contact sections 67L, 67R, 74, 84, and 923 in the head can be illustrated. Besides, parts further on the rear side or the front side than the contact parts of the contact sections 67L, 67R, 74, 84, and 923 can be illustrated. The other contact sections may be provided on the left and the right according to the contact sections 67L, 67R, 726, and 923 or may be provided substantially in the center of the frame 3 (the front section 311). That is, disposition positions of the other contact sections can be set as appropriate.

In the embodiments, a plurality of nose pads NP are prepared according to the sizes and the shapes of noses of users. The nose pads NP suitable for the user are attached to the mounting section 3111. The HMD 1, 1A, 1B, and 1C may include an adjusting mechanism capable of adjusting at least either one of a position (a height position) in the up-down direction and a position (a depth position) in the front-back direction of the nose pads NP. With such an adjusting mechanism, it is possible to dispose the nose pads NP according to a nose having different height for each user. It is possible to achieve improvement of a wearing feeling and a reduction of a fatigue feeling.

In the second to fourth embodiments, the fixing sections 714L and 714R are fixed to the fixing section 3121 located at the rear end of each of the side surface sections 312L and 312R, whereby the cover members 71, 81, and 91 are fixed to the frame 3. Instead of or in addition to such a fixing method, a fixing method for fixing the cover members 71, 81, and 91 to a fixing member provided in the frame 3 may be adopted. As the fixing member, a fixing member attached to the frame main body 31 along the front section 311 can be illustrated. Fixing positions of the cover members 71, 81, and 91 in the fixing member can be set to positions corresponding to the part substantially in the center in the front section 311. Besides, when the fixing member has a dimension (a dimension in the left-right direction) in a degree of reaching the vicinities of the left end portion 311L and the right end portion 311R, the fixing positions can be set to positions near left and right end portions in the fixing member.

The cover members 71, 81, and 91 do not have to have the configuration obtained by integrating the left supporting section and the right supporting section. The left supporting section and the right supporting section may be separated. For example, the left and right parts in the cover members 71, 81, and 91 may be independently formed as a right cover member and a left cover member. The right cover member including the extending section 712R can be used as the right supporting section. The left cover member including the extending section 712L can be used as the left supporting section. Note that a front section may be absent in the right cover member and the left cover member.

In the first embodiment, the urging section (the urging section 66R) urges the second links 65L and 65R. In the second and third embodiments, the urging sections (the urging sections 734 and 834) urge the first links 731 and 831. However, not only this, but urging sections may be provided in the respective links. An urging force of one urging section may act on the links. An urging section that urges the contact section in a direction in which the contact section moves close to the head via the links may be absent. In the temples 6L and 6R explained in the first embodiment, the urging sections may be configured to engage with and urge the first links. In the temples 7 and 8 explained in the second and third embodiments, the urging sections 734 and 834 may be configured to engage with and urge the second links 732 and 832. Further, an urging section may be provided such that the urging force may act on only one contact section of the left and right contact sections. That is, the urging section may be provided in only one of the left and the right.

The urging section 66R is configured by the torsion coil spring and the urging sections 734 and 834 are configured by the tension spring (the helical tension spring). However, not only this, but the configuration of the urging section that causes the urging force to act may be other configurations.

In the embodiments, the temples 6L, 6R, 7, 8, and 9 includes the attenuating mechanisms such as the attenuating mechanism 68. However, not only this, but the attenuating mechanisms may be absent. A component with which the attenuating mechanism engages may be either the first link or the second link. The position of the attenuating mechanism may be the link mechanism side or may be the contact section side as in the first embodiment. Further, the configuration of the attenuating mechanism that attenuates the moving force of the contact section is not limited to the configuration explained above and may be other configurations. For example, an attenuating mechanism may be adopted that includes a first meshing member such as a gear provided in the turning axis of one link of the first link and the second link and a second meshing member such as a gear that meshes with the first meshing member and, since the turning resistance of the second meshing member is larger than the turning resistance of the first meshing member, attenuates a turning force of the first meshing member and a turning force of the one link to attenuate a moving force of the contact section.

In the first embodiment, the temples 6L and 6R includes the outer covers 61L and 61R and the inner covers 62L and 62R functioning as the left supporting section and the right supporting section that cover the side surface sections 312L and 312R of the frame main body 31 and the case members 32L and 32R. In the second to fourth embodiments, the cover members 71, 81, and 91 functioning as the left supporting section and the right supporting section, which configure the temples 7, 8, and 9, cover apart of the front surface section of the front section 311 and the side surface sections 312L and 312R of the frame main body 31 from above and the sides and cover the tops of the case members 32L and 32R. That is, the outer covers 61L and 61R, the inner covers 62L and 62R, and the cover members 71, 81, and 91 include the exterior sections that configure parts of the exteriors of the HMDs 1, 1A, 1B, and 1C. However, not only this, but, in an HMD, parts where left and right supporting sections, which support a contact section set in contact with the head of a user, configure the exterior of the HMD may be any parts.

The outer covers 61L and 61R, the inner covers 62L and 62R, and the cover members 71, 81, and 91 may be absent. For example, at least any one of the first links 64L, 64R, 731, and 831, the second links 65L, 65R, 732, and 832, and the extendable members 921 and 922 may be provided in the frame main body 31 and the case members 32L and 32R.

On the other hand, the case members 32L and 32R may be absent. In this case, for example, the image projecting section 41 may be provided in the outer covers 61L and 62R and the inner covers 62L and 62R. The image projecting section 41 may be attached to the cover members 71 81, and 91.

In the first embodiment, in the contact sections 67L and 67R, the contact piece 674 extending rearward from the sandwiching member 671 and set in contact with the head of the user is thinner than the sandwiching member 671. In the second and fourth embodiments, in the contact sections 74 and 923, the contact piece 745 extending rearward from the main body sections 741 and 923 is thinner than the main body sections 741 and 9231. However, not only this, but the contact section may have constant thickness. The main body sections connected to the links 64L, 64R, 731, 65L, 65R, and 732 and the extendable members 921 and 922 may be thinner than the contact piece. The same holds true in the contact section 84 explained in the third embodiment.

In the second and fourth embodiments, the rear ends (the parts on the opposite direction side of the direction in which the user observes an image) in the contact sections 74 and 923 (the contact piece 745) are formed thick to configure the center-of-gravity adjusting section 746. However, not only this, but the center-of-gravity adjusting section 746 may be absent. Even when the center-of-gravity adjusting section 746 is provided, the shape, the thickness, and the weight of the center-of-gravity adjusting section 746 can be changed as appropriate. For example, by disposing a heavy object in the contact piece 745, a disposition part of the heavy weight may be configured as a center-of-gravity adjusting section. In this case, the thickness of the center-of-gravity adjusting section may be the same as or may be smaller than the thickness of other parts in the contact piece 745. As the heavy object, components (e.g., a battery, a sensor, a communication module, and a control module) necessary for functions of a HMD (a head-mounted image display device)

can be illustrated. Besides, the heavy object may be a weight configured by a substance having large specific gravity such as metal. For example, when the contact piece 745 is formed of synthetic resin, a part of the contact piece 745 may be formed of metal and used as the center-of-gravity adjusting section. Further, the position of the center-of-gravity adjusting section is not limited to the rear end of the contact section and may be any position. In the second and fourth embodiments, the main body sections 7261 and 9231 relatively heavy in the contact sections 74 and 923 are located in the positions on the front side in the contact sections 74 and 923. The contact piece 745 extends rearward from the main body sections 7261 and 9231. Therefore, irrespective of in which position of the contact piece 745 the center-of-gravity adjusting section is located, it is possible to shift the center-of-gravity position of the HMD, which tends to deviate to the front side, to the rear side. In addition, the center-of-gravity adjusting section may be provided at the rear ends of the contact sections 67L and 67R.

In the embodiments, the left and right contact sections are configured to be movable in the range in which the dimensions L1 and L2 in the left-right direction between the contact sections are 128 mm or more and 170 mm or less. However, not only this, but the range can be changed as appropriate. For example, the dimensions L1 and L2 may be in a range of 120 mm or more or may be in a range of 180 m or less.

In the third embodiment, the attenuating mechanism 68 and the second link 832 disposed in the connecting section 86 mesh each other in the meshing sections 684 and 8323 included in the attenuating mechanism 68 and the second link 832 to thereby engage with each other. However, not only this, but, as in the case of the temple 7, the second link 832 may be supported by the attenuating mechanism 68. The configurations of the attenuating mechanism and the second link that mesh with each other in this way may be adopted in the temple 7. Further, only one of the right temple and the left temple may include the attenuating mechanism and the second link that mesh with each other. Further, a link with which the attenuating mechanism engages is not limited to the second link and may be the first link. For example, the attenuation target link and the urging target link may be the same link.

In the third embodiment, the upper housing section 861 of the connecting section 86, which configures the main body section 85 of the contact section 84, includes the boss 8612 functioning as the turning supporting section that turnably supports the second link 832 and the bosses 8613 and 8614 that support the attenuating mechanism 68. However, not only this, but the lower housing section 862 may include the bosses 8612 to 8614. In this case, since the lower housing section 862 includes the boss 8622 inserted into the hole section 7322 of the second link 832, bosses equivalent to the bosses 8613 and 8614 only have to be separately provided. Further, either one of the upper housing section 861 and the lower housing section 862 only has to include a structure that supports the first link 831, the second link 832, and the attenuating mechanism 68.

In the third embodiment, when the contact section 84 is located within the range between the first position and the second position, the D7 direction and the D8 direction cross each other. However, not only this, but it is sufficient that the urging force of the urging section 834 acts on the first link 831, the first link 831 is turned in the −D5 direction, and the contact section 84 is urged in the direction in which the contact section 84 move close to the head of the user. The same applies to both of the right temple 82R and the left temple 82L.

In the third embodiment, the first link 831 and the second link 832 are supported by the base member 833 and the contact section 84 (the upper housing section 861 and the lower housing section 862) via the bearings BR. However, not only this, but the bearings BR may be absent. The contact section 84 may support the second link 832 via the bearing BR. Further, the bearings BR may be applied to the links of the temples 6L, 6R, and 7.

In the third embodiment, the contact section 84 includes the main body section 85 and the cover 88 that covers at least a part of the main body section 85. However, not only this, but the cover 88 may be absent. A cover that covers the entire contact section 84 may be provided. The cover that covers the contact section in this way may be adopted in the contact sections of the other temples 6L, 6R, 7, and 9.

In the third embodiment, the main body section 85 of the contact section 84 includes the connecting section 86 and the temple frame 87 having flexibility. The cover 88 is attached to cover the temple frame 87. However, not only this, but the temple frame 87 may have flexibility. A configuration may be adopted in which the connecting section 86 extends to the back side instead of the temple frame 87.

Further, the temple frame 87 does not have to be formed of metal and may be formed of another material such as synthetic resin. The seal member SM may be absent between the temple frame 87 and the cover 88. A gap may be formed between the temple frame 87 and the cover 88.

In the third embodiment, the temple frame 87 includes the curved section 873 on the extending direction distal end side of the temple frame with respect to the fixing section 871. However, not only this, but the curved section 873 may be absent. A fulcrum section having another shape may be provided if the fulcrum section is set as a fulcrum of bending of the temple frame 87.

In the third embodiment, the cover 88 includes an insert-through port 881 through which the temple frame 87 is inserted. However, not only this, but the temple frame 87 does not have to be inserted through the cover 88 as long as the cover 88 is surely locked to the temple frame 87. The restricting member 89 may be absent.

The covers 88 are formed in the shapes conforming to the right temporal region and the left temporal region of the user and individually attached to the temple frames 87 of the right temple 82R and the left temple 82L. However, not only this, but the shape of the covers 88 may be formed in an arcuate shape conforming to the back of the head and the top of the head of the user. For example, a cover may be formed in a shape like a headband (a hair band) that covers parts of the left and right contact sections 84 and extends along the top of the head. In this case, the cover may include parts that extend to the rear (the back side) of the user like the covers 88. A cover like an arcuate (substantially semicircular) band conforming to the back of the head of the user may be adopted. In this case, one end of the cover may be attached to the contact section 84 (e.g., the temple frame 87) on the right side and the other end may be attached to the contact section 84 on the left side. Further, in the headband-like cover and the band-like cover, length adjusting sections that adjust the lengths of the covers may be provided. A cover obtained by combining the headband-like cover and the band-like cover may be adopted.

In the third embodiment, the attachment section 875 to which the restricting member 89 is attached is larger in the thickness dimension than the other parts in the temple frame 87. However, not only this, but the thickness dimension of the attachment section 875 can be changed as appropriate and may be the same as the thickness dimension of the other part as long as the restricting member 89 does not easily come off.

Further, the attachment section 875 does not have the configuration in which a part of the extending section 874 is folded back to the outer side (the opposite side of the side close to the head). The attachment section 875 may be a part formed thick in advance like the center-of-gravity adjusting section 746.

In the embodiments, the contact sections 67L, 67R, 74, 84, and 923 are movable between the first positions and the second positions. The contact sections 67L, 67R, 74, 84, and 923 may be configured to be moved stepwise between the first positions and the second positions. Lock mechanisms (locking mechanisms) that lock the respective contact sections 67L, 67R, 74, 84, and 823 in desired positions between the first positions and the second positions may be provided. The lock mechanism may be, for example, a mechanism in which at least one convex section is provided along a turning direction of at least one link of a pair of links, which configures the link mechanism, in a turnable range of the link, a concave section is formed in the link, and the convex section fits in the concave section to be locked. Alternatively, the lock mechanism may be a mechanism in which at least one concave section is provided along a turning direction of at least one link in a turnable range of the link, a convex section is formed in the link, and the convex section fits in the concave section to be locked. In the lock mechanism, the configurations including the convex sections and the concave sections may be opposite. The lock mechanism may be a mechanism in which extension and contraction of an extendable member may be performed stepwise.

In the embodiments, the contact sections 67L, 67R, 74, 84, and 923 have rigidity like temples of eyeglasses. A contact section deformable along the head of the user may be adopted instead of the contact sections 67L, 67R, 74, 84, and 923. As such a contact section, an elastically deformable contact section, a contact section having flexibility like a flexible arm, and a contact section, at least a part of which is bendable can be illustrated.

In the embodiments, in the HMDs 1, 1A, 1B, and 1C, the case member 32R combined with the frame main body 31 to house the image projecting section 41 on the inside includes the board holder 322 functioning as an inner case and the upper case 321 and the lower case 323, which respectively configure outer cases. However, not only this, but a case member may be integrated. The board holder 322 may be absent. The configurations of these members are not limited to the configurations explained above and can be changed as appropriate. The same applies in the case member 32L.

In the embodiments, the image projecting sections 41 that project image lights corresponding to image information are located in the housing spaces formed by the case members 32L and 32R and the side surface sections 312L and 312R. However, not only this, but, for example, the projection optical devices 43 may project, on the light guide members 47L and 47R, image lights guided by optical fibers or the like from the outside of the case members 32L and 32R.

In the embodiments, the image display section 2 adopts the light guide members 47R and 47L that guide image lights respectively projected from the image projecting sections 41 to the left and right eyes of the user. However, not only this, but a component that makes the image lights incident on the eyes of the user may be a display panel such as a liquid crystal panel or an organic EL panel disposed in front of the eyes of the user. That is, the invention can also be applied to a closed-type HMD. A display form of an image may be any form as long as the image can be displayed to be visually recognizable by the user. Reflection members that reflect images projected by the image projecting section 41 to the eyes of the user may be adopted instead of the light guide members 47R and 47L. A configuration including a hologram element and a semi-transmissive reflection surface such as a diffraction grating or a configuration including a full reflection mirror like a pupil split type may be adopted.

Members housed in the housing spaces do not have to be the image projecting sections 41 and the control sections 46 and may be one of the image projecting sections 41 and the control sections 46. Further, other members such as control circuits and power supplies necessary for the operation of the image display section 2 may be disposed in the housing spaces.

In the embodiments, the HMDs 1, 1A, 1B, and 1C include the light guide members 47R and 47L disposed to correspond to the left and right eyes of the user. However, not only this, but one light guide member may guide image lights made incident from the image projecting sections 41 to the left and right eyes. Further, the HMDs 1, 1A, 1B, and 1C may include only one of the optical devices 4R and 4L.

In the embodiments, one image pickup device 5 is provided in the right end portion 311R in the frame main body 31. However, not only this, but the positions and the number of image pickup devices 5 can be changed as appropriate. For example, the image pickup device 5 may be provided in the left end portion 311L or may be provided in each of the left end portion 311L and the right end portion 311R. Further, the image pickup device 5 may be provided in a position different from the right end portion 311R and the left end portion 311L, for example, the center of the frame main body 31, the side surface sections 312R and 312L, or the case members 32R and 32L.

In the embodiments, the control sections 46, which configure the optical devices 4L and 4R, control the operation of the image projecting sections 41 (e.g., image formation by the image forming devices 42). However, not only this, but, for example, the control section 46 may control charging of a battery retained in the frame 3 using electric power supplied from the outside or may control communication with electronic apparatuses such as image display apparatuses such as other HMDs and image supply apparatuses. That is, processing executed by the control section 46 is not limited to the above and may be other processing. In this case, control devices that control the operation of the image forming devices 42 may be located in another place (e.g., an external apparatus connected by wire via the cable CB or an external apparatus connected by radio).

Further, the control section 46 is not limited to the printed board and may be a flexible printed board or may be a control unit including a circuit element such as an arithmetic processing circuit. That is, the configuration of the control section 46 is not limited as long as the control section 46 executes predetermined control.

In the embodiments, the example is explained in which the temples 6L, 6R, 7, 8, and 9 are used in the HMDs 1, 1A, 1B, and 1C. However, a configuration in which the temples 6L, 6R, 7, 8, and 9 are adopted is not limited to the HMD. Modifications of the temples 6L, 6R, 7, 8, and 9 and the temples explained above can be adopted as long as the modifications are mounted on the head of the user. As such modifications, a wearable camera in which a camera is attached to an eyeglass-like frame can be illustrated.

The entire disclosure of Japanese Patent Application No.: 2016-161360, filed Aug. 19, 2016 and 2016-246991, filed Dec. 20, 2016 are expressly incorporated by reference herein.

What is claimed is:

1. A head-mounted image display device that is mounted on a head of a user and displays an image to enable the user to observe the image, the head-mounted image display device comprising:
an image display section configured to display the image;
a left contact section set in contact with a temporal region on a left side in the head;
a right contact section set in contact with a temporal region on a right side in the head;
a left supporting section provided in the image display section and configured to support the left contact section; and
a right supporting section provided in the image display section and configured to support the right contact section, wherein
at least one supporting section of the left supporting section and the right supporting section supports an entire target contact section, which is the contact section supported by the at least one supporting section of the left contact section and the right contact section, to be movable from a first position to a second position away from the first position in a left-right direction with respect to the head;
a first link supported to be turnable around a first turning axis extending along an up-down direction in the at least one supporting section and connected to the target contact section;
a second link supported to be turnable around a second turning axis extending along the up-down direction in a position different from the first link in a front-back direction in the at least one supporting section and connected to the target contact section; and
an attenuating mechanism configured to engage with an attenuation target link, which is one of the first link and the second link, and attenuate a turning force of the attenuation target link.

2. The head-mounted image display device according to claim 1, wherein
the target contact section includes:
a turning supporting section configured to turnably support the attenuation target link; and
an attenuating-mechanism supporting section configured to support the attenuating mechanism,
the turning supporting section and the attenuating-mechanism supporting section are respectively disposed in different positions, and
the attenuating mechanism and the attenuation target link include meshing sections configured to mesh with each other.

3. The head-mounted image display device according to claim 2, wherein
the target contact section includes a pair of housing sections configured to hold a part of each of the first link and the second link along the up-down direction, and
the turning supporting section and the attenuating-mechanism supporting section are located in one housing section of the pair of housing sections.

4. The head-mounted image display device according to claim 1, further comprising an urging section configured to urge an urging target link, which is at least one link of the first link and the second link, in a turning direction in which the entire target contact section is located in the first position.

5. The head-mounted image display device according to claim 4, wherein
the urging section is a tension spring, one end of which engages with the urging target link and the other end of which engages with a predetermined position,
the urging target link includes an attaching section to which the one end of the tension spring is attached, and
when the target contact section is located within a range between the first position and the second position, a first direction, which is a direction extending from a turning center on an opposite side of the target contact section in the urging target link to an attachment position of the one end of the tension spring in the attaching section, and a second direction extending along an axial direction of the tension spring cross each other.

6. The head-mounted image display device according to claim 1, wherein
the first link includes:
a first-link-side first turning section supported to be turnable around the first turning axis; and
a first-link-side second turning section turnably supported by the target contact section,
the second link includes:
a second-link-side first turning section supported to be turnable around the second turning axis; and
a second-link-side second turning section turnably supported by the target contact section, and
at least any one of the first-link-side first turning section, the first-link-side second turning section, the second-link-side first turning section, and the second-link-side second turning section is supported via a bearing.

7. The head-mounted image display device according to claim 1, wherein the target contact section includes:
a main body section; and
a cover provided to be detachably attachable to the main body section and configured to cover at least a part of the main body section.

8. The head-mounted image display device according to claim 7, wherein
the main body section includes:
a connecting section connected to the first link and the second link; and
a frame section, one end of which is fixed to the connecting section, the frame section extending to a rear of the user from the connecting section, and
the frame section has flexibility.

9. The head-mounted image display device according to claim 8, wherein the frame section includes a curved section located, in an extending direction of the frame section from the connecting section, on a distal end side in the extending direction with respect to a fixing position to the connecting section.

10. The head-mounted image display device according to claim 8, wherein the target contact section includes a seal member located between the frame section and the cover.

11. The head-mounted image display device according to claim 8, wherein the frame section is formed of metal.

12. The head-mounted image display device according to claim 8, wherein
the cover includes an insert-through port through which the frame section is inserted, and the target contact section includes a restricting member configured to restrict come-off of the cover, through the insert-through port of which the frame section is inserted.

13. The head-mounted image display device according to claim 12, wherein
the frame section includes, at an extending direction distal end portion of the frame section from the connecting section, an attachment section to which the restricting member is attached, and
the attachment section has a thickness dimension larger than a thickness dimension of other parts of the frame section.

14. The head-mounted image display device according to claim 13, wherein the attachment section is configured by folding back a part of the frame section to an opposite side of a side close to the head.

15. The head-mounted image display device according to claim 1, wherein the at least one supporting section includes an exterior section that configures a part of an exterior of the head-mounted image display device.

16. The head-mounted image display device according to claim 1, wherein at least a part of the target contact section is thinner than other parts.

17. The head-mounted image display device according to claim 1, wherein the target contact section includes, in a part on an opposite direction side of an observation direction, which is a direction in which the user observes the image displayed by the image display section, a center-of-gravity adjusting section configured to adjust a center-of-gravity position of the head-mounted image display device.

18. The head-mounted image display device according to claim 1, wherein the at least one supporting section movably supports the target contact section such that a dimension in the left-right direction between the left contact section and the right contact section is in a range of 128 mm or more and 170 mm or less.

19. A head-mounted image display device that is mounted on a head of a user and displays an image to enable the user to observe the image, the head-mounted image display device comprising:
an image display section configured to display the image;
a left contact section set in contact with a temporal region on a left side in the head;
a right contact section set in contact with a temporal region on a right side in the head;
a left supporting section provided in the image display section and configured to support the left contact section; and
a right supporting section provided in the image display section and configured to support the right contact section, wherein:
at least one supporting section of the left supporting section and the right supporting section supports an entire target contact section, which is the contact section supported by the at least one supporting section of the left contact section and the right contact section, to be movable from a first position to a second position away from the first position in a left-right direction with respect to the head, and
the at least one supporting section movably supports the target contact section such that a dimension in the left-right direction between the left contact section and the right contact section is in a range of 128 mm or more and 170 mm or less.

20. A head-mounted image display device that is mounted on a head of a user and displays an image to enable the user to observe the image, the head-mounted image display device comprising:
an image display section configured to display the image;
a left contact section set in contact with a temporal region on a left side in the head, wherein the target contact section includes:
a main body section; and
a cover provided to be detachably attachable to the main body section and configured to cover at least a part of the main body section;
a right contact section set in contact with a temporal region on a right side in the head;
a left supporting section provided in the image display section and configured to support the left contact section;
a right supporting section provided in the image display section and configured to support the right contact section, wherein
at least one supporting section of the left supporting section and the right supporting section supports an entire target contact section, which is the contact section supported by the at least one supporting section of the left contact section and the right contact section, to be movable from a first position to a second position away from the first position in a left-right direction with respect to the head;
a first link supported to be turnable around a first turning axis extending along an up-down direction in the at least one supporting section and connected to the target contact section; and
a second link supported to be turnable around a second turning axis extending along the up-down direction in a position different from the first link in a front-back direction in the at least one supporting section and connected to the target contact section,
wherein:
the main body section includes:
a connecting section connected to the first link and the second link; and
a frame section, one end of which is fixed to the connecting section, the frame section extending to a rear of the user from the connecting section, and the frame section has flexibility.

* * * * *